(12) United States Patent
Khavronin et al.

(10) Patent No.: US 11,589,083 B2
(45) Date of Patent: Feb. 21, 2023

(54) MACHINE LEARNING TECHNIQUES FOR DETECTING SURGES IN CONTENT CONSUMPTION

(71) Applicant: BOMBORA, INC., New York, NY (US)

(72) Inventors: Oleg Valentin Khavronin, Oakland, NJ (US); Benny Lin, New York, NY (US); Anthony Livhits, Forest Hills, NY (US); Erik Gregory Matlick, Miami Beach, FL (US); Christian Michael Burton, New York, NY (US); Robert James Armstrong, Reno, NV (US)

(73) Assignee: BOMBORA, INC., New York, NY (US)

( * ) Notice: Subject to any disclaimer, the term of this patent is extended or adjusted under 35 U.S.C. 154(b) by 0 days.

(21) Appl. No.: 17/189,073

(22) Filed: Mar. 1, 2021

(65) Prior Publication Data
US 2022/0279220 A1    Sep. 1, 2022

Related U.S. Application Data

(63) Continuation-in-part of application No. 14/981,529, filed on Dec. 28, 2015, now abandoned, which is a
(Continued)

(51) Int. Cl.
*G06F 15/16* (2006.01)
*H04N 21/231* (2011.01)
(Continued)

(52) U.S. Cl.
CPC ....... *H04N 21/231* (2013.01); *H04L 67/1044* (2013.01); *H04L 67/14* (2013.01); *H04N 21/251* (2013.01)

(58) Field of Classification Search
CPC ............... H04N 21/231; H04N 21/251; H04L 67/1044; H04L 67/14
(Continued)

(56) References Cited

U.S. PATENT DOCUMENTS 7,185,065 B1    2/2007    Holtzman
7,949,646 B1    5/2011    Bangalore
(Continued)

FOREIGN PATENT DOCUMENTS

CN    108713213 A    10/2018
EP    3398146 A1    11/2018
(Continued)

OTHER PUBLICATIONS

PCT, International Search Report and Written Opinion of the International Searching Authority for International Application No. PCT/US16/35186, dated Nov. 4, 2016; 23 pages.
(Continued)

*Primary Examiner* — Duyen M Doan
(74) *Attorney, Agent, or Firm* — Schwabe, Williamson & Wyatt, PC

(57) ABSTRACT

Disclosed embodiments include a content consumption monitor (CCM) determines surges in content consumption based on changes in content consumptions scores. The CCM determines the content consumptions scores for domains and/or organizations (orgs) based on session events generated by different devices/users from the org and/or domain, a number of events generated by the org/domain, content and/or user interactions with the content indicated by the events, relevancy scores of the content to one or more topics, and/or other criteria. The CCM detects surges in consumption or interest in a topic for the domain/org when the consumption score reaches a threshold and/or within a period of time. The CCM may adjust the consumption score
(Continued)

based on the changes in the relevancy, number of events and/or the number of users over different time periods. Other embodiments may be described and/or claimed.

20 Claims, 15 Drawing Sheets

Related U.S. Application Data continuation-in-part of application No. 14/498,056, filed on Sep. 26, 2014, now Pat. No. 9,940,634.

(51) Int. Cl.
  *H04L 67/104* (2022.01)
  *H04L 67/14* (2022.01)
  *H04N 21/25* (2011.01)

(58) Field of Classification Search
  USPC .................................................. 709/203, 219
  See application file for complete search history.

(56) References Cited

U.S. PATENT DOCUMENTS

| | | | |
|---|---|---|---|
| 8,392,252 B2 | 3/2013 | Kaufman | |
| 8,392,543 B1 | 3/2013 | Singh | |
| 8,412,847 B2 | 4/2013 | Longo | |
| 8,494,897 B1 | 7/2013 | Dawson | |
| 8,566,152 B1 | 10/2013 | Shaw | |
| 8,613,089 B1 | 12/2013 | Holloway | |
| 8,725,712 B2 | 5/2014 | Arrasvuori | |
| 8,745,647 B1 | 6/2014 | Shin | |
| 8,990,105 B1* | 3/2015 | Shatkin-Margolis | ........................ G06Q 30/02 705/14.54 |
| 9,092,829 B2 | 7/2015 | Fleischman | |
| 9,152,970 B1 | 10/2015 | Trahan | |
| 9,177,142 B2 | 11/2015 | Montoro | |
| 9,419,850 B2 | 8/2016 | Longo | |
| 9,514,368 B2 | 12/2016 | Pitt | |
| 9,514,461 B2 | 12/2016 | George | |
| 9,521,157 B1 | 12/2016 | D'Aveta | |
| 9,560,423 B1 | 1/2017 | Chang | |
| 9,667,733 B2 | 5/2017 | Dhawan | |
| 9,706,008 B2 | 7/2017 | Rajan | |
| 9,753,923 B2 | 9/2017 | Fleischman | |
| 9,779,144 B1 | 10/2017 | Hampson | |
| 9,940,634 B1 | 4/2018 | Livhits | |
| 10,402,465 B1* | 9/2019 | Jain | ........................ H04L 67/535 |
| 10,430,806 B2 | 10/2019 | Chang | |
| 10,642,889 B2 | 5/2020 | Reshef | |
| 10,810,604 B2 | 10/2020 | Livhits | |
| 2002/0173971 A1 | 11/2002 | Stirpe | |
| 2003/0154398 A1 | 8/2003 | Eaton | |
| 2004/0267723 A1 | 12/2004 | Bharat | |
| 2006/0064411 A1* | 3/2006 | Gross | ........................ G06F 16/951 |
| 2007/0124202 A1 | 5/2007 | Simons | |
| 2007/0156392 A1 | 7/2007 | Balchandran | |
| 2008/0126178 A1 | 5/2008 | Moore | |
| 2008/0313019 A1 | 12/2008 | Jeffers | |
| 2009/0216741 A1 | 8/2009 | Thrall | |
| 2010/0100537 A1 | 4/2010 | Druzgalski | |
| 2010/0161613 A1 | 6/2010 | Rao | |
| 2010/0250341 A1 | 9/2010 | Hauser | |
| 2010/0293057 A1 | 11/2010 | Haveliwala | |
| 2011/0227699 A1 | 9/2011 | Seth | |
| 2011/0252427 A1 | 10/2011 | Olston | |
| 2011/0320715 A1 | 12/2011 | Ickman | |
| 2012/0158693 A1 | 6/2012 | Papadimitriou | |
| 2012/0209795 A1 | 8/2012 | Glickman | |
| 2012/0215640 A1 | 8/2012 | Ramer | |
| 2013/0066677 A1 | 3/2013 | Killoh | |
| 2013/0067070 A1 | 3/2013 | Rowe | |
| 2013/0073473 A1 | 3/2013 | Heath | |
| 2013/0124193 A1 | 5/2013 | Holmberg | |
| 2013/0132339 A1 | 5/2013 | Mirus | |
| 2013/0136253 A1 | 5/2013 | Liberman Ben-Ami | |
| 2013/0151687 A1 | 6/2013 | Mooneyham | |
| 2013/0159505 A1 | 6/2013 | Mason | |
| 2013/0204663 A1 | 8/2013 | Kahlow | |
| 2013/0216134 A1 | 8/2013 | Yu | |
| 2013/0297338 A1 | 11/2013 | Urmann | |
| 2014/0067831 A1 | 3/2014 | Swamidas | |
| 2014/0095966 A1 | 4/2014 | Burkard | |
| 2014/0096035 A1 | 4/2014 | Hall | |
| 2014/0108376 A1* | 4/2014 | Batali | ................ G06F 16/9535 707/E17.014 |
| 2014/0156681 A1 | 6/2014 | Lee | |
| 2014/0201061 A1 | 7/2014 | Sivacki | |
| 2014/0201240 A1 | 7/2014 | Andavarapu | |
| 2014/0229164 A1 | 8/2014 | Martens | |
| 2014/0236669 A1 | 8/2014 | Milton | |
| 2014/0278308 A1 | 8/2014 | Liu | |
| 2014/0278916 A1 | 9/2014 | Nukala | |
| 2014/0278959 A1 | 9/2014 | Nukala | |
| 2014/0280549 A1 | 9/2014 | Rajan | |
| 2014/0280890 A1 | 9/2014 | Yi | |
| 2014/0325030 A1 | 10/2014 | Maharajh | |
| 2015/0074131 A1 | 3/2015 | Fernandez | |
| 2015/0309965 A1 | 10/2015 | Brav | |
| 2016/0048880 A1 | 2/2016 | Linden | |
| 2016/0132906 A1 | 5/2016 | Khavronin | |
| 2016/0371725 A1 | 12/2016 | Nguyen | |
| 2017/0031907 A1 | 2/2017 | Juang | |
| 2017/0364931 A1 | 12/2017 | Khavronin | |
| 2018/0101860 A1 | 4/2018 | Fleming | |
| 2018/0174163 A1 | 6/2018 | Livhits | |
| 2018/0357248 A1 | 12/2018 | Maharajh | |
| 2018/0365710 A1 | 12/2018 | Halecky | |
| 2019/0050874 A1 | 2/2019 | Matlick | |
| 2019/0294642 A1 | 9/2019 | Matlick | |
| 2020/0410514 A1 | 12/2020 | Livhits | |

FOREIGN PATENT DOCUMENTS

| | | |
|---|---|---|
| HK | 40000145 | 1/2020 |
| WO | 2014/054052 A2 | 4/2014 |
| WO | 2017/116493 A1 | 7/2017 |

OTHER PUBLICATIONS

Snoek, et al., "Practical Bayesian Optimization of Machine Learning Algorithms"; dated Aug. 29, 2012; 12 pages.
McCallum, et al., "A Comparison of Event Models for Naive Bayes Text Classification"; Learning for Text Categorization: Papers from the 1998 AAAI Workshop; 8 pages.
Mikolov, et al., "Efficient Estimation of Word Representations in Vector Space", arXiv:1301.3781v3 [cs.CL] (2013) 12 pages.
Burby, et al. "Web Analytics Definitions" Web Analytics Association; version 4.0; Aug. 23, 2007; XP055505869; retrieved from the Internet on Sep. 10, 2018 at: <https://www.digitalanalyticsassociation.org/Files/PDF_standards/WebAnalyticsDefinitionsVol1.pdf>.
Extended European Search Report for EP App. No. 18190771.8 dated Oct. 22, 2018; 8 pages.
Extended European Search Report for EP App. No. 16882214.6 dated Jul. 4, 2019; 9 pages.
Withers, "What is Buyer Intent Data? A Guide for 2020"; dated Apr. 1, 2020; retrieved from the Internet at <https://blog.zoominfo.com/how-to-use-internet-data/>; 6 pages.
ZoomInfo Launches Intent Solution for Marketing and Sales, dated Apr. 9, 2020; retrieved from the Internet at <https://destinationcrm.com/ . . . News/CRM-Across-the-Wire/ZoomInfo-Launches-Intent-Solution-for-Marketing-and-Sales-140221.aspx>; 2 pages.
ZoomInfo Launches 'Intent' Solution to Help B2B Companies Identify, Prioritize and Engage Sales Leads Based on Buying Signals dated Apr. 9, 2020; retrieved from the Internet at <https://www.businesswire.com/news/home/20200409005418/en/ZoomInfo-Launches-'Intent'-Solution_B2B_Comapnies-Identify>; 2 pages.
Perozzi, et al., "DeepWalk: Online Learning of Social Representations" KDD'14 Aug. 24-27, 2014, New York, NY, ACM 978-1-4503-2956-9/14/08; DOI 10.1145/2623330.2623732; 10 pages.

(56) References Cited

OTHER PUBLICATIONS

Tang, et al., "LINE: Large-scale Information Network Embedding" WWW 2015, May 18-22, 2015, Florence, Italy. ACM 978-1-4503-3469-3/15/05. DOI 10-1145/2736277.2741093; 11 pages.

Hamilton, et al., "Inductive Representation Learning on Large Graphs" 31st Conference on Neural Information Processing Systems (NIPS 2017), Long Beach, CA, USA; available on the Internet at <https://cs.stanford.edu/people/jure/pubs/graphsage-nips17.pdf> 19 pages.

Zhang et al., "A Sensitivity Analysis of (and Practitioners' Guide to) Convolutional Neural Networks for Sentence Classification", arXiv:1510.03820v4 [cs.CL] (Apr. 6, 2016); 18 pages.

Zhou, "Ensemble Learning", Encyclopedia of Biometrics, 1, pp. 270-273 (Jun. 2009), available at: https://cs.nju.edu.cn/zhouzh/zhouzh.files/publication/springerEBR09.pdf; 5 pages.

Kamar et al., "Combining Human and Machine Intelligence in Large-scale Crowdsourcing", AAMAS, vol. 12, pp. 467-474 (Jun. 4, 2012), available at: http://www.erichorvitz.com/CrowdSynth.pdf; 8 pages.

Osanaiye et al., "Ensemble-based Multi-Filter Feature Selection Method for DDoS Detection in Cloud Computing", EURASIP J. of Wirel. Comm. and Netw., vol. 2016, No. 1, p. 130, May 10, 2016, Dec. 1, 2016); available at: https://link.springer.com/article/10.1186/s13638-016-0623-3.

Boutaba et al., "A comprehensive survey on machine learning for networking: evolution, applications and research opportunities", J. of Internet Services and Applications, vol. 9, issue 1, article No. 16 (Dec. 1, 2018); 99 pages.

Wu et al., "Hyperparameter Optimization for Machine Learning Models Based on Bayesian Optimization", J. of Electronic Sci and Tech., vol. 17, No. 1, (Mar. 2019).

Frishman, "Graph Drawing Algorithms in Information Visualization." Diss. Comp. Sci. Dep., Technion—Israel Institute of Technology (Jan. 2009), available on the Internet at <http://www.cs.technion.ac.il/users/wwwb/cgi-bin/tr-info.cgi/2009/PHD/PHD-2009-02>.

Tarawneh et al., "A General Introduction To Graph Visualization Techniques", Visualization of Large and Unstructured Data Sets: Applications in Geospatial Planning, Modeling and Engineering-Proceedings of IRTG 1131 Workshop 2011, Schloss Dagstuhl-Leibniz-Zentrum fuer Informatik, pp. 151-164 (2012).

Nho et al., "Paragraph Topic Classification", Stanford Univ., available on the Internet at <http://cs229.stanford.edu/proj2016/report/NhoNg-ParagraphTopicClassification-report.pdf> (accessed on Feb. 26, 2021); 6 pages.

Yoav Goldberg, "Neural Network Methods for Natural Language Processing", Synthesis Lectures on Human Technologies, Lecture #37, Morgan & Claypool (Apr. 17, 2017); 309 Pages.

Patent Cooperation Treaty: International Search Report and Written Opinion for PCT/US2022/017422 dated May 16, 2022; 9 pages.

\* cited by examiner

US 11,589,083 B2

MACHINE LEARNING TECHNIQUES FOR DETECTING SURGES IN CONTENT CONSUMPTION

RELATED APPLICATIONS

The present application is a continuation-in-part (CIP) of U.S. application Ser. No. 14/981,529 filed on Dec. 28, 2015, which is a CIP of U.S. application Ser. No. 14/498,056 filed Sep. 26, 2014 now issued as U.S. Pat. No. 9,940,634, the contents of each of which are hereby incorporated by reference in their entireties.

TECHNICAL FIELD

Embodiments described herein generally relate to machine learning (ML) and artificial intelligence (AI), and in particular, ML/AI techniques for associating network addresses with locations from which content and/or information objects is/are accessed.

BACKGROUND

Users receive a random variety of different information from a random variety of different businesses. For example, users may constantly receive promotional announcements, advertisements, information notices, event notifications, etc. Users request some of this information. For example, a user may register on a company website to receive sales or information announcements. However, much of the information is of little or no interest to the user. For example, the user may receive emails announcing every upcoming seminar, regardless of the subject matter.

The user may also receive unsolicited information. For example, a user may register on a website to download a white paper on a particular subject. A lead service then may sell the email address to companies that send the user unsolicited advertisements. Users end up ignoring most or all of these emails since most of the information has no relevance or interest. Alternatively, the user directs all of these emails into a junk email folder.

DETAILED DESCRIPTION

Figure 1:
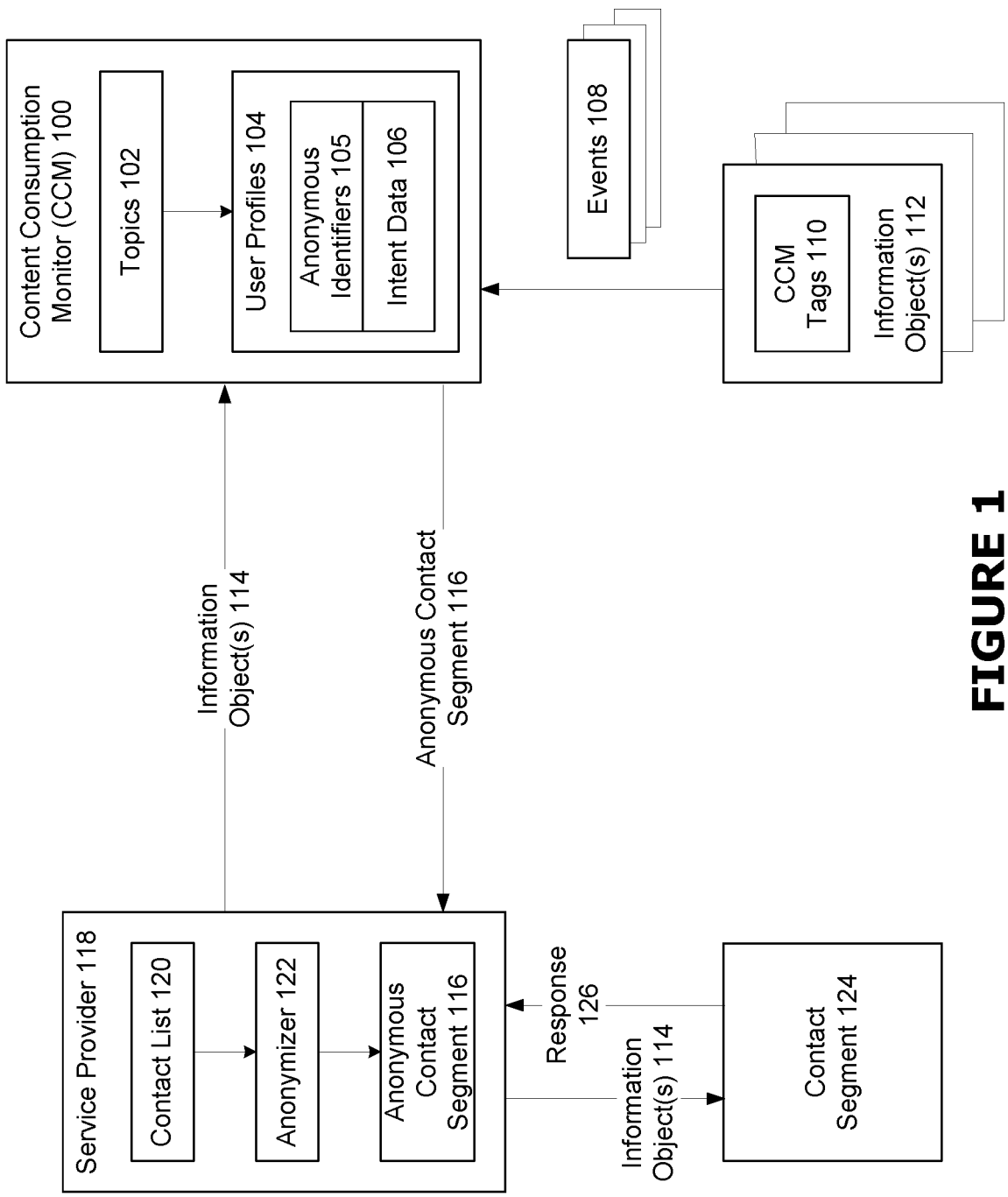
FIG. 1 depicts an example content consumption monitor (CCM).

Companies may research topics on the Internet as a prelude to purchasing items or services related to the topics. In embodiments, a content consumption monitor (CCM) generates consumption scores identifying the level of company interest in different topics. The CCM may go beyond just identifying companies interested in specific topics and also identify surge data indicating when the companies are most receptive to direct contacts regarding different topics. Service providers and/or publishers may use the surge data to increase interest in published information. In one example, the service providers and/or publishers may include advertisers who use the surge data to increase advertising conversion rates.

Embodiments disclosed herein are related to web resource interest detection services, and in particular, to detecting web resource interest at the organization level. According to various embodiments, a machine learning (ML) classification system uses various ML techniques to determine interest in a particular web resource (e.g., websites, webpages, web apps, etc.) based on actions taken by users from or otherwise associated with different organizations (orgs). In embodiments, an entity predictor predicts entities association with different network addresses (e.g., IP addresses) indicated by a set of obtained network events. A hostname extractor extracts a hostname of accessed information objects from the set of obtained network events. A feature generator generates different features based on the extracted hostnames, predicted entities, and/or other information included in the obtained network events. These feature are then used to predict an interest level in the accessed information objects and/or the hostname org by the predicted entity. Other embodiments may be described and/or claimed.

The CCM may use these classifications and/or predictions to generate consumption scores and/or surge scores/signals. The embodiments discussed herein allow the CCM to generate more accurate intent data than existing/conventional solutions by better predicting intent and/or interest levels for specific orgs. The CCM uses processing resources more efficiently by generating more accurate consumption scores and/or surge scores/signals. The CCM may also provide more secure network analytics by generating consumption scores and/or surge scores/signals for orgs without using personally identifiable information (PII), sensitive data, and/or confidential data, thereby improving information security for end-users.

The resource interest classifications and predictions and/or intent predictions can be used to more efficiently process events, more accurately calculate consumption scores, and more accurately detect associated surges such as organization (org) surges (also referred to as "company surges" or the like). The more accurate intent data and consumptions scores allow third party service providers to conserve computational and network resources by providing a means for better targeting users so that unwanted and seemingly random content is not distributed to users that do not want such content. This is a technological improvement in that it conserves network and computational resources of organizations (orgs) that distribute this content by reducing the amount of content generated and sent to end-user devices. Network resources may be reduced and/or conserved at end-user devices by reducing or eliminating the need for using resources to receive unwanted content, and computational resources may be reduced and/or conserved at end-user devices by reducing or eliminating the need to implement spam filters and/or reducing the amount of data to be processed when analyzing and/or deleting such content. This amounts to an improvement in the technological fields of machine learning and web tracking technologies, and also amounts to an improvement in the functioning of computing systems and computing networks themselves.

Furthermore, since the classifications and predictions identify specific orgs associated with a particular network addresses and information objects of interest to those orgs, the embodiments discussed herein can be used for other use cases such as, for example, network troubleshooting, anti-spam and anti-phishing technologies (e.g., for email systems and the like), cybersecurity threat detection and tracking, system/network monitoring and logging, network resource allocation and/or network appliance topology optimization, and/or the like.

1. MACHINE LEARNING ASPECTS

Machine learning (ML) involves programming computing systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure.

ML techniques generally fall into the following main types of learning problem categories: supervised learning, unsupervised learning, and reinforcement learning. Supervised learning is an ML task that aims to learn a mapping function from the input to the output, given a labeled data set. Supervised learning algorithms build models from a set of data that contains both the inputs and the desired outputs. For example, supervised learning may involve learning a function (model) that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms Classification, in the context of ML, refers to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (INN), decision trees, random forests, support vector machines (SVMs), Bayesian classifiers, convolutional neural networks (CNNs), among many others (note that some of these algorithms can be used for other ML tasks as well).

A regression algorithm and/or a regression analysis, in the context of ML, refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

Instance-based learning (sometimes referred to as "memory-based learning"), in the context of ML, refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest, and the like.

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features. A set of features may be referred to as a "feature vector." A vector is a tuple of one or more values called scalars, and a feature vector may include a tuple of one or more features. The vector space associated with these vectors is often called a "feature space." In order to reduce the dimensionality of the feature space, a number of dimensionality reduction techniques can be employed.

Unsupervised learning is an ML task that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Some examples of unsupervised learning are K-means clustering, principal component analysis (PCA), and topic modeling, among many others. In particular, topic modeling is an unsupervised machine learning technique scans a set of information objects (e.g., documents, webpages, etc.), detects word and phrase patterns within the information objects, and automatically clusters word groups and similar expressions that best characterize the set of information objects. Semi-supervised learning algorithms develop ML models from incomplete training data, where a portion of the sample input does not include labels. One example of unsupervised learning is topic modeling. Topic modeling involves counting words and grouping similar word patterns to infer topics within unstructured data. By detecting patterns such as word frequency and distance between words, a topic model clusters feedback that is similar, and words and expressions that appear most often. With this information, the topics of individual set of texts can be quickly deduced.

Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

An artificial neural network or neural network (NN) encompasses a variety of ML techniques where a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), etc.), deep stacking network (DSN).

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used. ML algorithms accept parameters and/or hyperparameters (collectively referred to herein as "training parameters," "model parameters," or simply "parameters" herein) that can be used to control certain properties of the training process and the resulting model.

Parameters are characteristics or properties of the training process that are learnt during training. Model parameters may differ for individual experiments and may depend on the type of data and ML tasks being performed. Hyperparameters are characteristics, properties, or parameters for a training process that cannot be learnt during the training process and are set before training takes place. The particular values selected for the parameters and/or hyperparameters affect the training speed, training resource consumption, and the quality of the learning process. As examples, model parameters for topic classification/modeling, natural language processing (NLP), and/or natural language understanding (NLU) may include word frequency, sentence length, noun or verb distribution per sentence, the number of specific character n-grams per word, lexical diversity, constraints, weights, and the like. Examples of hyperparameters may include model size (e.g., in terms of memory space or bytes), whether (and how much) to shuffle the training data, the number of evaluation instances or epochs (e.g., a number of iterations or passes over the training data), learning rate (e.g., the speed at which the algorithm reaches (converges to) the optimal weights), learning rate decay (or weight decay), the number and size of the hidden layers, weight initialization scheme, dropout and gradient clipping thresholds, and the like. In embodiments, the parameters and/or hyperparameters may additionally or alternatively include vector size and/or word vector size.

Any of the aforementioned ML techniques may be utilized, in whole or in part, and variants and/or combinations thereof, for any of the example embodiments discussed herein.

2. CONTENT CONSUMPTION MONITOR EMBODIMENTS

FIG. 1 depicts a content consumption monitor (CCM) 100. CCM 100 includes one or more physical and/or virtualized systems that communicates with a service provider 118 and monitors user accesses to information object(s) 112 (e.g., third party content and/or the like). The physical and/or virtualized systems include one or more logically or physically connected servers and/or data storage devices distributed locally or across one or more geographic locations. In some implementations, the CCM 100 may be provided by (or operated by) a cloud computing service and/or a cluster of machines in a datacenter. In some implementations, the CCM 100 may be a distributed application provided by (or operated by) various servers of a content delivery network (CDN) or edge computing network. Other implementations are possible in other embodiments.

Service provider 118 (also referred to as a "publisher," "B2B publisher," or the like) comprises one or more physical and/or virtualized computing systems owned and/or operated by a company, enterprise, and/or individual that wants to send information object(s) 114 to an interested group of users, which may include targeted content or the like. This group of users is alternatively referred to as "contact segment 124." The physical and/or virtualized systems include one or more logically or physically connected servers and/or data storage devices distributed locally or across one or more geographic locations. Generally, the service provider 118 uses IP/network resources to provide information objects such as electronic documents, webpages, forms, applications (e.g., web apps), data, services, web services, media, and/or content to different user/client devices. As examples, the service provider 118 may provide search engine services; social media/networking services; content (media) streaming services; e-commerce services; blockchain services; communication services; immersive gaming experiences; and/or other like services. The user/client devices that utilize services provided by service provider 118 may be referred to as "subscribers." Although FIG. 1 shows only a single service provider 118, the service provider 118 may represent multiple service providers 118, each of which may have their own subscribing users.

In one example, service provider 118 may be a company that sells electric cars. Service provider 118 may have a contact list 120 of email addresses for customers that have attended prior seminars or have registered on the service provider's 118 website. Contact list 120 may also be generated by CCM tags 110 that are described in more detail below. Service provider 118 may also generate contact list 120 from lead lists provided by third parties lead services, retail outlets, and/or other promotions or points of sale, or the like or any combination thereof. Service provider 118 may want to send email announcements for an upcoming electric car seminar. Service provider 118 would like to increase the number of attendees at the seminar. In another example, service provider 118 may be a platform or service provider that offers a variety of user targeting services to their subscribers such as sales enablement, digital advertising, content/engagement marketing, and marketing automation, among others.

The information objects 112 comprise any data structure including or indicating information on any subject accessed by any user. The information objects 112 may include any type of information object (or collection of information objects). Information objects 112 may include electronic documents, database objects, electronic files, resources, and/or any data structure that includes one or more data elements, each of which may include one or more data values and/or content items.

In some implementations, the information objects 112 may include webpages provided on (or served) by one or more web servers and/or application servers operated by different service provides, businesses, and/or individuals. For example, information objects 112 may come from different websites operated by online retailers and wholesalers, online newspapers, universities, blogs, municipalities, social media sites, or any other entity that supplies content. Additionally or alternatively, information objects 112 may also include information not accessed directly from websites. For example, users may access registration information at seminars, retail stores, and other events. Information objects 112 may also include content provided by service provider 118. Additionally, information objects 112 may be associated with one or more topics 102. The topic 102 of an information object 112 may refer to the subject, meaning, and/or theme of that information object 112.

The CCM 100 may identify or determine one or more topics 102 of an information object 112 using a topic analysis model/technique. Topic analysis (also referred to as "topic detection," "topic modeling," or "topic extraction") refers to ML techniques that organize and understand large collections of text data by assigning tags or categories according to each individual information object's 112 topic or theme. A topic model is a type of statistical model used for discovering topics 102 that occur in a collection of information objects 112 or other collections of text. A topic model may be used to discover hidden semantic structures in the information objects 112 or other collections of text. In one example, a topic classification technique is used, where a topic classification model is trained on a set of training data (e.g., information objects 112 labeled with tags/topics 102) and then tested on a set of test data to determine how well the topic classification model classifies data into different topics 102. Once trained, the topic classification model is used to determine/predict topics 102 in various information objects 112. In another example, a topic modeling technique is used, where a topic modeling model automatically analyzes information objects 112 to determine cluster words for a set of documents. Topic modeling is an unsupervised ML technique that does not require training using training data. Any suitable topic classification, topic modeling, and/or NLP/NLU techniques may be used for the topic analysis such as those discussed herein and/or as discussed in Yoav Goldberg, "Neural Network Methods in Natural Language Processing", Synthesis Lectures on Human Language Technologies, Lecture #37, Morgan & Claypool (17 Apr. 2017) (hereinafter "[Goldberg_NLP]"), which is hereby incorporated by reference in its entirety.

Computers and/or servers associated with service provider 118, content segment 124, and the CCM 100 may communicate over the Internet or any other wired or wireless network including local area networks (LANs), wide area networks (WANs), wireless networks, cellular networks, WiFi networks, Personal Area Networks (e.g., Bluetooth® and/or the like), Digital Subscriber Line (DSL) and/or cable networks, and/or the like, and/or any combination thereof.

Some of information objects 112 contain CCM tags 110 that capture and send network session events 108 (or simply "events 108") to CCM 100. For example, CCM tags 110 may comprise JavaScript added to webpages of a website (or individual components of a web app or the like). The website downloads the webpages, along with CCM tags 110, to user computers (e.g., computer 230 of FIG. 2). CCM tags 110 (e.g., when executed by a user computer) monitor sessions and send some or all captured session events 108 to CCM 100.

In one example, the CCM tags 110 may intercept or otherwise obtain HTTP messages being sent by and/or sent to a computer 230, and these HTTP messages may be provided to the CCM 100 as the events 108. In this example, the CCM tags 110 or the CCM 100 may extract or otherwise obtain a network address of the computer 230 from an X-Forwarded-For (XFF) field of the HTTP header, a time and date that the HTTP message was sent from a Date field of the HTTP header, and/or a user agent string contained in a User Agent field of an HTTP header of the HTTP message. The user agent string may indicate the operating system (OS) type/version of the sending device (e.g., a computer 230); system information of the sending device (e.g., a computer 230); browser version/type of the sending device (e.g., a computer 230); rendering engine version/type of the sending device (e.g., a computer 230); a device type of the of the sending device (e.g., a computer 230), as well as other information. In another example, the CCM tags 110 may derive various information from the computer 230 that is not typically included in an HTTP header, such as time zone information, GPS coordinates, screen or display resolution of the computer 230, data from one or more applications operated by the computer 230, and/or other like information. In various implementations, the CCM tags 110 may generate and send events 108 or messages based on the monitored session. For example, the CCM tags 110 may obtain data when various events/triggers are detected, and may send back information (e.g., in additional HTTP messages). Other methods may be used to obtain or derive user information.

In some implementations, the information objects 112 that include CCM tags 110 may be provided or hosted by a collection of service providers 118 such as, for example, notable business-to-business (B2B) publishers, marketers, agencies, technology providers, research firms, events firms, and/or any other desired entity/org type. This collection of service providers 118 may be referred to as a "data cooperative" or "data co-op." Additionally or alternatively, events 108 may be collected by one or more other data tracking entities separate from the CCM 100, and provided as one or more datasets to the CCM 100 (e.g., a "bulk" dataset or the like). In one example, the CCM 100 or other data tracking entity may implement one or more event listeners (or event handlers) to detect events 108 and perform some action in response to detecting the events 108 (not shown by FIG. 1) such as any of the actions/processes described herein. An event handler or event listener is a software element/entity that handles received inputs (e.g., events 108).

Here, a "session" may refer to a temporary and interactive information interchange between two or more communicating devices, between a computer and user, and/or between two or more remote devices/systems. Additionally or alternatively, a "session" may refer to a unit of measurement of a user's actions taken within a period of time and/or with regard to completion of a task (these types of sessions may also be referred to as a "visit"). In these implementations, a session may be a time-oriented session based on continuity in user activity or a navigation-oriented session based on continuity in a chain of requested and/or consumed information objects. Time-oriented sessions are based on a set or predefined period of user inactivity (referred to as an "inactivity threshold"). Once this period of inactivity is reached the session is ended (e.g., the user is assumed to have left a website or stopped using the browser/client entirely). Additional requests from the same user after the inactivity threshold are considered to be part of a second session. Navigation-oriented sessions are based on a user moving between different information objects, such as by navigating between different webpages of a website using respective hyperlinks. Additionally or alternatively, the sessions may be (or include) predefined sessions such as database sessions, units of work, client or browser sessions, server sessions, remote sessions (e.g., remote desktop session, etc.), network sessions, web sessions, HTTP sessions, telnet remote login sessions, Session Initiation Protocol (SIP) sessions, Transport Control Protocol (TCP) sessions (e.g., a TCP virtual circuit, a TCP connection, or an established TCP socket), User Datagram Protocol (UDP) sessions, cellular network sessions, and/or the other type(s) of sessions. Events 108 are raised or triggered for one or more operations or actions performed during a session.

Individual events 108 are actions or occurrences recognized by a system, device, and/or software element, which may originate asynchronously from an external environment. Each event 108 may be or include a piece of information from an underlying framework and/or may represent the availability of data for reading a file or network stream. In various embodiments, individual events 108 identify or indicate information objects 112 and the user accessing the information objects 112. For example, an event 108 may include a URL or link to an information object 112 and may include an identifier (ID) associated with the user that access the indicated information object 112, such as a hashed email address or cookie identifier (ID) associated with the user. Events 108 may also identify an access activity associated with the indicated information objects 112. For example, an event 108 may indicate that the user viewed a webpage, downloaded an electronic document, registered for a seminar, and how the user completed these actions (e.g., referred from a search engine, a link in an email, typed a URL in a search bar of a web browser, and/or the like). Additionally or alternatively, events 108 may identify various user interactions with information objects 112 such as, for example, topic consumption, scroll velocity, dwell time, and/or other user interactions such as those discussed herein. In one example, the tags 110 may collect anonymized information about a visiting user's network address (e.g., IP address), an anonymized cookie ID, a timestamp of when the user visited or accessed an information object 112, and/or geo-location information associated with the user's computing device. In some embodiments, device fingerprinting can be used to track users, while in other embodiments, device fingerprinting may be excluded to preserver user anonymity. Additionally or alternatively, events 108 may be or include database session events, work unit events, client or browser session events, server session events, remote session events (e.g., remote desktop session events, etc.), network session events, web session events, HTTP session events, telnet remote login session events, SIP session events, TCP session events, UDP session events, cellular network events and/or other events of other session types.

CCM 100 builds user profiles 104 from events 108. User profiles 104 may include anonymous identifiers 105 that associate information objects 112 with particular users. User profiles 104 may also include intent data 106. Intent data 106 includes or indicates insights into users' interests and may include predictions about their potential to take certain actions based on their content consumption. The intent data 106 identifies or indicates topics 102 in information objects 112 accessed by the users. For example, intent data 106 may comprise a user intent vector (e.g., user intent vector 245 of FIG. 2, intent vector 594 of FIG. 5, etc.) that identifies or indicates the topics 102 and identifies levels of user interest in the topics 102.

This approach to intent data 106 collection makes possible a consistent and stable historical baseline for measuring content consumption. This baseline effectively spans the web, delivering at an exponential scale greater than any one site. In embodiments, the CCM 100 monitors content consumption behavior from a collection of service providers 118 (e.g., the aforementioned data co-op) and applies data science and/or ML techniques to identify changes in activity compared to the historical baselines. As examples, research frequency, depth of engagement, and content relevancy all contribute to measuring an org's interest in topic(s) 102. In some embodiments, the CCM 100 may employ an NLP/NLU engine that reads, deciphers, and understands content across a taxonomy of intent topics 102 that grows on a periodic basis (e.g., monthly, weekly, etc.). The NLP/NLU engine may operate or execute the topic analysis models discussed previously.

As mentioned previously, service provider 118 may want to send an email announcing an electric car seminar to a particular contact segment 124 of users interested in electric cars. Service provider 118 may send information object(s) 114, such as the aforementioned email to CCM 100, and the CCM 100 identifies topics 102 in information object(s) 114. The CCM 100 compares content topics 102 with the intent data 106, and identifies user profiles 104 that indicate an interest in information object(s) 114. Then, the CCM 100 sends an anonymous contact segment 116 to service provider 118, which includes anonymized or pseudonymized identifiers 105 associated with the identified user profiles 104. In some embodiments, the CCM 100 includes an anonymizer or pseudonymizer, which is the same or similar to anonymizer 122, to anonymize or pseudonymize user identifiers.

Contact list 120 may include personally identifying information (PII) and/or personal data such as email addresses, names, phone numbers, or some other user identifier(s), or any combination thereof. Additionally or alternatively, the contact list 120 may include sensitive data and/or confidential information. The personal, sensitive, and/or confidential data in contact list 120 are anonymized or pseudonymized or otherwise de-identified by an anonymizer 122.

The anonymizer 122 may anonymize or pseudonymize any personal, sensitive, and/or confidential data using any number of data anonymization or pseudonymization techniques including, for example, data encryption, substitution, shuffling, number and date variance, and nulling out specific fields or data sets. Data encryption is an anonymization or pseudonymization technique that replaces personal/sensitive/confidential data with encrypted data. A suitable hash algorithm may be used as an anonymization or pseudonymization technique in some embodiments. Anonymization is a type of information sanitization technique that removes personal, sensitive, and/or confidential data from data or datasets so that the person or information described or indicated by the data/datasets remain anonymous. Pseudonymization is a data management and de-identification procedure by which personal, sensitive, and/or confidential data within information objects (e.g., fields and/or records, data elements, documents, etc.) is/are replaced by one or more artificial identifiers, or pseudonyms. In most pseudonymization mechanisms, a single pseudonym is provided for each replaced data item or a collection of replaced data items, which makes the data less identifiable while remaining suitable for data analysis and data processing. Although "anonymization" and "pseudonymization" refer to different concepts, these terms may be used interchangeably throughout the present disclosure.

The service provider 118 compares the anonymized/pseudonymized identifiers (e.g., hashed identifiers) from contact list 120 with the anonymous identifiers 105 in anonymous contact segment 116. Any matching identifiers are identified as contact segment 124. Service provider 118 identifies the unencrypted email addresses in contact list 120 associated with contact segment 124. Service provider 118 sends information object(s) 114 to the addresses (e.g., email addresses) identified for contact segment 124. For example, service provider 118 may send an email announcing the electric car seminar to contact segment 124.

Sending information object(s) 114 to contact segment 124 may generate a substantial lift in the number of positive responses 126. For example, assume service provider 118 wants to send emails announcing early bird specials for the upcoming seminar. The seminar may include ten different tracks, such as electric cars, environmental issues, renewable energy, etc. In the past, service provider 118 may have sent ten different emails for each separate track to everyone in contact list 120.

Service provider 118 may now only send the email regarding the electric car track to contacts identified in contact segment 124. The number of positive responses 126 registering for the electric car track of the seminar may substantially increase since content 114 is now directed to users interested in electric cars.

In another example, CCM 100 may provide local ad campaign or email segmentation. For example, CCM 100 may provide a "yes" or "no" as to whether a particular advertisement should be shown to a particular user. In this example, CCM 100 may use the hashed data without re-identification of users and the "yes/no" action recommendation may key off of a de-identified hash value.

CCM 100 may revitalize cold contacts in service provider contact list 120. CCM 100 can identify the users in contact list 120 that are currently accessing other information objects 112 and identify the topics associated with information objects 112. By monitoring accesses to information objects 112, CCM 100 may identify current user interests even though those interests may not align with the content currently provided by service provider 118. Service provider 118 might reengage the cold contacts by providing content 114 more aligned with the most relevant topics identified in information objects 112.

Figure 2:
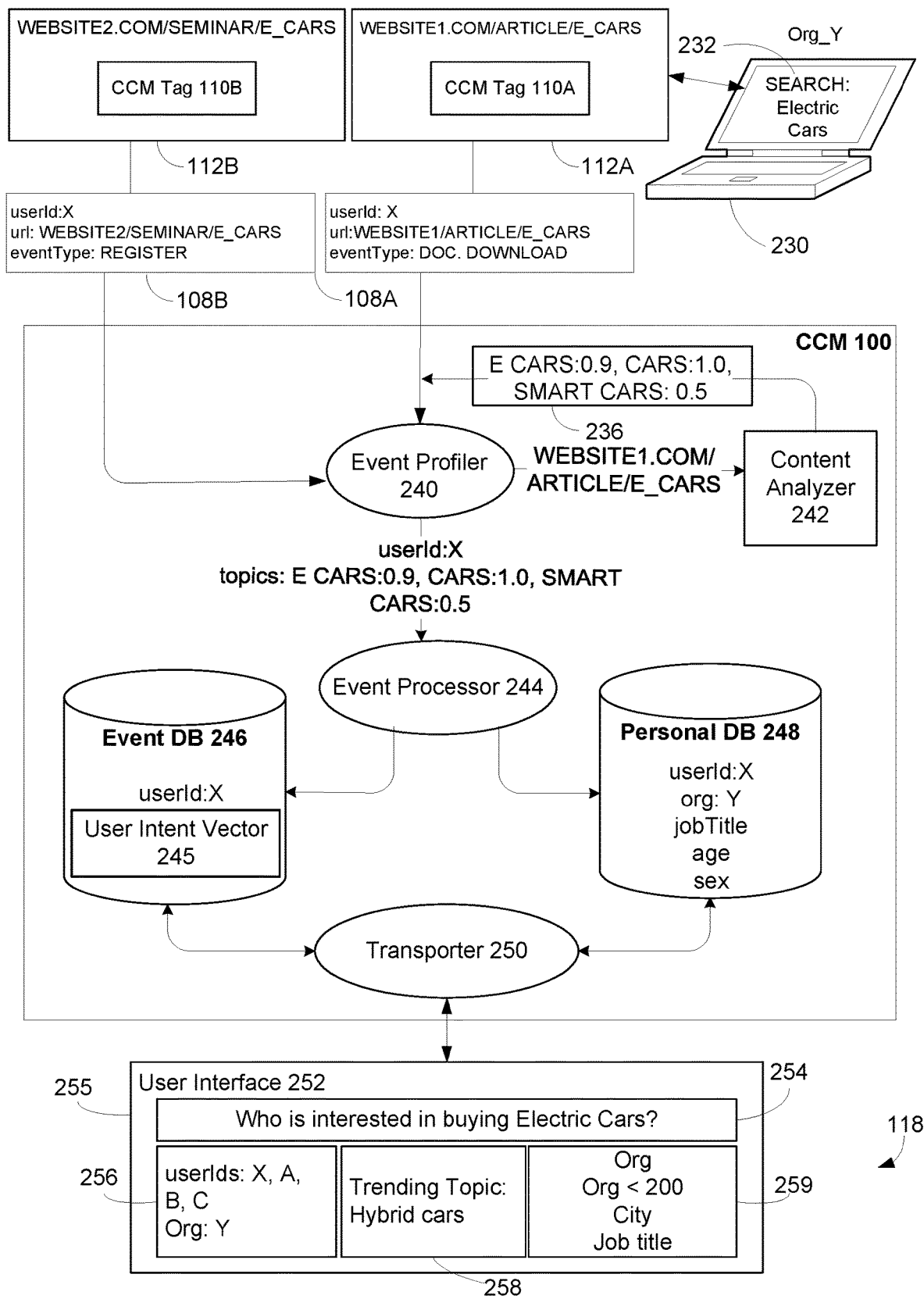
FIG. 2 depicts an example of the CCM in more detail.

FIG. 2 is a diagram explaining the content consumption manager in more detail. A user may enter a search query 232 into a computer 230, for example, via a search engine. The computer 230 may include any communication and/or processor circuitry including but not limited to desktop computers, workstations, laptop computers, smartphones, tablet computers, wearable devices, servers, smart appliances, network appliances, and/or the like, or any combination thereof. The user may work for an organization Y (org_Y). For example, the user may have an associated email address: user@org_y.com.

In response to search query 232, the search engine may display links or other references to information objects 112A and 112B on website1 and website2, respectively (note that website1 and website2 may also be respective information objects 112 or collections of information objects 112). The user may click on the link to website1, and website1 may download a webpage to a client app operated by computer 230 that includes a link to information object 112A, which may be a white paper in this example. Website1 may include one or more webpages with CCM tags 110A that capture different events 108 during a network session (e.g., web session) between website1 and computer 230 (or between website1 and the client app operated by computer 230). Website1 or another website may have downloaded a cookie onto a web browser operating on computer 230. The cookie may comprise an identifier X, such as a unique alphanumeric set of characters associated with the web browser on computer 230.

During the session with website1, the user of computer 230 may click on a link to white paper 112A. In response to the mouse click, CCM tag 110A may download an event 108A to CCM 100. Event 108A may identify the cookie identifier X loaded on the web browser of computer 230. In addition, or alternatively, CCM tag 110A may capture a user name and/or email address entered into one or more webpage fields during the session. CCM tag 110 hashes the email address and includes the hashed email address in event 108A. Any identifier associated with the user is referred to generally as user X or user ID.

CCM tag 110A may also include a link in event 108A to the white paper downloaded from website1 to computer 230. For example, CCM tag 110A may capture the URL for white paper 112A. CCM tag 110A may also include an event type identifier in event 108A that identifies an action or activity associated with information object 112A. For example, CCM tag 110A may insert an event type identifier into event 108A that indicates the user downloaded an electric document.

CCM tag 110A may also identify the launching platform for accessing information object 112B. For example, CCM tag 110B may identify a link www.searchengine.com to the search engine used for accessing website1.

An event profiler 240 in CCM 100 forwards the URL identified in event 108A to a content analyzer 242. Content analyzer 242 generates a set of topics 236 associated with or suggested by white paper 112A. For example, topics 236 may include electric cars, cars, smart cars, electric batteries, etc. Each topic 236 may have an associated relevancy score indicating the relevancy of the topic in white paper 112A. Content analyzers that identify topics in documents are known to those skilled in the art and are therefore not described in further detail.

Event profiler 240 forwards the user ID, topics 236, event type, and any other data from event 108A to event processor 244. Event processor 244 may store personal information captured in event 108A in a personal database 248. For example, during the session with website1, the user may have entered an employer company name into a webpage form field. CCM tag 110A may copy the employer company name into event 108A. Alternatively, CCM 100 may identify the company name from a domain name of the user email address.

Event processor 244 may store other demographic information from event 108A in personal database 248, such as user job title, age, sex, geographic location (postal address), etc. In one example, some of the information in personal database 248 is hashed, such as the user ID and or any other personally identifiable information. Other information in personal database 248 may be anonymous to any specific user, such as org name and job title.

Event processor 244 builds a user intent vector 245 from topic vectors (e.g., the set of topics 236 and/or the like). Event processor 244 continuously updates user intent vector 245 based on other received events 108. For example, the search engine may display a second link to website2 in response to search query 232. User X may click on the second link and website2 may download a webpage to computer 230 announcing the seminar on electric cars.

The webpage downloaded by website2 may also include a CCM tag 110B. User X may register for the seminar during the session with website2. CCM tag 110B may generate a second event 108B that includes the user ID: X, a URL link to the webpage announcing the seminar, and an event type indicating the user registered for the electric car seminar advertised on the webpage.

CCM tag 110B sends event 108B to CCM 100. Content analyzer 242 generates a second set of topics 236. Event 108B may contain additional personal information associated with user X. Event processor 244 may add the additional personal information to personal database 248.

Event processor 244 updates user intent vector 245 based on the second set of topics 236 identified for event 108B. Event processor 244 may add new topics to user intent vector 245 or may change the relevancy scores for existing topics. For example, topics identified in both event 108A and 108B may be assigned higher relevancy scores. Event processor 244 may also adjust relevancy scores based on the associated event type identified in events 108.

Service provider 118 may submit a search query 254 to CCM 100 via a user interface 252 on a computer 255. For example, search query 254 may ask "who is interested in buying electric cars?" A transporter 250 in CCM 100 searches user intent vectors 245 for electric car topics with high relevancy scores. Transporter 250 may identify user intent vector 245 for user X. Transporter 250 identifies user X and other users A, B, and C interested in electric cars in search results 256.

As mentioned above, the user IDs may be hashed and CCM 100 may not know the actual identities of users X, A, B, and C. CCM 100 may provide a segment of hashed user IDs X, A, B, and C to service provider 118 in response to query 254.

Service provider 118 may have a contact list 120 of users (see e.g., FIG. 1). Service provider 118 may hash email addresses in contact list 120 and compare the hashed identifiers with the encrypted or hashed user IDs X, A, B, and C. Service provider 118 identifies the unencrypted email address for matching user identifiers. Service provider 118 then sends information related to electric cars to the email addresses of the identified user segment. For example, service provider 118 may send emails containing white papers, advertisements, articles, announcements, seminar notifications, or the like, or any combination thereof.

CCM 100 may provide other information in response to search query 254. For example, event processor 244 may aggregate user intent vectors 245 for users employed by the same company Y into an org intent vector. The org intent vector for org Y may indicate a strong interest in electric cars. Accordingly, CCM 100 may identify org Y in search results 256. By aggregating user intent vectors 245, CCM 100 can identify the intent of a company or other category without disclosing any specific user personal information (e.g., without regarding a user's online browsing activity).

CCM 100 continuously receives events 108 for different third party content. Event processor 244 may aggregate events 108 for a particular time period, such as for a current day, for the past week, or for the past 30 days. Event processor 244 then may identify trending topics 258 within that particular time period. For example, event processor 244 may identify the topics with the highest average relevancy values over the last 30 days.

Different filters 259 may be applied to the intent data stored in event database 246. For example, filters 259 may direct event processor 244 to identify users in a particular company Y that are interested in electric cars. In another example, filters 259 may direct event processor 244 to identify companies with less than 200 employees that are interested in electric cars.

Filters 259 may also direct event processor 244 to identify users with a particular job title that are interested in electric cars or identify users in a particular city that are interested in electric cars. CCM 100 may use any demographic information in personal database 248 for filtering query 254.

CCM 100 monitors content accessed from multiple different third party websites. This allows CCM 100 to better identify the current intent for a wider variety of users, companies, or any other demographics. CCM 100 may use hashed and/or other anonymous identifiers to maintain user privacy. CCM 100 further maintains user anonymity by identifying the intent of generic user segments, such as companies, marketing groups, geographic locations, or any other user demographics.

Figure 3:
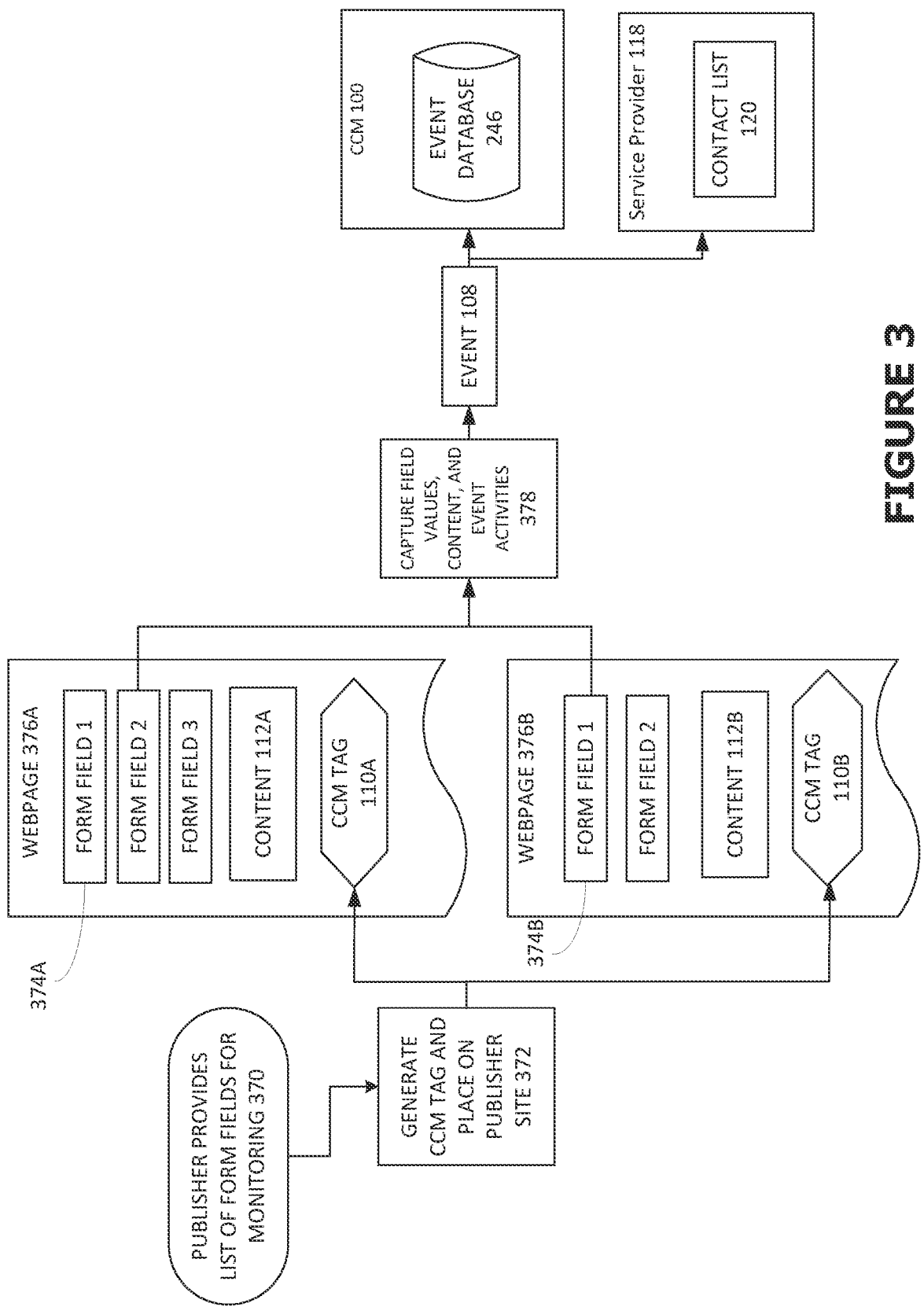
FIG. 3 depicts an example operation of a CCM tag.

FIG. 3 depicts example operations performed by CCM tags 110 according to various embodiments. In operation 370, a service provider 118 provides a list of form fields 374A, 374B for monitoring on webpages 376A, 376B. In operation 372, CCM tags 110 are generated and loaded in webpages 376A, 376B on the service provider's 118 website. For example, CCM tag 110A is loaded onto a first webpage 376A of the service provider's 118 website and a CCM tag 110B is loaded onto a second webpage 376B of the service provider's 118 website. In one example, CCM tags 110 comprise JavaScript loaded into the webpage document object model (DOM).

The service provider 118 may download webpages 376A, 376B, along with CCM tags 110, to user computers (e.g., computer 230 of FIG. 2) during sessions. Additionally or alternatively, the CCM tags 110 may be executed when the user computers access and/or load the webpages 376A, 376B (e.g., within a browser, mobile app, or other client application). CCM tag 110A captures the data entered into some of form fields 374A and CCM tag 110B captures data entered into some of form fields 374B.

A user enters information into form fields 374A and 374B during the session. For example, the user may enter an email address into one of form fields 374A during a user registration process or a shopping cart checkout process. CCM tags 110 may capture the email address in operation 378, validate and hash the email address, and then send the hashed email address to CCM 100 in event 108.

CCM tags 110 may first confirm the email address includes a valid domain syntax and then use a hash algorithm to encode the valid email address string. CCM tags 110 may also capture other anonymous user identifiers, such as a cookie identifier. If no identifiers exist, CCM tag 110 may create a unique identifier. Other data may be captured as well, such as client app data, data mined from other applications, and/or other data from the user computers.

CCM tags 110 may capture any information entered into fields 374. For example, CCM tags 110 may also capture user demographic data, such as organization (org) name, age, sex, postal address, etc. In one example, CCM tags 110 capture some the information for service provider contact list 120.

CCM tags 110 may also identify information object 112 and associated event activities in operation 378. For example, CCM tag 110A may detect a user downloading the white paper 112A or registering for a seminar (e.g., through an online form or the like hosted by website1 or some other website or web app). CCM tag 110A captures the URL for white paper 112A and generates an event type identifier that identifies the event as a document download.

Depending on the application, CCM tag 110 in operation 378 sends the captured web session information in event 108 to service provider 118 and/or to CCM 100. For example, event 108 is sent to service provider 118 when CCM tag 110 is used for generating service provider contact list 120. In another example, the event 108 is sent to CCM 100 when CCM tag 110 is used for generating intent data.

CCM tags 110 may capture session information in response to the user leaving webpage 376, existing one of form fields 374, selecting a submit icon, moussing out of one of form fields 374, mouse clicks, an off focus, and/or any other user action. Note again that CCM 100 might never receive personally identifiable information (PII) since any PII data in event 108 is hashed by CCM tag 110.

Figure 4:
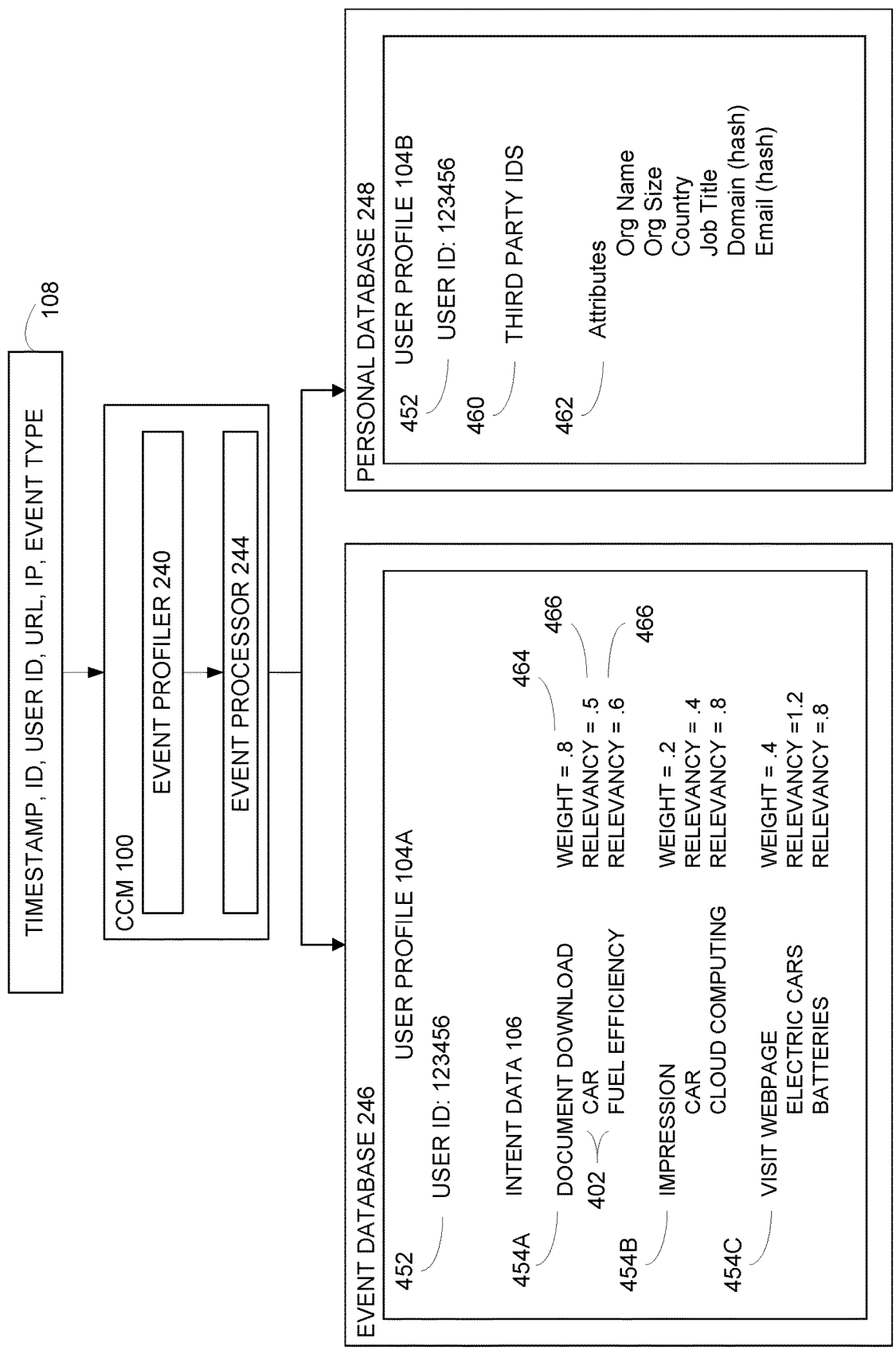
FIG. 4 depicts example events processed by the CCM.

FIG. 4 is a diagram showing how the CCM generates intent data 106 according to various embodiments. As mentioned previously, a CCM tag 110 may send a captured raw event 108 to CCM 100. For example, the CCM tag 110 may send event 108 to CCM 100 in response to a user downloading a white paper. In this example, the event 108 may include a timestamp indicating when the white paper was downloaded, an identifier (ID) for event 108, a user ID associated with the user that downloaded the white paper, a URL for the downloaded white paper, and a network address for the launching platform for the content. Event 108 may also include an event type indicating, for example, that the user downloaded an electronic document.

Event profiler 240 and event processor 244 may generate intent data 106 from one or more events 108. Intent data 106 may be stored in a structured query language (SQL) database or non-SQL database. In one example, intent data 106 is stored in user profile 104A and includes a user ID 452 and associated event data 454 (including event data 454A, 454B, and 454C).

Event data 454A is associated with a user downloading a white paper. Event profiler 240 identifies a car topic 402 and a fuel efficiency topic 402 in the white paper. Event profiler 240 may assign a 0.5 relevancy value to the car topic and assign a 0.6 relevancy value to the fuel efficiency topic 402.

Event processor 244 may assign a weight value 464 to event data 454A. Event processor 244 may assign larger a weight value 464 to more assertive events, such as downloading the white paper. Event processor 244 may assign a smaller weight value 464 to less assertive events, such as viewing a webpage. Event processor 244 may assign other weight values 464 for viewing or downloading different types of media, such as downloading a text, video, audio, electronic books, on-line magazines and newspapers, etc.

CCM 100 may receive a second event 108 for a second piece of content accessed by the same user. CCM 100 generates and stores event data 454B for the second event 108 in user profile 104A. Event profiler 240 may identify a first car topic with a relevancy value of 0.4 and identify a second cloud computing topic with a relevancy value of 0.8 for the content associated with event data 454B. Event processor 244 may assign a weight value of 0.2 to event data 454B.

CCM 100 may receive a third event 108 for a third piece of content accessed by the same user. CCM 100 generates and stores event data 454C for the third event 108 in user profile 104A. Event profiler 240 identifies a first topic associated with electric cars with a relevancy value of 1.2 and identifies a second topic associated with batteries with a relevancy value of 0.8. Event processor 244 may assign a weight value of 0.4 to event data 454C.

Event data 454 and associated weighting values 464 may provide a better indicator of user interests/intent. For example, a user may complete forms on a service provider website indicating an interest in cloud computing. However, CCM 100 may receive events 108 for third party content accessed by the same user. Events 108 may indicate the user downloaded a whitepaper discussing electric cars and registered for a seminar related to electric cars.

CCM 100 generates intent data 106 based on received events 108. Relevancy values 466 in combination with weighting values 464 may indicate the user is highly interested in electric cars. Even though the user indicated an interest in cloud computing on the service provider website, CCM 100 determined from the third party content that the user was actually more interested in electric cars.

CCM 100 may store other personal user information from events 108 in user profile 104B. For example, event processor 244 may store third party identifiers 460 and attributes 462 associated with user ID 452. Third party identifiers 460 may include user names or any other identifiers used by third parties for identifying user 452. Attributes 462 may include an org name (e.g., employer company name), org size, country, job title, hashed domain name, and/or hashed email addresses associated with user ID 452. Attributes 462 may be combined from different events 108 received from different websites accessed by the user. CCM 100 may also obtain different demographic data in user profile 104 from third party data sources (whether sourced online or offline).

An aggregator may use user profile 104 to update and/or aggregate intent data for different segments, such as service provider contact lists, companies, job titles, etc. The aggregator may also create snapshots of intent data 106 for selected time periods.

Event processor 244 may generate intent data 106 for both known and unknown users. For example, the user may access a webpage and enter an email address into a form field in the webpage. A CCM tag 110 captures and hashes the email address and associates the hashed email address with user ID 452.

The user may not enter an email address into a form field. Alternatively, the CCM tag 110 may capture an anonymous cookie ID in event 108. Event processor 244 then associates the cookie ID with user identifier 452. The user may clear the cookie or access data on a different computer. Event processor 244 may generate a different user identifier 452 and new intent data 106 for the same user.

The cookie ID may be used to create a de-identified cookie data set. The de-identified cookie data set then may be integrated with ad platforms or used for identifying destinations for target advertising.

CCM 100 may separately analyze intent data 106 for the different anonymous user IDs. If the user ever fills out a form providing an email address, event processor then may re-associate the different intent data 106 with the same user identifier 452.

Figure 5:
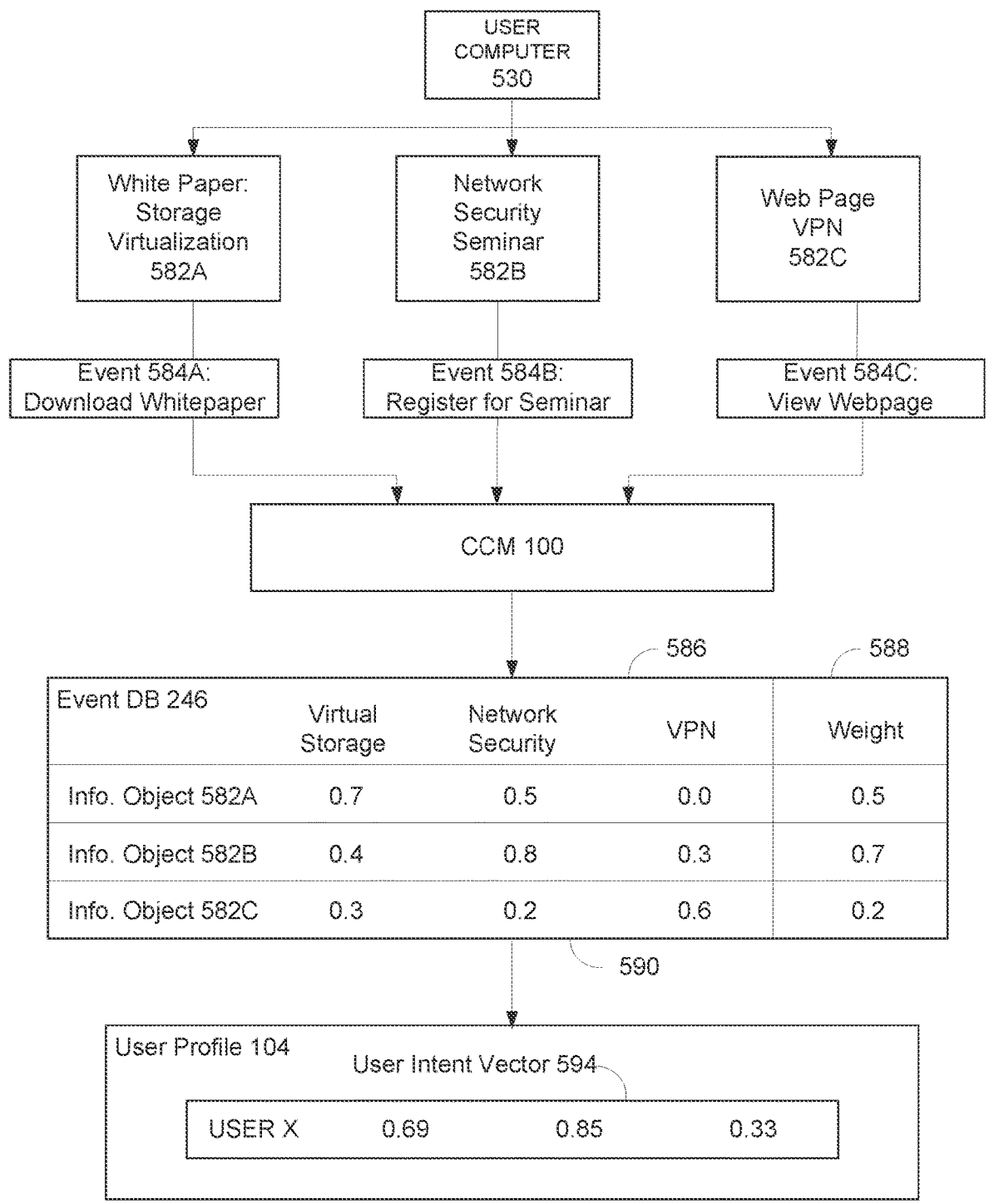
FIG. 5 depicts an example user intent vector.

FIG. 5 depicts an example of how the CCM 100 generates a user intent vector 594 from the event data described previously in FIG. 4 according to various embodiments. The user intent vector 594 may be the same or similar as user intent vector 245 of FIG. 2. A user may use computer 530 (which may be the same or similar to the computer 230 of FIG. 2) to access different information objects 582 (including information objects 582A, 582B, and 582C, and also referred to as "content 582"). For example, the user may download an information object 282A (e.g., a white paper associated with storage virtualization), register for a network security seminar on an information object 582B (e.g., a webpage with form fields), and view an information object 582C (e.g., a webpage article related to virtual private networks (VPNs)). As examples, information objects 582A, 582B, and 582C may come from the same website or come from different websites.

The CCM tags 110 capture three events 584A, 584B, and 584C associated with information objects 582A, 582B, and 582C, respectively. CCM 100 identifies topics 586 in content 582A, 582B, and/or 582C. Topics 586 include virtual storage, network security, and VPNs. CCM 100 assigns relevancy values 590 to topics 586 based on known algorithms. For example, relevancy values 590 may be assigned based on the number of times different associated keywords are identified in content 582.

CCM 100 assigns weight values 588 to content 582 based on the associated event activity. For example, CCM 100 assigns a relatively high weight value of 0.7 to a more assertive off-line activity, such as registering for the network security seminar. CCM 100 assigns a relatively low weight value of 0.2 to a more passive on-line activity, such as viewing the VPN webpage.

CCM 100 generates a user intent vector 594 in user profile 104 based on the relevancy values 590. For example, CCM 100 may multiply relevancy values 590 by the associated weight values 588. CCM 100 then may sum together the weighted relevancy values for the same topics to generate user intent vector 594.

CCM 100 uses intent vector 594 to represent a user, represent content accessed by the user, represent user access activities associated with the content, and effectively represent the intent/interests of the user. In another embodiment, CCM 100 may assign each topic in user intent vector 594 a binary score of 1 or 0. CCM 100 may use other techniques for deriving user intent vector 594. For example, CCM 100 may weigh the relevancy values based on timestamps.

Figure 6:
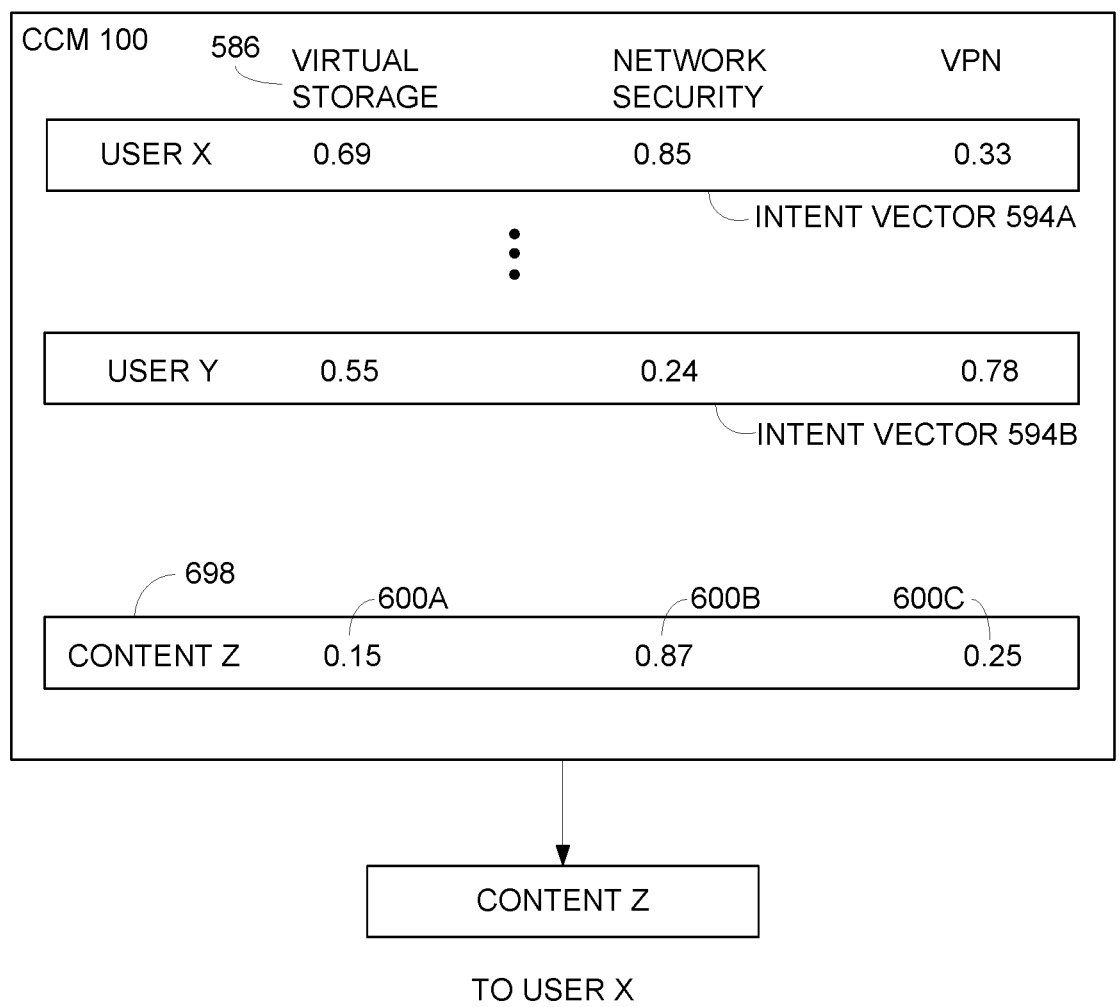
FIG. 6 depicts an example process for segmenting users.

FIG. 6 depicts an example of how the CCM 100 segments users according to various embodiments. CCM 100 may generate user intent vectors 594A and 594B for two different users, including user X and user Y in this example. A service provider 118 may want to email content 698 to a segment of interested users. The service provider submits content 698 to CCM 100. CCM 100 identifies topics 586 and associated relevancy values 600 (including relevancy values 600A, 600B, and 600C) for content Z 698.

CCM 100 may use any variety of different algorithms to identify a segment of user intent vectors 594 associated with content 698. For example, relevancy value 600B indicates content 698 is primarily related to network security. CCM 100 may identify any user intent vectors 594 that include a network security topic with a relevancy value above a given threshold value.

In this example, assume the relevancy value threshold for the network security topic is 0.5. CCM 100 identifies user intent vector 594A as part of the segment of users satisfying the threshold value. Accordingly, CCM 100 sends the service provider of content 698 a contact segment that includes the user ID associated with user intent vector 594A. As mentioned above, the user ID may be a hashed email address, cookie ID, or some other encrypted or unencrypted identifier associated with the user.

In another example, CCM 100 calculates vector cross products between user intent vectors 594 and content 698. Any user intent vectors 594 that generate a cross product value above a given threshold value are identified by CCM 100 and sent to the service provider 118.

Figure 7:
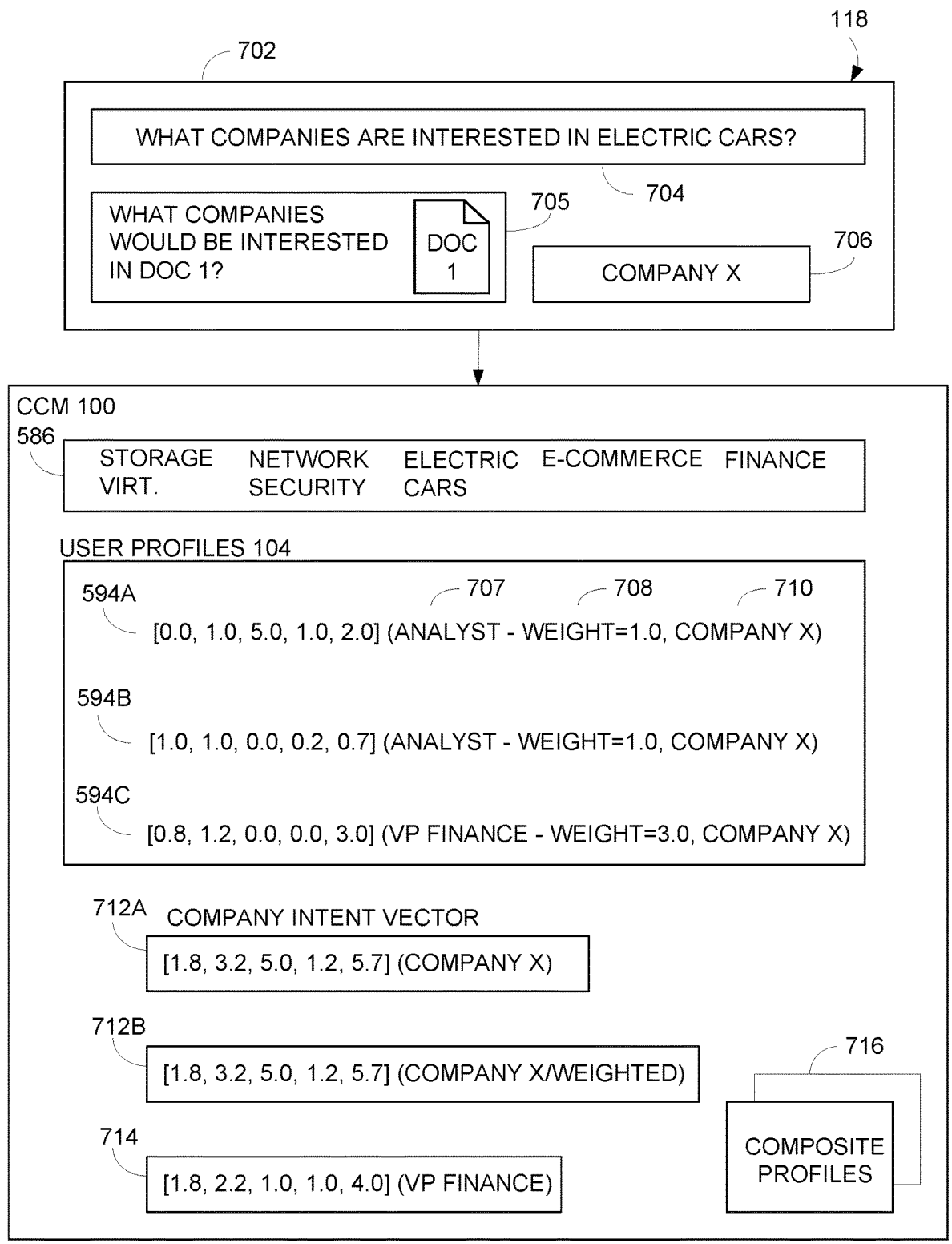
FIG. 7 depicts an example process for generating organization (org) intent vectors.

FIG. 7 depicts examples of how the CCM 100 aggregates intent data 106 according to various embodiments. In this example, a service provider 118 operating a computer 702 (which may be the same or similar as computer 230 and computer 530 of FIGS. 2 and 5) submits a search query 704 to CCM 100 asking what companies are interested in electric cars. In this example, CCM 100 associates five different topics 586 with user profiles 104. Topics 586 include storage virtualization, network security, electric cars, e-commerce, and finance.

CCM 100 generates user intent vectors 594 as described previously in FIG. 6. User intent vectors 594 have associated personal information, such as a job title 707 and an org (e.g., employer company) name 710. As explained above, users may provide personal information, such as employer name and job title in form fields when accessing a service provider 118 or third party website.

The CCM tags 110 described previously capture and send the job title and employer name information to CCM 100. CCM 100 stores the job title and employer information in the associated user profile 104. CCM 100 searches user profiles 104 and identifies three user intent vectors 594A, 594B, and 594C associated with the same employer name 710. CCM 100 determines that user intent vectors 594A and 594B are associated with a same job title of analyst and user intent vector 594C is associated with a job title of VP of finance.

In response to, or prior to, search query 704, CCM 100 generates a company intent vector 712A for company X. CCM 100 may generate company intent vector 712A by summing up the topic relevancy values for all of the user intent vectors 594 associated with company X.

In response to search query 704, CCM 100 identifies any company intent vectors 712 that include an electric car topic 586 with a relevancy value greater than a given threshold. For example, CCM 100 may identify any companies with relevancy values greater than 4.0. In this example, CCM 100 identifies Org X in search results 706.

In one example, intent is identified for a company at a particular zip code, such as zip code 11201. CCM 100 may take customer supplied offline data, such as from a Customer Relationship Management (CRM) database, and identify the users that match the company and zip code 11201 to create a segment.

In another example, service provider 118 may enter a query 705 asking which companies are interested in a document (DOC 1) related to electric cars. Computer 702 submits query 705 and DOC 1 to CCM 100. CCM 100 generates a topic vector for DOC 1 and compares the DOC 1 topic vector with all known company intent vectors 712A.

CCM 100 may identify an electric car topic in the DOC 1 with high relevancy value and identify company intent vectors 712 with an electric car relevancy value above a given threshold. In another example, CCM 100 may perform a vector cross product between the DOC 1 topics and different company intent vectors 712. CCM 100 may identify the names of any companies with vector cross product values above a given threshold value and display the identified company names in search results 706.

CCM 100 may assign weight values 708 for different job titles. For example, an analyst may be assigned a weight value of 1.0 and a vice president (VP) may be assigned a weight value of 7.0. Weight values 708 may reflect purchasing authority associated with job titles 707. For example, a VP of finance may have higher authority for purchasing electric cars than an analyst. Weight values 708 may vary based on the relevance of the job title to the particular topic. For example, CCM 100 may assign an analyst a higher weight value 708 for research topics.

CCM 100 may generate a weighted company intent vector 712B based on weighting values 708. For example, CCM 100 may multiply the relevancy values for user intent vectors 594A and 594B by weighting value 1.0 and multiply the relevancy values for user intent vector 594C by weighting value 3.0. The weighted topic relevancy values for user intent vectors 594A, 594B, and 594C are then summed together to generate weighted company intent vector 712B.

CCM 100 may aggregate together intent vectors for other categories, such as job title. For example, CCM 100 may aggregate together all the user intent vectors 594 with VP of finance job titles into a VP of finance intent vector 714. Intent vector 714 identifies the topics of interest to VPs of finance.

CCM 100 may also perform searches based on job title or any other category. For example, service provider 118 may enter a query LIST VPs OF FINANCE INTERESTED IN ELECTRIC CARS? The CCM 100 identifies all of the user intent vectors 594 with associated VP finance job titles 707. CCM 100 then segments the group of user intent vectors 594 with electric car topic relevancy values above a given threshold value.

CCM 100 may generate composite profiles 716. Composite profiles 716 may contain specific information provided by a particular service provider 118 or entity. For example, a first service provider 118 may identify a user as VP of finance and a second service provider 118 may identify the same user as VP of engineering. Composite profiles 716 may include other service provider 118 provided information, such as company size, company location, company domain.

CCM 100 may use a first composite profile 716 when providing user segmentation for the first service provider 118. The first composite profile 716 may identify the user job title as VP of finance. CCM 100 may use a second composite profile 716 when providing user segmentation for the second service provider 118. The second composite profile 716 may identify the job title for the same user as VP of engineering. Composite profiles 716 are used in conjunction with user profiles 104 derived from other third party content.

In yet another example, CCM 100 may segment users based on event type. For example, CCM 100 may identify all the users that downloaded a particular article, or identify all of the users from a particular company that registered for a particular seminar.

3. CONSUMPTION SCORING EMBODIMENTS

Figure 8:
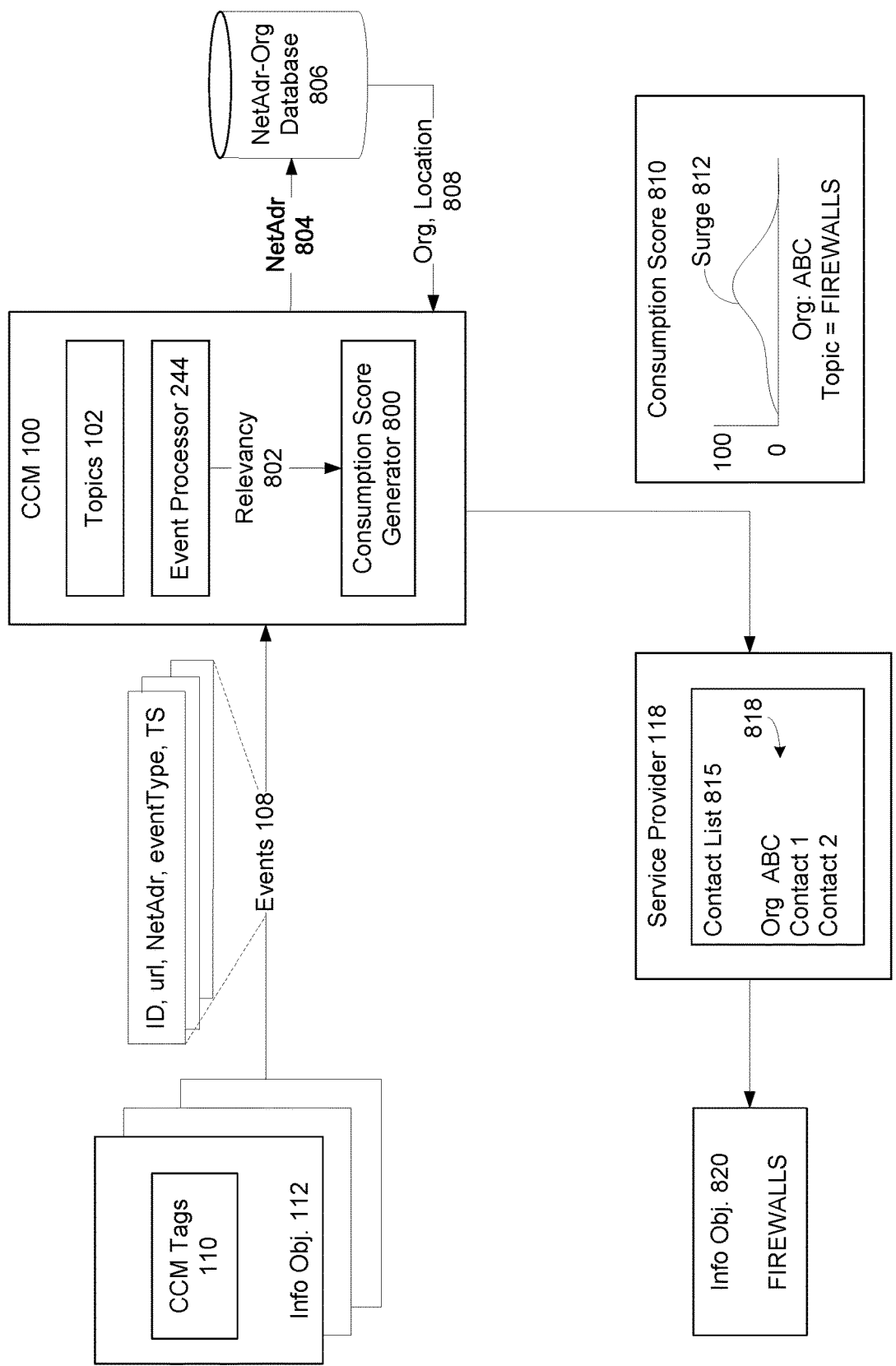
FIG. 8 depicts an example consumption score generator.

FIG. 8 depicts an example consumption score generator 800 used in CCM 100 according to various embodiments. As explained above, CCM 100 may receive multiple events 108 associated with different information objects 112. For example, users may use client apps (e.g., web browsers, or any other application) to access or view information objects 112 from different resources (e.g., on different websites). The information objects 112 may include any webpage, electronic document, article, advertisement, or any other information viewable or audible by a user such as those discussed herein. In this example, information objects 112 may include a webpage article or a document related to network firewalls.

CCM tag 110 may capture events 108 identifying information objects 112 accessed by a user during a network or application session. For example, events 108 may include various event data such as an identifier (ID) (e.g., a user ID (userId), an application session ID, a network session ID, a device ID, a product ID, electronic product code (EPC), serial number, RFID tag ID, and/or the like), URL, network address (NetAdr), event type (eventType), and a timestamp (TS). The ID field may carry any suitable identifier associated with a user and/or user device, associated with a network session, an application, an app session, an app instance, an app session, an app-generated identifier, and/or a CCM tag 110 may generated identifier. For example, when a user ID is used, the user ID may be a unique identifier for a specific user on a specific client app and/or a specific user device. Additionally or alternatively, the userId may be or include one or more of a user ID (UID) (e.g., positive integer assigned to a user by a Unix-like OS), effective user ID (euid), file system user ID (fsuid), saved user id (suid), real user id (mid), a cookie ID, a realm name, domain ID, logon user name, network credentials, social media account name, session ID, and/or any other like identifier associated with a particular user or device. The URL may be links, resource identifiers (e.g., Uniform Resource Identifiers (URIs)), or web addresses of information objects 112 accessed by the user during the session.

The NetAdr field includes any identifier associated with a network node. As examples, the NetAdr field may include any suitable network address (or combinations of network addresses) such as an internet protocol (IP) address in an IP network (e.g., IP version 4 (Ipv4), IP version 6 (IPv6), etc.), telephone numbers in a public switched telephone number, a cellular network address (e.g., international mobile subscriber identity (IMSI), mobile subscriber ISDN number (MSISDN), Subscription Permanent Identifier (SUPI), Temporary Mobile Subscriber Identity (TMSI), Globally Unique Temporary Identifier (GUTI), Generic Public Subscription Identifier (GPSI), etc.), an internet packet exchange (IPX) address, an X.25 address, an X.21 address, a port number (e.g., when using Transmission Control Protocol (TCP) or User Datagram Protocol (UDP)), a media access control (MAC) address, an Electronic Product Code (EPC) as defined by the EPCglobal Tag Data Standard, Bluetooth hardware device address (BD_ADDR), a Universal Resource Locator (URL), an email address, and/or the like. The NetAdr may be for a network device used by the user to access a network (e.g., the Internet, an enterprise network, etc.) and information objects 112.

As explained previously, the event type may identify an action or activity associated with information objects 112. In this example, the event type may indicate the user downloaded an electric document or displayed a webpage. The timestamp (TS) may identify a date and/or time the user accessed information objects 112, and may be included in the TS field in any suitable timestamp format such as those defined by ISO 8601 or the like.

Consumption score generator (CSG) 800 may access a NetAdr-Org database 806 to identify a company/entity and location 808 associated with NetAdr 804 in event 108. In one example, the NetAdr-Org database 806 may be a IP/company 806 when the NetAdr is a network address and the Orgs are entities such companies, enterprises, and/or the like. For example, existing services may provide databases 806 that identify the company and company address associated with network addresses. The NetAdr (e.g., IP address) and/or associated org may be referred to generally as a domain. CSG 800 may generate metrics from events 108 for the different companies 808 identified in database 806.

In another example, CCM tags 110 may include domain names in events 108. For example, a user may enter an email address into a webpage field during a web session. CCM 100 may hash the email address or strip out the email domain address. CCM 100 may use the domain name to identify a particular company and location 808 from database 806.

As also described previously, event processor 244 may generate relevancy scores 802 that indicate the relevancy of information objects 112 with different topics 102. For example, information objects 112 may include multiple words associate with topics 102. Event processor 244 may calculate relevancy scores 802 for information objects 112 based on the number and position words associated with a selected topic.

CSG 800 may calculate metrics from events 108 for particular companies 808. For example, CSG 800 may identify a group of events 108 for a current week that include the same NetAdr 804 associated with a same company and company location 808. CSG 800 may calculate a consumption score 810 for company 808 based on an average relevancy score 802 for the group of events 108. CSG 800 may also adjust the consumption score 810 based on the number of events 108 and the number of unique users generating the events 108.

CSG 800 generates consumption scores 810 for org 808 for a series of time periods. CSG 800 may identify a surge 812 in consumption scores 810 based on changes in consumption scores 810 over a series of time periods. For example, CSG 800 may identify surge 812 based on changes in content relevancy, number of unique users, number of unique user accesses for a particular information object, a number of events over one or more time periods (e.g., several weeks), a number of particular types of user interactions with a particular information object, and/or any other suitable parameters/criteria. It has been discovered that surge 812 corresponds with a unique period when orgs have heightened interest in a particular topic and are more likely to engage in direct solicitations related to that topic. The surge 812 (also be referred to as a "surge score 812" or the like) informs a service provider 118 when target orgs (e.g., org 808) are indicating active demand for the products or services that are offered by the service provider 118.

CCM 100 may send consumption scores 810 and/or any surge indicators 812 to service provider 118. Service provider 118 may store a contact list 815 that includes contacts 818 for org ABC. For example, contact list 815 may include email addresses or phone number for employees of org ABC. Service provider 118 may obtain contact list 815 from any source such as from a customer relationship management (CRM) system, commercial contact lists, personal contacts, third parties lead services, retail outlets, promotions or points of sale, or the like or any combination thereof.

In one example, CCM 100 may send weekly consumption scores 810 to service provider 118. In another example, service provider 118 may have CCM 100 only send surge notices 812 for companies on list 815 surging for particular topics 102.

Service provider 118 may send information object 820 related to surge topics to contacts 818. For example, the information object 820 sent by service provider 118 to contacts 818 may include email advertisements, literature, or banner ads related to firewall products/services. Alternatively, service provider 118 may call or send direct mailings regarding firewalls to contacts 818. Since CCM 100 identified surge 812 for a firewall topic at org ABC, contacts 818 at org ABC are more likely to be interested in reading and/or responding to content 820 related to firewalls. Thus, content 820 is more likely to have a higher impact and conversion rate when sent to contacts 818 of org ABC during surge 812.

In another example, service provider 118 may sell a particular product, such as firewalls. Service provider 118 may have a list of contacts 818 at org ABC known to be involved with purchasing firewall equipment. For example, contacts 818 may include the chief technology officer (CTO) and information technology (IT) manager at org ABC. CCM 100 may send service provider 118 a notification whenever a surge 812 is detected for firewalls at org ABC. Service provider 118 then may automatically send content 820 to specific contacts 818 at org ABC with job titles most likely to be interested in firewalls.

CCM 100 may also use consumption scores 810 for advertising verification. For example, CCM 100 may compare consumption scores 810 with advertising content 820 sent to companies or individuals. Advertising content 820 with a particular topic sent to companies or individuals with a high consumption score or surge for that same topic may receive higher advertising rates.

Figure 9:
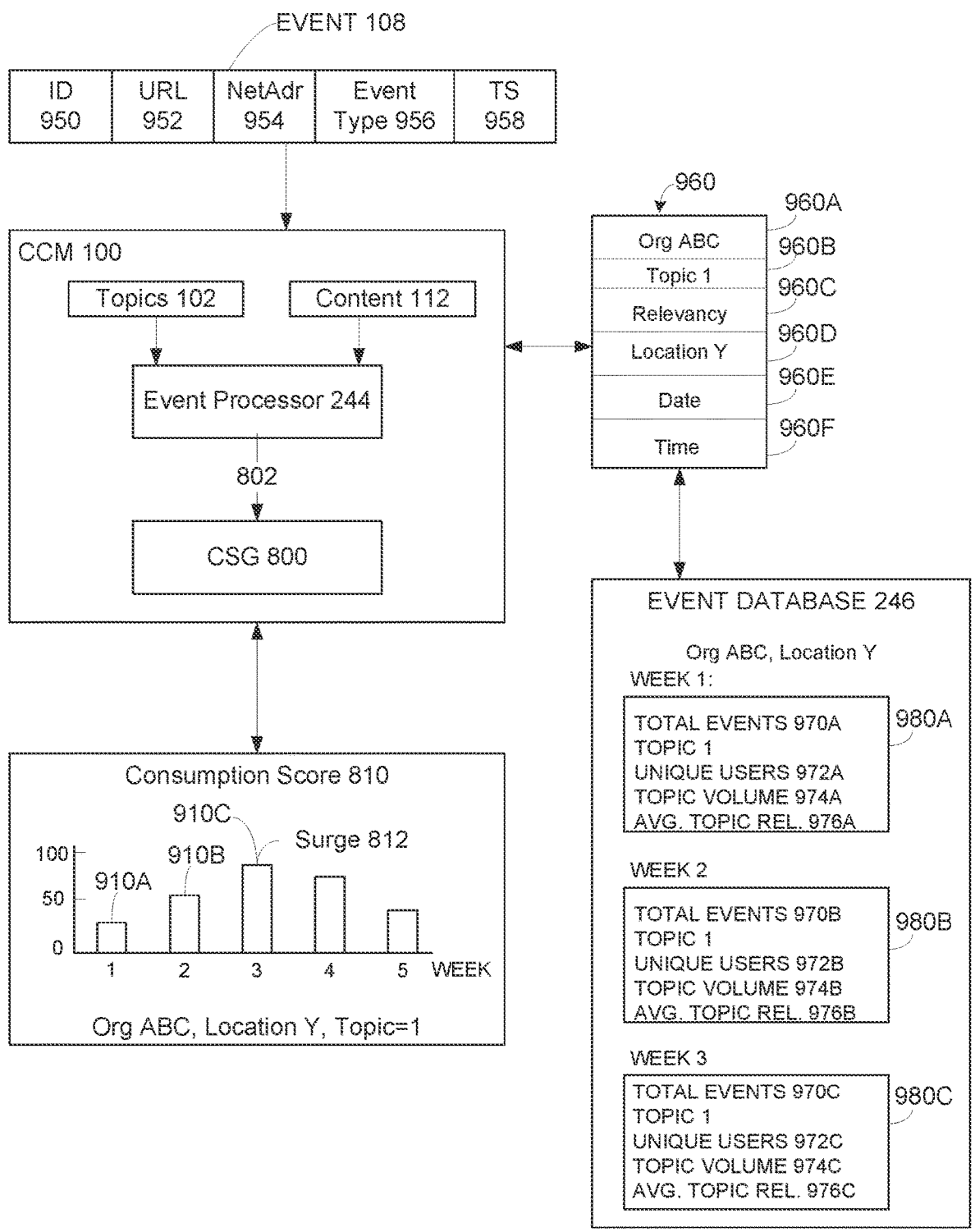
FIG. 9 depicts the example consumption score generator in more detail.

FIG. 9 shows a more detailed example of how the CCM 100 generates consumption scores 810 according to various embodiments. CCM 100 may receive millions of events 108 from millions of different users associated with thousands of different domains every day. CCM 100 may accumulate the events 108 for different time periods, such as daily, weekly, monthly, or the like. Week time periods are just one example and CCM 100 may accumulate events 108 for any selectable time period. CCM 100 may also store a set of topics 102 for any selectable subject matter. CCM 100 may also dynamically generate some of topics 102 based on the content identified in events 108 as described previously.

Events 108 as mentioned previously, and as shown by FIG. 9, may include an identifier (ID) 950 (e.g., a user ID, session ID, device ID, product ID/code, serial number, and/or the like), URL 952, network address 954, event type 956, and timestamp 958 (which may be collectively referred to as "event data" or the like). Event processor 244 identifies information objects 112 located at URL 954 and selects one of topics 102 for comparing with information objects 112. Event processor 244 may generate an associated relevancy score 802 indicating a relevancy of information objects 112 to selected topic 102. Relevancy score 802 may alternatively be referred to as a "topic score" or the like.

CSG 800 generates consumption data 960 from events 108. For example, CSG 800 may identify or determine an org 960A (e.g., "Org ABC" in FIG. 9) associated with network address 954. CSG 800 also calculates a relevancy score 960C between information objects 112 and the selected topic 960B. CSG 800 also identifies or determines a location 960D for with company 960A and identify a date 960E and time 960F when event 108 was detected.

CSG 800 generates consumption metrics 980 from consumption data 960. For example, CSG 800 may calculate a total number of events 970A associated with org 960A (e.g., Org ABC) and location 960D (e.g., location Y) for some or all topics during a first time period (e.g., first week (week 1)), a second time period (e.g., second week (week 2)), and/or a third time period (e.g., third week (week 3)). CSG 800 also calculates the number of unique users 972A generating the events 108 associated with org ABC and topic 960B for the first week, the number of unique users 972B generating the events 108 associated with org ABC and topic 960B for the second week, and/or the number of unique users 972C generating the events 108 associated with org ABC and topic 960B for the third week. For example, CSG 800 may calculate, for topic 960B, a total number of events generated by org ABC for the first week (e.g., topic volume 974A), for the second week (e.g., topic volume 974B), and/or for the third week (e.g., topic volume 974C). CSG 800 may also calculate an average topic relevancy scores 976A, 976B, and 976C for the content accessed by org ABC and associated with topic 960B during the respective time periods. CSG 800 may generate consumption metrics 980A, 980B, 980C for sequential time periods, such as for the three consecutive weeks.

CSG 800 may generate consumption scores 910 (e.g., consumption scores 910A, 910B, and 910C) based on consumption metrics 980A-980C. For example, CSG 800 may generate a first consumption score 910A for week 1 and generate a second consumption score 910B for week 2 based in part on changes between consumption metrics 980A for week 1 and consumption metrics 980B for week 2. CSG 800 may generate a third consumption score 910C for week 3 based in part on changes between consumption metrics 980A, 980B, and 980C for weeks 1, 2, and 3, respectively. In one example, any consumption score 910 above as threshold value is identified as a surge 812.

Additionally or alternatively, the consumption metrics 980 may include metrics such as topic consumption by interactions, topic consumption by unique users, Topic relevancy weight, and engagement. Topic consumption by interactions is the number of interactions from an org in a given time period compared to a larger time period of historical data, for example, the number of interactions in a previous three week period compared to a previous 12 week period of historical data. Topic consumption by unique users refers to the number of unique individuals from an org researching relevant topics in a given time period compared to a larger time period of historical data, for example, the number of individuals from an org researching relevant topic in a previous three week period compared to a previous 12 week period of historical data. Topic relevancy weight refers to a measure of a content piece's 'denseness' in a topic of interest such as whether the topic is the focus of the content piece or sparsely mentioned in the content piece. Engagement refers to the depth of an org's engagement with the content, which may be based on an aggregate of engagement of individual users associated with the org. The engagement may be measured based on the user interactions with the information object such as by measuring dwell time, scroll velocity, scroll depth, and/or any other suitable user interactions such as those discussed herein.

Figure 10:
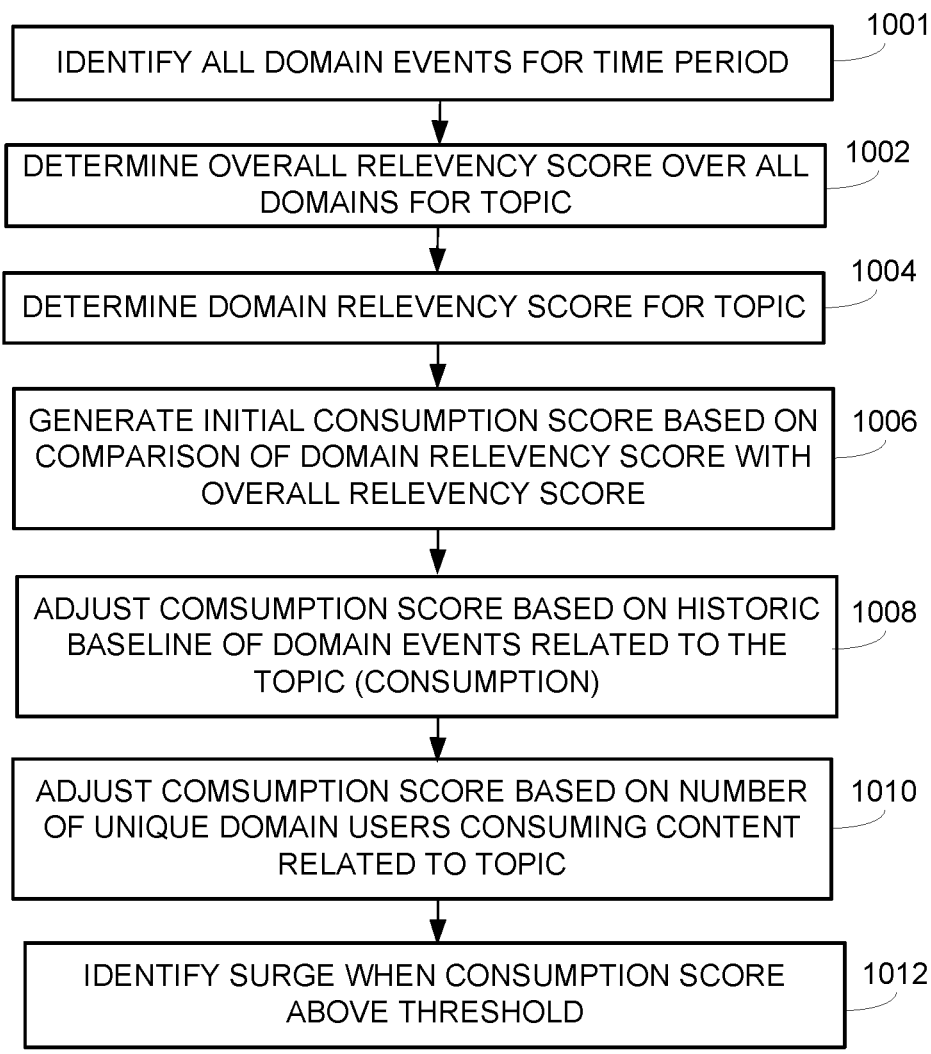
FIG. 10 depicts an example process for identifying a surge in consumption scores.

FIG. 10 depicts a process for identifying a surge in consumption scores according to various embodiments. In operation 1001, the CCM 100 identifies all domain events for a given time period. For example, for a current week the CCM 100 may accumulate all of the events for every network address (e.g., IP address, domain, or the like) associated with every topic 102.

The CCM 100 may use thresholds to select which domains to generate consumption scores. For example, for the current week the CCM 100 may count the total number of events for a particular domain (domain level event count (DEC)) and count the total number of events for the domain at a particular location (metro level event count (DMEC)).

The CCM 100 calculates the consumption score for domains with a number of events more than a threshold (DEC>threshold). The threshold can vary based on the number of domains and the number of events. The CCM 100 may use the second DMEC threshold to determine when to generate separate consumption scores for different domain locations. For example, the CCM 100 may separate subgroups of org ABC events for the cities of Atlanta, New York, and Los Angeles that have each a number of events DMEC above the second threshold.

In operation 1002, the CCM 100 determines an overall relevancy score for all selected domains for each of the topics. For example, the CCM 100 for the current week may calculate an overall average relevancy score for all domain events associated with the firewall topic.

In operation 1004, the CCM 100 determines a relevancy score for a specific domain. For example, the CCM 100 may identify a group of events 108 having a same network address associated with org ABC. The CCM 100 may calculate an average domain relevancy score for the org ABC events associated with the firewall topic.

In operation 1006, the CCM 100 generates an initial consumption score based on a comparison of the domain relevancy score with the overall relevancy score. For example, the CCM 100 may assign an initial low consumption score when the domain relevancy score is a certain amount less than the overall relevancy score. The CCM 100 may assign an initial medium consumption score larger than the low consumption score when the domain relevancy score is around the same value as the overall relevancy score. The CCM 100 may assign an initial high consumption score larger than the medium consumption score when the domain relevancy score is a certain amount greater than the overall relevancy score. This is just one example, and the CCM 100 may use any other type of comparison to determine the initial consumption scores for a domain/topic.

In operation 1008, the CCM 100 adjusts the consumption score based on a historic baseline of domain events related to the topic. This is alternatively referred to as consumption. For example, the CCM 100 may calculate the number of domain events for org ABC associated with the firewall topic for several previous weeks.

The CCM 100 may reduce the current week consumption score based on changes in the number of domain events over the previous weeks. For example, the CCM 100 may reduce the initial consumption score when the number of domain events fall in the current week and may not reduce the initial consumption score when the number of domain events rises in the current week.

In operation 1010, the CCM 100 further adjusts the consumption score based on the number of unique users consuming content associated with the topic. For example, the CCM 100 for the current week may count the number of unique user IDs (unique users) for org ABC events associated with firewalls. The CCM 100 may not reduce the initial consumption score when the number of unique users for firewall events increases from the prior week and may reduce the initial consumption score when the number of unique users drops from the previous week.

In operation 1012, the CCM 100 identifies or determines surges based on the adjusted weekly consumption score. For example, the CCM 100 may identify a surge when the adjusted consumption score is above a threshold.

Figure 11:
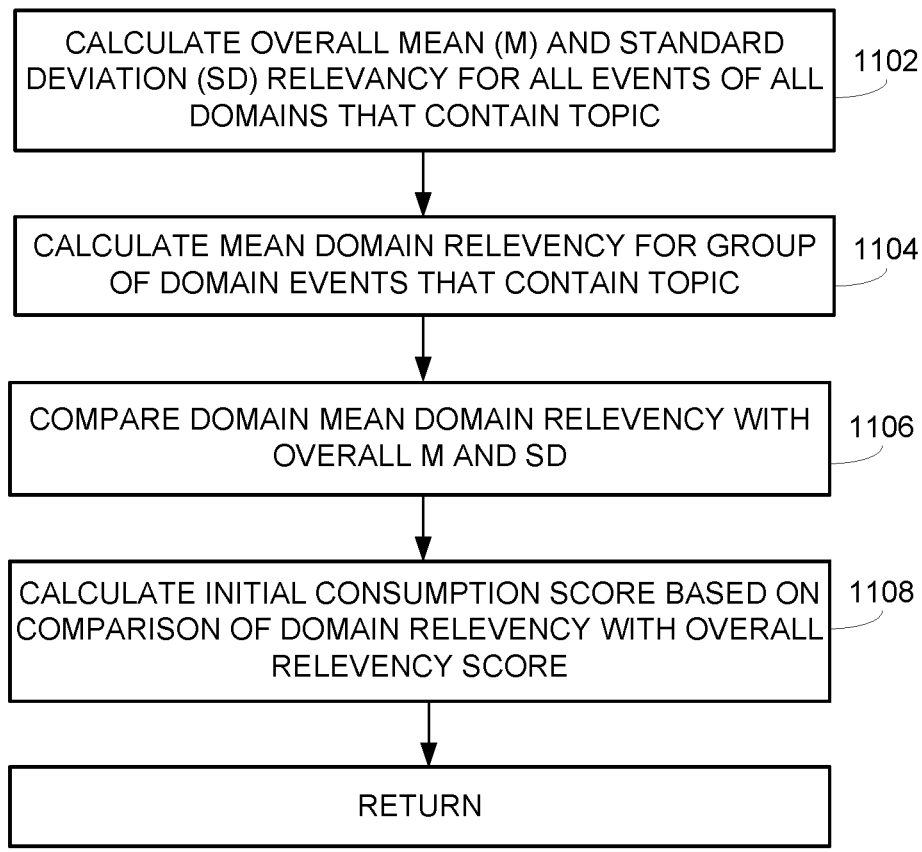
FIG. 11 depicts an example process for calculating initial consumption scores.

FIG. 11 depicts in more detail the process for generating an initial consumption score according to various embodiments. It should be understood this is just one example scheme and a variety of other schemes may also be used in other embodiments.

In operation 1102, the CCM 100 calculates an arithmetic mean (M) and standard deviation (SD) for each topic over all domains. The CCM 100 may calculate M and SD either for all events for all domains that contain the topic, or alternatively for some representative (big enough) subset of the events that contain the topic. The CCM 100 may calculate the overall mean and standard deviation according to the following equations:

$$M = \frac{1}{n} * \sum_{1}^{n} x_i \quad \text{[Equation 1]}$$

$$SD = \sqrt{\frac{1}{n-1} \sum_{1}^{n} (x_i - M)^2} \quad \text{[Equation 2]}$$

Equation 1 may be used to determine a mean and equation may be used to determine a standard deviation (SD). In equations 1 and 2, $x_i$ is a topic relevancy, and n is a total number of events.

In operation 1104, the CCM 100 calculates a mean (average) domain relevancy for each group of domain and/or domain/metro events for each topic. For example, for the past week the CCM 100 may calculate the average relevancy for org ABC events for firewalls.

In operation 1106, the CCM 100 compares the domain mean relevancy (DMR) with the overall mean (M) relevancy and over standard deviation (SD) relevancy for all domains. For example, the CCM 100 may assign at least one of three different levels to the DMR as shown by table 1.

TABLE 1

| | | |
|---|---|---|
| Low | DMR < M − 0.5 * SD | ~33% of all values |
| Medium | M − 0.5 * SD < DMR < M + 0.5 * SD | ~33% of all values |
| High | DMR > M + 0.5 * SD | ~33% of all values |

In operation 1108, the CCM 100 calculates an initial consumption score for the domain/topic based on the above relevancy levels. For example, for the current week the CCM 100 may assign one of the initial consumption scores shown by table 2 to the org ABC firewall topic. Again, this just one example of how the CCM 100 may assign an initial consumption score to a domain/topic.

TABLE 2

| Relevancy | Initial Consumption Score |
|---|---|
| High | 100 |
| Medium | 70 |
| Low | 40 |

Figure 12:
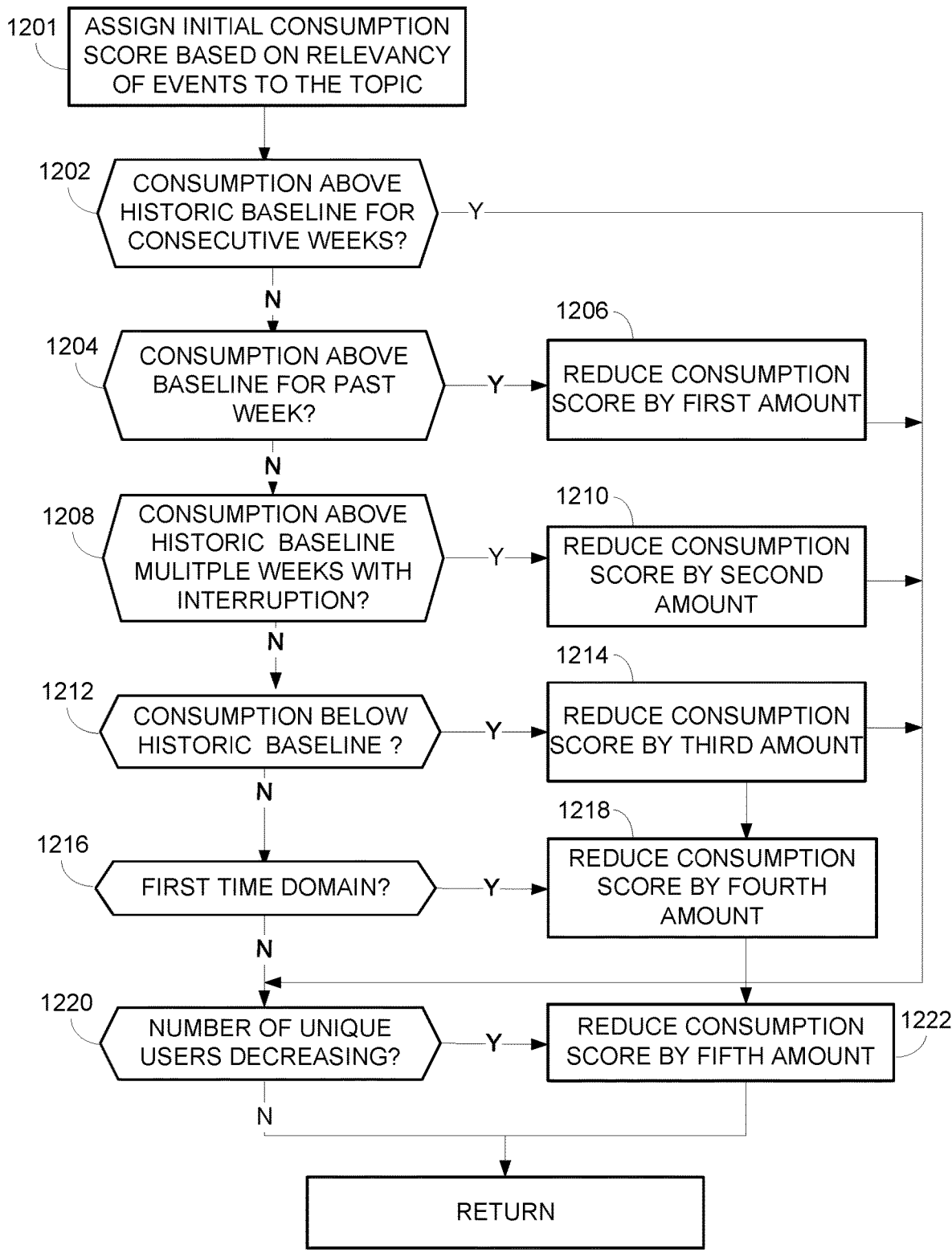
FIG. 12 depicts an example process for adjusting the initial consumption scores based on historic baseline events.

FIG. 12 depicts one example of how the CCM 100 may adjust the initial consumption score according to various embodiments. These are also just examples and the CCM 100 may use other schemes for calculating a final consumption score in other embodiments. In operation 1201, the CCM 100 assigns an initial consumption score to the domain/location/topic as described previously in FIG. 11.

The CCM 100 may calculate a number of events for domain/location/topic for a current week. The number of events is alternatively referred to as consumption. The CCM 100 may also calculate the number of domain/location/topic events for previous weeks and adjust the initial consumption score based on the comparison of current week consumption with consumption for previous weeks.

In operation 1202, the CCM 100 determines if consumption for the current week is above historic baseline consumption for previous consecutive weeks. For example, the CCM 100 may determine is the number of domain/location/topic events for the current week is higher than an average number of domain/location/topic events for at least the previous two weeks. If so, the CCM 100 may not reduce the initial consumption value derived in FIG. 11.

If the current consumption is not higher than the average consumption in operation 1202, the CCM 100 in operation 1204 determines if the current consumption is above a historic baseline for the previous week. For example, the CCM 100 may determine if the number of domain/location/topic events for the current week is higher than the average number of domain/location/topic events for the previous week. If so, the CCM 100 in operation 1206 reduces the initial consumption score by a first amount.

If the current consumption is not above than the previous week consumption in operation 1204, the CCM 100 in operation 1208 determines if the current consumption is above the historic consumption baseline but with interruption. For example, the CCM 100 may determine if the number of domain/location/topic events has fallen and then risen over recent weeks. If so, the CCM 100 in operation 1210 reduces the initial consumption score by a second amount.

If the current consumption is not above than the historic interrupted baseline in operation 1208, the CCM 100 in operation 1212 determines if the consumption is below the historic consumption baseline. For example, the CCM 100 may determine if the current number of domain/location/ topic events is lower than the previous week. If so, the CCM 100 in operation 1214 reduces the initial consumption score by a third amount.

If the current consumption is above the historic base line in operation 1212, the CCM 100 in operation 1216 determines if the consumption is for a first-time domain. For example, the CCM 100 may determine the consumption score is being calculated for a new company or for a company that did not previously have enough events to qualify for calculating a consumption score. If so, the CCM 100 in operation 1218 may reduce the initial consumption score by a fourth amount.

In one example, the CCM 100 may reduce the initial consumption score by the following amounts. The CCM 100 may use any values and factors to adjust the consumption score in other embodiments.

Consumption above historic baseline consecutive weeks (operation 1202).—0

Consumption above historic baseline past week (operation 1204).—20 (first amount).

Consumption above historic baseline for multiple weeks with interruption (operation 548)—30 (second amount).

Consumption below historic baseline (operation 1212).—40 (third amount).

First time domain (domain/metro) observed (operation 1216).—30 (fourth amount).

As explained above, the CCM 100 may also adjust the initial consumption score based on the number of unique users. The CCM tags 110 in FIG. 8 may include cookies placed in web browsers that have unique identifiers. The cookies may assign the unique identifiers to the events captured on the web browser. Therefore, each unique identifier may generally represent a web browser for a unique user. The CCM 100 may identify the number of unique identifiers for the domain/location/topic as the number of unique users. The number of unique users may provide an indication of the number of different domain users interested in the topic.

In operation 1220, the CCM 100 compares the number of unique users for the domain/location/topic for the current week with the number of unique users for the previous week. The CCM 100 may not reduce the consumption score if the number of unique users increases over the previous week. When the number of unique users decrease, the CCM 100 in operation 1222 may further reduce the consumption score by a fifth amount. For example, the CCM 100 may reduce the consumption score by 10.

The CCM 100 may normalize the consumption score for slower event days, such as weekends. Again, the CCM 100 may use different time periods for generating the consumption scores, such as each month, week, day, hour, etc. The consumption scores above a threshold are identified as a surge or spike and may represent a velocity or acceleration in the interest of a company or individual in a particular topic. The surge may indicate the company or individual is more likely to engage with a service provider 118 who presents content similar to the surge topic. The surge helps service providers 118 identify the orgs in active research mode for the service providers' 118 products/services so the service providers 118 can proactively coordinate sales and marketing activities around orgs with active intent, and/or obtain or deliver better results with highly targeted campaigns that focus on orgs demonstrating intent around a certain topic.

4. CONSUMPTION DNA

One advantage of domain-based surge detection is that a surge can be identified for an org without using personally identifiable information (PII), sensitive data, or confidential data of the org personnel (e.g., company employees). The CCM 100 derives the surge data based on an org's network address without using PII, sensitive data, or confidential data associated with the users generating the events 108.

In another example, the user may provide PII, sensitive data, and/or confidential data during network/web sessions. For example, the user may agree to enter their email address into a form prior to accessing content. As described previously, the CCM 100 may anonymize (e.g., hash, or the like) the PII, sensitive data, or confidential data and include the anonymized data either with org consumption scores or with individual consumption scores.

Figure 13:
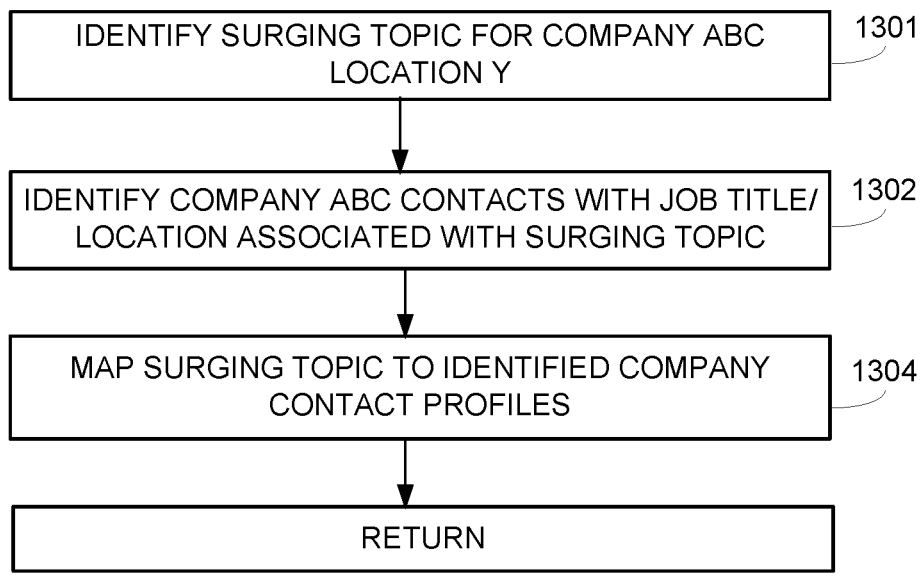
FIG. 13 depicts an example process for mapping surge topics with contacts.

FIG. 13 shows an example process for mapping domain consumption data to individuals according to various embodiments. In operation 1301, the CCM 100 identifies or determines a surging topic for an org (e.g., org ABC at location Y) as described previously. For example, the CCM 100 may identify a surge 812 for org ABC in New York for firewalls.

In operation 1302, the CCM 100 identifies or determines users associated with org ABC. As mentioned above, some org ABC personnel may have entered personal, sensitive, or confidential data, such as their office location and/or job titles into fields of webpages during events 108. In another example, a service provider 118 or other party may obtain contact information for employees of org ABC from CRM customer profiles or third party lists.

Either way, the CCM 100 or service provider 118 may obtain a list of employees/users associated with org ABC at location Y. The list may also include job titles and locations for some of the employees/users. The CCM 100 or service provider 118 may compare the surge topic with the employee job titles. For example, the CCM 100 or service provider may determine that the surging firewall topic is mostly relevant to users with a job title such as engineer, chief technical officer (CTO), or information technology (IT).

In operation 1304, the CCM 100 or service provider 118 maps the surging topic (e.g., firewall in this example) to profiles of the identified personnel of org ABC. In another example, the CCM 100 or service provider 118 may not be as discretionary and map the firewall surge to any user associated with org ABC. The CCM 100 or service provider then may direct content associated with the surging topic to the identified users. For example, the service provider may direct banner ads or emails for firewall seminars, products, and/or services to the identified users.

Consumption data identified for individual users is alternatively referred to as "Dino DNA" and the general domain consumption data is alternatively referred to as "frog DNA." Associating domain consumption and surge data with individual users associated with the domain may increase conversion rates by providing more direct contact to users more likely interested in the topic.

The example embodiments described herein provide improvements to the functioning of computing devices and computing networks by providing specific mechanisms of collecting network session events 118 from user devices (e.g., computers 230 and 1400 of FIGS. 2 and 14, and platform 1600 of FIG. 16), accessing information objects 112, 114, determining the amount of traffic individual websites receive from user devices at or related to a specific domain name or network addresses at specific periods of time, and identifying spikes (surges 812). The collected data can be used to analyze the cause of the surge (e.g., relevant topics in specific information objects 112, 114), which provides a specific improvement over prior systems, resulting in improved network/traffic monitoring capabilities and resource consumption efficiencies. The embodiments discussed herein allows for the discovery of information from extremely large amounts of data that was not previously possible in conventional computing architectures.

Identifying spikes (e.g., surges) in traffic in this way allows content providers to better serve their content to specific users. Serving content to numerous users (e.g., responding to network request for content and the like) without targeting can be computationally intensive and can consume large amounts of computing and network resources, at least from the perspective of content providers, service providers, and network operators. The improved network/traffic monitoring and resource efficiencies provided by the present claims is a technological improvement in that content providers, service providers, and network operators can reduce network and computational resource overhead associated with serving content to users by reducing the overall amount of content served to users by focusing on the relevant content. Additionally, the content providers, service providers, and network operators could use the improved network/traffic monitoring to better adapt the allocation of resources to serve users a peak times in order to smooth out their resource consumption over time.

5. INTENT MEASUREMENT

Figure 14:
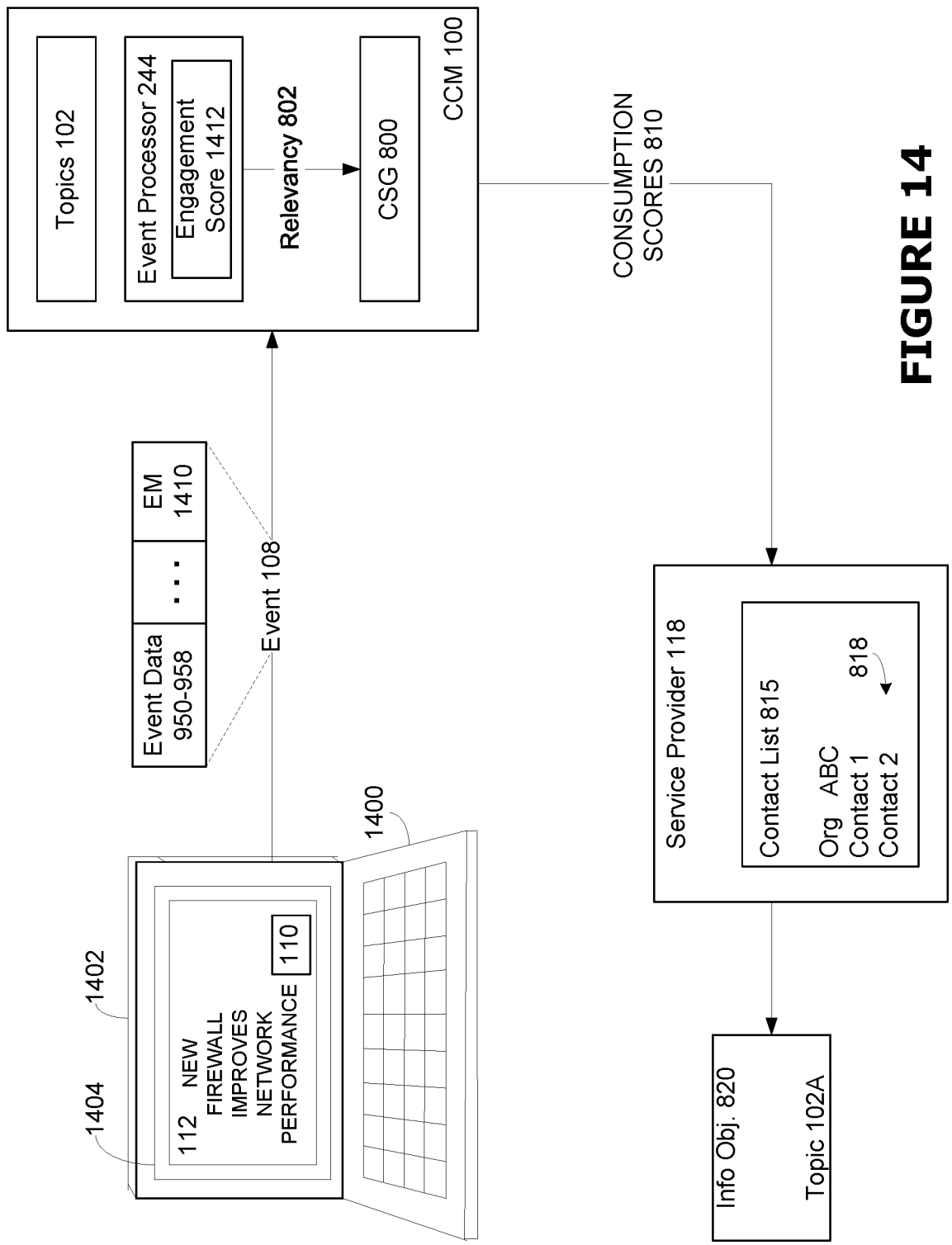
FIG. 14 depicts an example content consumption monitor calculating content intent.

FIG. 14 depicts how CCM 100 may calculate consumption scores based on user engagement. A computer 1400 may operate a client app 1404 (e.g., a browser, desktop/mobile app, etc.) to access information objects 112, for example, by sending appropriate HTTP messages or the like, and in response, server-side application(s) may dynamically generate and provide code, scripts, markup documents, and/or other information object(s) 112 to the client app 1404 to render and display information objects 112 within the client app 1404. As alluded to previously, information objects 112 may be a webpage or web app comprising a graphical user interface (GUI) including graphical control elements (GCEs) for accessing and/or interacting with a service provider (e.g., a service provider 118). The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; a platform-specific and/or proprietary development tool and/or programming languages; and/or any other like technology that renders HyperText Markup Language (HTML). The computer 1400 may be a laptop, smartphone, tablet, and/or any other device such as any of those discussed herein. In this example, a user may open the client app 1404 on a screen 1402 of computer 1400.

CCM tag 110 may operate within client app 1404 and monitor user web sessions. As explained previously, CCM tag 110 may generate events 108 for the web/network session that includes various event data 950-958 such as an ID 950 (e.g., a user ID, session ID, app ID, etc.), a URL 952 for accessed information objects 112, a network address 954 of a user/user device that accessed the information objects 112, an event type 956 that identifies an action or activity associated with the accessed information objects 112, and timestamp 958 of the events 108. For example, CCM tag 110 may add an event type identifier into event 108 indicating the user downloaded an information object 112. In some embodiments, the events 108 may include also include an engagement metrics (EM) field 1410 to include engagement metrics (the data field/data element that carries engagement metrics, and the engagement metrics themselves may be referred to herein as "engagement metrics 1410" or "EM 1410")

In one example, CCM tag 110 may generate a set of impressions, which is alternatively referred to as engagement metrics 1410, indicating actions taken by the user while consuming information objects 112 (e.g., user interactions). For example, engagement metrics 1410 may indicate how long the user dwelled on information objects 112, how the user scrolled through information objects 112, and/or the like. Engagement metrics 1410 may indicate a level of engagement or interest a user has in information objects 112. For example, the user may spend more time on the webpage and scroll through webpage at a slower speed when the user is more interested in the information objects 112.

In embodiments, the CCM 100 calculates an engagement score 1412 for information objects 112 based on engagement metrics 1410. CCM 100 may use engagement score 1412 to adjust a relevancy score 802 for information objects 112. For example, CCM 100 may calculate a larger engagement score 1412 when the user spends a larger amount of time carefully paging through information objects 112. CCM 100 then may increase relevancy score 802 of information objects 112 based on the larger engagement score 1412. CSG 800 may adjust consumption scores 910, 810 based on the increased relevancy score 802 to more accurately identify domain surge topics. For example, a larger engagement score 1412 may produce a larger relevancy score 802, which in turn produces a larger consumption score 910, 810. As mentioned previously, the CCM 100 can send consumption scores 810 to service provider 118, and the service provider 118 may store the contact list 815 that includes contacts 818 for org ABC. The service provider 118 can then send an information object 820 related to surge topics 102A to the indicated contacts 818.

Figure 15:
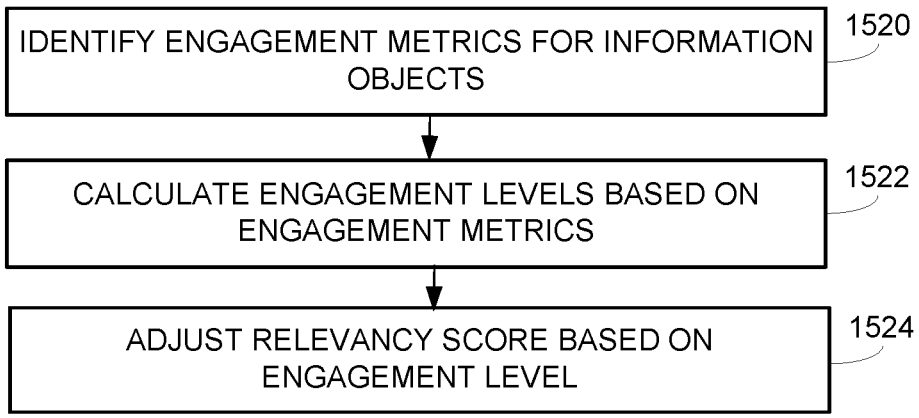
FIG. 15 depicts an example process for adjusting a consumption score based on content intent.

FIG. 15 depicts an example process for calculating the engagement score for content according to various embodiments. In operation 1520, the CCM 100 identifies or determines engagement metrics 1410 for information objects 112. In embodiments, the CCM 100 may receive events 108 that include content engagement metrics 1410 for one or more information objects 112. The engagement metrics 1410 for information objects 112 may be content impressions or the like. As examples, the engagement metrics 1410 may indicate any user interaction with information objects 112 including key presses, action selections, timer values and/or timer expiration indicators, tab selections that switch to different pages, page movements, mouse page scrolls, mouse clicks, mouse movements, scroll bar page scrolls, keyboard page movements, touch screen page scrolls, eye tracking data (e.g., gaze locations, gaze times, gaze regions of interest, eye movement frequency, speed, orientations, etc.), touch data (e.g., touch gestures, etc.), and/or any other content movement or content display indicator(s).

In operation 1522, the CCM 100 identifies or determines engagement levels based on the engagement metrics 1410. In one example at operation 1522, the CCM 100 identifies/determines a content dwell time. The dwell time may indicate how long the user actively views a page of content. In one example, tag 110 may stop a dwell time counter when the user changes page tabs or becomes inactive on a page. Tag 110 may start the dwell time counter again when the user starts scrolling with a mouse or starts tabbing. Additionally or alternatively at operation 1522, the CCM 100 identifies/determines, from the events 108, a scroll depth for the content. For example, the CCM 100 may determine how much of a page the user scrolled through or reviewed. In one example, the CCM tag 110 or CCM 100 may convert a pixel count on the screen into a percentage of the page. Additionally or alternatively at operation 1522, the CCM 100 identifies/determines an up/down scroll speed. For example, dragging a scroll bar may correspond with a fast scroll speed and indicate the user has less interest in the content. Using a mouse wheel to scroll through content may correspond with a slower scroll speed and indicate the user is more interested in the content. Additionally or alternatively at operation 1522, the CCM 100 identifies/determines various other aspects/levels of the engagement based on some or all of the engagement metrics 1410 such as any of those discussed herein. In some embodiments, the CCM 100 may assign higher values to engagement metrics 1410 (e.g., impressions) that indicate a higher user interest and assign lower values to engagement metrics that indicate lower user interest. For example, the CCM 100 may assign a larger value in operation 1522 when the user spends more time actively dwelling on a page and may assign a smaller value when the user spends less time actively dwelling on a page.

In operation 1524, the CCM 100 calculates the content engagement score 1412 based on the values derived in operations 1520-1522. For example, the CCM 100 may add together and normalize the different values derived in operations 1520-1522. Other operations may be performed on these values in other embodiments.

In operation 1526, the CCM 100 adjusts relevancy values (e.g., relevancy scores 802) described previously in FIGS. 1-14 based on the content engagement score 1412. For example, the CCM 100 may increase the relevancy values (e.g., relevancy scores 802) when the information object(s) 112 has/have a high engagement score and decrease the relevancy (e.g., relevancy scores 802) for a lower engagement scores.

CCM 100 or CCM tag 110 in FIG. 14 may adjust the values assigned in operations 1520-1524 based on the type of device 1400 used for viewing the content. For example, the dwell times, scroll depths, and scroll speeds, may vary between smartphone, tablets, laptops and desktop computers. CCM 100 or tag 110 may normalize or scale the engagement metric values so different devices provide similar relative user engagement results.

By providing more accurate intent data and consumptions scores in the ways discussed herein allows service providers 118 to conserve computational and network resources by providing a means for better targeting users so that unwanted and seemingly random content is not distributed to users that do not want such content. This is a technological improvement in that it conserves network and computational resources of service providers 118 and/or other organizations (orgs) that distribute this content by reducing the amount of content generated and sent to end-user devices. End-user devices may reduce network and computational resource consumption by reducing or eliminating the need for using such resources to obtain (download) and view unwanted content. Additionally, end-user devices may reduce network and computational resource consumption by reducing or eliminating the need to implement spam filters and reducing the amount of data to be processed when analyzing and/or deleting such content.

Furthermore, unlike conventional targeting technologies, the embodiments herein provide user targeting based on surges in interest with particular content, which allows service providers 118 to tailor the timing of when to send content to individual users to maximize engagement, which may include tailoring the content based on the determined locations. This allows content providers to spread out the content distribution over time. Spreading out content distribution reduces congestion and overload conditions at various nodes within a network, and therefore, the embodiments herein also reduce the computational burdens and network resource consumption on the content providers 118, content distribution platforms, and Internet Service Providers (ISPs) at least when compared to existing/conventional mass/bulk distribution technologies.

6. STRUCTURAL SEMANTICS

The relationships (e.g., links) between various information objects 112, and/or relationships between elements within information objects 112, are referred to as structural semantics. For example, the structural semantics may include the relationships between webpages making up an individual website, the relationships between webpages of multiple websites, and/or relationships between web components making up individual webpages.

In some implementations, a resource classifier uses these relationships to capture the structural semantics across all information objects 112 of a set of information objects 112. In one example, a bot, crawler, or other like entity systematically browses individual information objects 112 to identify what is conceptually equivalent to a language for a particular network. The bot/crawler may start from a particular node in an information object 112 and identify paths to other nodes.

The generated path is conceptually similar to a sentence of words, effectively representing an instance of a natural language structure for a network or set of information objects 112. Suitable word embedding techniques in NLP, such as Word2Vec (see e.g., Mikolov et al., "Efficient Estimation of Word Representations in Vector Space." arXiv preprint arXiv:1301.3781 (16 Jan. 2013), which hereby incorporated by reference in its entirety) are used to convert individual words found across numerous examples of sentences within a corpus of documents into low-dimensional vectors, capturing the semantic structure of their proximity to other words, as exists in human language. Similarly, website/network (graph) embedding techniques such as Large-scale Information Network Embedding (LINE), Graph Neural Network (GNN) such as DeepWalk (see e.g., Perozzi et al., "DeepWalk: Online Learning of Social Representations", arXiv:1403.6652v2 (27 Jun. 2014), available at: https://arxiv.org/pdf/1403.6652.pdf; 10 pages, which hereby incorporated by reference in its entirety), Graph-SAGE (see e.g., Hamilton et al., "Inductive Representation Learning on Large Graphs", arXiv:1706.02216v4 (10 Sep. 2018), which hereby incorporated by reference in its entirety), or the like can be used to convert sequences of information objects 112 found across a collection of information objects 112 (e.g., a collection of referenced websites) into low-dimensional vectors, capturing the semantic structure of their relationship to other pages.

The resource classifier then uses NLP technique(s) to convert the different paths into one or more structural semantic vectors (also referred to as "embeddings"). The resource classifier may generate structural semantic vectors for each information object 112 and feeds these vectors into a suitable ML model to classify the information objects 112. In one example where the information objects 112 are webpages, the resource classifier may combine the structural semantic vectors for the same website together via a summation to generate a website structural semantic vector. In this example, the resource classifier feeds this website vectors into a logistic regression model that then classifies the website as a particular type of website.

The resource classifier may classify the information objects 112 based on structural semantic features. Additionally, the resource classifier may generate and use additional features of the information objects 112 to classify the information objects 112. As examples, the features generated by the resource classifier may include but is not limited to the following.

Feature F1: Structural semantics generated based on the structural relationships between information objects 112 (e.g., between webpages provided by hyperlinks).

Feature F2: Content semantics. Content semantics F2 may capture the language and metadata semantics of content contained within information objects 112. For example, a trained NLP model may predict topics associated with the content. In addition, resource classifier can also identify content metadata, such as the breath of content, number of sections of content (e.g., number of pages, headers, section breaks, paragraphs, etc.), number of words in the content (e.g., word frequency or word count), position of words with respect to other words in the content, a number of topics in the content, number of changes in the content, and/or other types of metadata.

Content semantics F2 also may include any other data elements (e.g., HTML elements, XML elements, or the like) and/or attributes and parameters that may be associated with different types of information objects 112, such as iFrames, document object models (DOMs) nodes/elements, etc.

Feature F3: Topic Semantics. Topic semantics Business-to-Business (B2B) topics identify different business topics contained in the information objects 112. Identifying B2B topics and generating associated topic vectors is described previously (see e.g., discussion related to FIG. 2). For example, the CCM 100 may identify different business-related topics in individual information objects 112.

Feature F4: Content Interaction Behavior. Content interaction behavior is alternatively referred to as content consumption or content use. Content interaction behavior identifies patterns of user interaction/consumption of information objects 112. Types of user interaction/consumption reflected in feature F4 may include, but is not limited to time of day, day of week, total amount of content consumed/viewed by the user, device type, percentages of different device types used for accessing information objects 112, duration of time users spend on an information object 112 and total engagement user has on the information object 112, the number of distinct user profiles accessing the information object 112 vs. total number of events for the information object 112, dwell time, scroll depth, scroll velocity, variance in content consumption over time, tab selections that switch to different information objects 112, page movements, mouse page scrolls, mouse clicks, mouse movements, scroll bar page scrolls, keyboard page movements, touch screen page scrolls, eye tracking data (e.g., gaze locations, gaze times, gaze regions of interest, eye movement frequency, speed, orientations, etc.), touch data (e.g., touch gestures, etc.), and/or the like. Identifying different event types associated with these different user content interaction behaviors (consumption) and associated engagement scores is described in more detail previously. For example, resource classifier may generate the content interaction feature F4 based on the event types and engagement metrics identified in events 108 associated with each information object 112.

Feature F5: Entity Type. The entity type feature identifies types or locations of industries, companies, organizations, bot-based applications or users accessing the webpage. For example, CCM 100 may identify each user event 108 as associated with a particular enterprise, institution, mobile network operator, bots/crawls and/or other applications, and the like. Details on how to identify types of orgs and/or locations from which information objects 112 are accessed is described in U.S. application Ser. No. 17/153,673, titled "MACHINE LEARNING TECHNIQUES FOR ASSOCIATING NETWORK ADDRESSES WITH INFORMATION OBJECT ACCESS LOCATIONS", filed Jan. 20, 2021, which hereby incorporated by reference in its entirety.

Feature F6: Lexical Semantics. Lexical semantics refers to the grammatical structure of information objects 112, and the relationships between individual words in a particular context. Lexical semantics F6 may be derived from an initial NLP/NLU analysis of the information objects 112 to identify lexical aspects of the information objects 112. As examples, these lexical aspects may include hyponyms (specific lexical items of a generic lexical item (hypernym), meronom (a logical arrangement of text and words that denotes a constituent part of or member of something), polysemy (a relationship between the meanings of words or phrases, although slightly different, share a common core), synonyms (words that have the same sense or nearly the same meaning as another), antonyms (words that have close to opposite meanings), homonyms (two words that are sound the same and are spelled alike but have a different meaning), and/or the like.

Features F1, F2, F3, and F6 may be collectively referred to as information object semantic features. Features F4 and F5, and any other user interactions with information objects 112 may be collectively referred to as behavioral features.

In one example, resource classifier generates one or more feature vectors F1-F5 for each information object 112. Resource classifier then combines all of the same information object 112 feature vectors to generate an overall information object 112 feature vector. For example, resource classifier may add together the structural semantics feature vectors F1 generated for each of the individual information objects 112 in a set of information objects 112. Resource classifier then divides the sum by the number of information objects 112 to generate an average structural semantics feature vector F1 for the information object 112. Resource classifier performs the same averaging for each of the other features F2-F5 to form a combined feature vector. Resource classifier feeds combined feature vector into a suitable ML model that classifies information objects 112 (e.g., a classifier or the like) as one of a plurality of information object types. Again, this is just one example, and any combination of features F1-F5, or any other features, can be used to classify information objects 112.

The CCM 100 may also use the information object structure and features described previously to improve topic predictions for information objects 112 or for individual nodes of information objects 112. For example, when an information object 112 is a website, the CCM 100 may identify a most influential webpage of the website, which may be a webpage with the most links, the most content, the webpage with a highest relevancy to a particular topic, the most user visits, and/or having some other aspects/features greater or different than other webpages of the website. Webpages that are a closer distance to the most influential webpage (e.g., with fewer number of links or hops from the most influential webpage) may be identified as more influential than webpages that are at a further distance from the most influential webpage. In this example, the CCM 100 may increase the topic prediction values for more influential webpages or webpages directly connected to the most influential webpages and/or reduce the topic prediction values for less influential webpages. In some embodiments, the resource classifier may modify relevancy scores based on the org associated with a particular information object 112. For example, the resource classifier may increase or decrease the relevancy score by a first amount for a first type of information object 112, and/or increase or decrease the relevancy score by a second amount for a second type of information object 112, and so forth.

In various embodiments, the CCM 100 and/or the resource classifier may use the structure or a graph of one or more information objects 112 to train topic models. For example, during ML model training, the topic model may generate topic relevancy ratings (e.g., relevancy scores) for different information objects 112 (e.g., individual webpages of a website). In some cases, the ML model may not accurately identify the topics on a first information object 112 but may accurately identify the topics on other closely linked information objects 112. During training and testing, model performance may be rated not only on the accuracy of identifying topics 102 on one particular information object 112 but also rated based on the accuracy of identifying related topics 102 on other closely linked information objects 112.

7. EXAMPLE HARDWARE AND SOFTWARE CONFIGURATIONS AND IMPLEMENTATIONS

Figure 16:
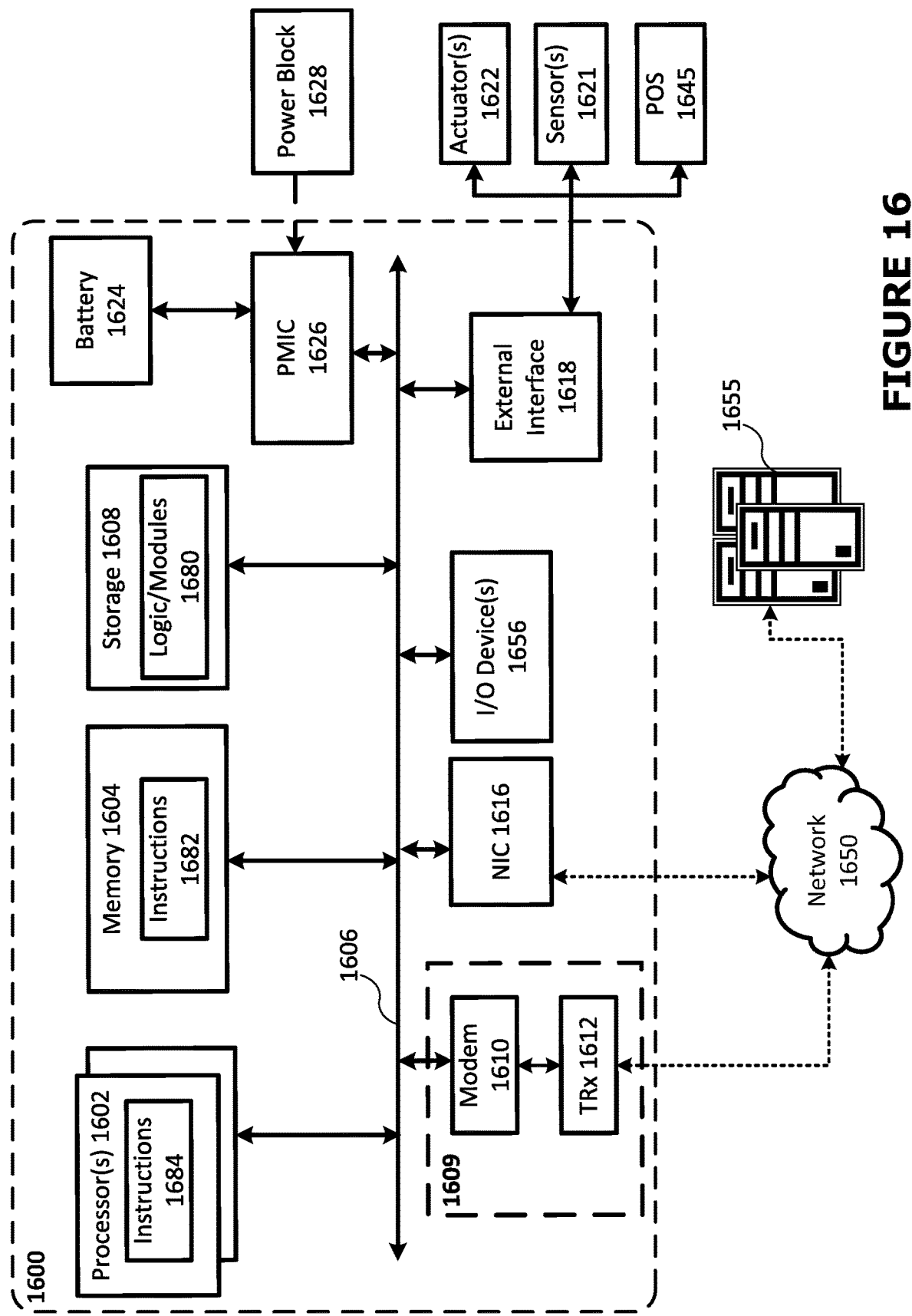
FIG. 16 depicts an example computing system suitable for practicing various aspects of the various embodiments discussed herein.

FIG. 16 illustrates an example of an computing system 1600 (also referred to as "computing device 1600," "platform 1600," "device 1600," "appliance 1600," "server 1600," or the like) in accordance with various embodiments. The computing system 1600 may be suitable for use as any of the computer devices discussed herein and performing any combination of processes discussed above. As examples, the computing device 1600 may operate in the capacity of a server or a client machine in a server-client network environment, or as a peer machine in a peer-to-peer (or distributed) network environment. Additionally or alternatively, the system 1600 may represent the CCM 100, user computer(s) 230, 530, 1400, a network device and/or network appliance, application server(s) (e.g., owned/operated by service providers 118), a third party platform or collection of servers that hosts and/or serves information objects 112, and/or any other system or device discussed previously. Additionally or alternatively, various combinations of the components depicted by FIG. 16 may be included depending on the particular system/device that system 1600 represents. For example, when system 1600 represents a user or client device, the system 1600 may include some or all of the components shown by FIG. 16. In another example, when the system 1600 is the CCM 100 or a server computer system, the system 1600 may not include the communication circuitry 1609 or battery 1624, and instead may include multiple NICs 1616 or the like. As examples, the system 1600 and/or the remote system 1655 may comprise desktop computers, workstations, laptop computers, mobile cellular phones (e.g., "smartphones"), tablet computers, portable media players, wearable computing devices, server computer systems, web appliances, network appliances, an aggregation of computing resources (e.g., in a cloud-based environment), or some other computing devices capable of interfacing directly or indirectly with network 1650 or other network, and/or any other machine or device capable of executing instructions (sequential or otherwise) that specify actions to be taken by that machine.

The components of system 1600 may be implemented as an individual computer system, or as components otherwise incorporated within a chassis of a larger system. The components of system 1600 may be implemented as integrated circuits (ICs) or other discrete electronic devices, with the appropriate logic, software, firmware, or a combination thereof, adapted in the computer system 1600. Additionally or alternatively, some of the components of system 1600 may be combined and implemented as a suitable System-on-Chip (SoC), System-in-Package (SiP), multi-chip package (MCP), or the like.

The system 1600 includes physical hardware devices and software components capable of providing and/or accessing content and/or services to/from the remote system 1655. The system 1600 and/or the remote system 1655 can be implemented as any suitable computing system or other data processing apparatus usable to access and/or provide content/services from/to one another. The remote system 1655 may have a same or similar configuration and/or the same or similar components as system 1600. The system 1600 communicates with remote systems 1655, and vice versa, to obtain/serve content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Secure Shell (SSH), Extensible Messaging and Presence Protocol (XMPP); WebSocket; and/or some other communication protocol, such as those discussed herein. In some examples, the events 108 may be or include session events defined by any of the aforementioned protocols.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). As used herein, the term "service" refers to a particular functionality or a set of functions to be performed on behalf of a requesting party, such as the system 1600. As examples, a service may include or involve the retrieval of specified information or the execution of a set of operations. In order to access the content/services, the system 1600 includes components such as processors, memory devices, communication interfaces, and the like. However, the terms "content" and "service" may be used interchangeably throughout the present disclosure even though these terms refer to different concepts.

Referring now to system 1600, the system 1600 includes processor circuitry 1602, which is configurable or operable to execute program code, and/or sequentially and automatically carry out a sequence of arithmetic or logical operations; record, store, and/or transfer digital data. The processor circuitry 1602 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 1602 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 1602 may be coupled with or may include memory/storage and may be configurable or operable to execute instructions stored in the memory/storage to enable various applications or operating systems to run on the system 1600. In these embodiments, the processors (or cores) of the processor circuitry 1602 are configurable or operable to operate application software (e.g., logic/modules 1680) to provide specific services to a user of the system 1600. In some embodiments, the processor circuitry 1602 may include special-purpose processor/controller to operate according to the various embodiments herein.

In various implementations, the processor(s) of processor circuitry 1602 may include, for example, one or more processor cores (CPUs), graphics processing units (GPUs), Tensor Processing Units (TPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, microprocessors or controllers, or any suitable combination thereof. As examples, the processor circuitry 1602 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 1602 may be mentioned elsewhere in the present disclosure.

In some implementations, the processor(s) of processor circuitry 1602 may be, or may include, one or more media processors comprising microprocessor-based SoC(s), FPGA(s), or DSP(s) specifically designed to deal with digital streaming data in real-time, which may include encoder/decoder circuitry to compress/decompress (or encode and decode) Advanced Video Coding (AVC) (also known as H.264 and MPEG-4) digital data, High Efficiency Video Coding (HEVC) (also known as H.265 and MPEG-H part 2) digital data, and/or the like.

In some implementations, the processor circuitry 1602 may include one or more hardware accelerators. The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the CCM 100 and/or some other system/device discussed herein, which may be more efficient than using general-purpose processor cores. In some embodiments, the specific tasks or workloads may be offloaded from one or more processors of the processor circuitry 1602. In these implementations, the circuitry of processor circuitry 1602 may comprise logic blocks or logic fabric including and other interconnected resources that may be programmed to perform various functions, such as the procedures, methods, functions, etc. of the various embodiments discussed herein. Additionally, the processor circuitry 1602 may include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 1602 may include hardware elements specifically tailored for machine learning functionality, such as for operating the subsystems of the CCM 100 discussed previously with regard to FIG. 2. In these implementations, the processor circuitry 1602 may be, or may include, an AI engine chip that can run many different kinds of AI instruction sets once loaded with the appropriate weightings and training code. Additionally or alternatively, the processor circuitry 1602 may be, or may include, AI accelerator(s), which may be one or more of the aforementioned hardware accelerators designed for hardware acceleration of AI applications, such as one or more of the subsystems of the CCM 100 and/or some other system/device discussed herein. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1602 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 1602 may be, or may include, one or more custom-designed silicon cores specifically designed to operate corresponding subsystems of the CCM 100 and/or some other system/device discussed herein. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the CCM 100 and/or some other system/device discussed herein may be operated, at least in part, on custom-designed silicon core(s). These "hardware-ized" subsystems may be integrated into a larger chipset but may be more efficient that using general purpose processor cores.

The system memory circuitry 1604 comprises any number of memory devices arranged to provide primary storage from which the processor circuitry 1602 continuously reads instructions 1682 stored therein for execution. In some embodiments, the memory circuitry 1604 is on-die memory or registers associated with the processor circuitry 1602. As examples, the memory circuitry 1604 may include volatile memory such as random access memory (RAM), dynamic RAM (DRAM), synchronous DRAM (SDRAM), etc. The memory circuitry 1604 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 1604 may also comprise persistent storage devices, which may be temporal and/or persistent storage of any type, including, but not limited to, non-volatile memory, optical, magnetic, and/or solid state mass storage, and so forth.

In some implementations, some aspects (or devices) of memory circuitry 1604 and storage circuitry 1608 may be integrated together with a processing device 1602, for example RAM or FLASH memory disposed within an integrated circuit microprocessor or the like. In other implementations, the memory circuitry 1604 and/or storage circuitry 1608 may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Storage circuitry 1608 is arranged to provide persistent storage of information such as data, applications, operating systems (OS), and so forth. As examples, the storage circuitry 1608 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 1602, resistance change memories, phase change memories, holographic memories, or chemical memories, and the like.

The storage circuitry 1608 is configurable or operable to store computational logic 1680 (or "modules 1680") in the form of software, firmware, microcode, or hardware-level instructions to implement the techniques described herein. The computational logic 1680 may be employed to store working copies and/or permanent copies of programming instructions, or data to create the programming instructions, for the operation of various components of system 1600 (e.g., drivers, libraries, application programming interfaces (APIs), etc.), an OS of system 1600, one or more applications, and/or for carrying out the embodiments discussed herein. The computational logic 1680 may be stored or loaded into memory circuitry 1604 as instructions 1682, or data to create the instructions 1682, which are then accessed for execution by the processor circuitry 1602 to carry out the functions described herein. The processor circuitry 1602 accesses the memory circuitry 1604 and/or the storage circuitry 1608 over the interconnect (IX) 1606. The instructions 1682 to direct the processor circuitry 1602 to perform a specific sequence or flow of actions, for example, as described with respect to flowchart(s) and block diagram(s) of operations and functionality depicted previously. The various elements may be implemented by assembler instructions supported by processor circuitry 1602 or high-level languages that may be compiled into instructions 1684, or data to create the instructions 1684, to be executed by the processor circuitry 1602. The permanent copy of the programming instructions may be placed into persistent storage devices of storage circuitry 1608 in the factory or in the field through, for example, a distribution medium (not shown), through a communication interface (e.g., from a distribution server (not shown)), or over-the-air (OTA).

The operating system (OS) of system 1600 may be a general purpose OS or an OS specifically written for and tailored to the computing system 1600. For example, when the system 1600 is a server system or a desktop or laptop system 1600, the OS may be Unix or a Unix-like OS such as Linux e.g., provided by Red Hat Enterprise, Windows 10™ provided by Microsoft Corp.®, macOS provided by Apple Inc.®, or the like. In another example where the system 1600 is a mobile device, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like.

The OS manages computer hardware and software resources, and provides common services for various applications (e.g., one or more loci/modules 1680). The OS may include one or more drivers or APIs that operate to control particular devices that are embedded in the system 1600, attached to the system 1600, or otherwise communicatively coupled with the system 1600. The drivers may include individual drivers allowing other components of the system 1600 to interact or control various I/O devices that may be present within, or connected to, the system 1600. For example, the drivers may include a display driver to control and allow access to a display device, a touchscreen driver to control and allow access to a touchscreen interface of the system 1600, sensor drivers to obtain sensor readings of sensor circuitry 1621 and control and allow access to sensor circuitry 1621, actuator drivers to obtain actuator positions of the actuators 1622 and/or control and allow access to the actuators 1622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 1600, such as the various subsystems of the CCM 100 and/or some other system/device discussed previously.

The components of system 1600 communicate with one another over the interconnect (IX) 1606. The IX 1606 may include any number of IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system inter-connects, Ethernet, Cache Coherent Interconnect for Accelerators (CCIA), Gen-Z Consortium IXs, Open Coherent Accelerator Processor Interface (OpenCAPI), and/or any number of other IX technologies. The IX 1606 may be a proprietary bus, for example, used in a SoC based system.

The communication circuitry 1609 is a hardware element, or collection of hardware elements, used to communicate over one or more networks (e.g., network 1650) and/or with other devices. The communication circuitry 1609 includes modem 1610 and transceiver circuitry ("TRx") 812. The modem 1610 includes one or more processing devices (e.g., baseband processors) to carry out various protocol and radio control functions. Modem 1610 may interface with application circuitry of system 1600 (e.g., a combination of processor circuitry 1602 and CRM 860) for generation and processing of baseband signals and for controlling operations of the TRx 1612. The modem 1610 may handle various radio control functions that enable communication with one or more radio networks via the TRx 1612 according to one or more wireless communication protocols. The modem 1610 may include circuitry such as, but not limited to, one or more single-core or multi-core processors (e.g., one or more baseband processors) or control logic to process baseband signals received from a receive signal path of the TRx 1612, and to generate baseband signals to be provided to the TRx 1612 via a transmit signal path. In various embodiments, the modem 1610 may implement a real-time OS (RTOS) to manage resources of the modem 1610, schedule tasks, etc.

The communication circuitry 1609 also includes TRx 1612 to enable communication with wireless networks using modulated electromagnetic radiation through a non-solid medium. TRx 1612 includes a receive signal path, which comprises circuitry to convert analog RF signals (e.g., an existing or received modulated waveform) into digital baseband signals to be provided to the modem 1610. The TRx 1612 also includes a transmit signal path, which comprises circuitry configurable or operable to convert digital baseband signals provided by the modem 1610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1612 using metal transmission lines or the like.

The TRx 1612 may include one or more radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 1600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.11 ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the TRx 1612 including, for example, radios compliant with standards issued by the ITU (International Telecommunication Union), or the ETSI (European Telecommunications Standards Institute), among others, both existing and not yet formulated.

Network interface circuitry/controller (MC) 1616 may be included to provide wired communication to the network 1650 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 1600 via NIC 1616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1616 may include one or more dedicated processors and/or FPGAs to communicate using one or more of the aforementioned network interface protocols. In some implementations, the NIC 1616 may include multiple controllers to provide connectivity to other networks using the same or different protocols. For example, the system 1600 may include a first NIC 1616 providing communications to the cloud over Ethernet and a second NIC 1616 providing communications to other devices over another type of network. In some implementations, the NIC 1616 may be a high-speed serial interface (HSSI) NIC to connect the system 1600 to a routing or switching device.

Network 1650 comprises computers, network connections among various computers (e.g., between the system 1600 and remote system 1655), and software routines to enable communication between the computers over respective network connections. In this regard, the network 1650 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 1650 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 1650 may require that the computers execute software routines which enable, for example, the seven layers of the OSI model of computer networking or equivalent in a wireless (or cellular) phone network.

The network 1650 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 1650 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The external interface 1618 (also referred to as "I/O interface circuitry" or the like) is configurable or operable to connect or coupled the system 1600 with external devices or subsystems. The external interface 1618 may include any suitable interface controllers and connectors to couple the system 1600 with the external components/devices. As an example, the external interface 1618 may be an external expansion bus (e.g., Universal Serial Bus (USB), FireWire, Thunderbolt, etc.) used to connect system 1600 with external (peripheral) components/devices. The external devices include, inter alia, sensor circuitry 1621, actuators 1622, and positioning circuitry 1645, but may also include other devices or subsystems not shown by FIG. 16.

The sensor circuitry 1621 may include devices, modules, or subsystems whose purpose is to detect events or changes in its environment and send the information (sensor data) about the detected events to some other a device, module, subsystem, etc. Examples of such sensors 1621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1618 connects the system 1600 to actuators 1622, which allow system 1600 to change its state, position, and/or orientation, or move or control a mechanism or system. The actuators 1622 comprise electrical and/or mechanical devices for moving or controlling a mechanism or system, and/or converting energy (e.g., electric current or moving air and/or liquid) into some kind of motion. The actuators 1622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1622 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system

1600 may be configurable or operable to operate one or more actuators 1622 based on one or more captured events and/or instructions or control signals received from a service provider and/or various client systems. In embodiments, the system 1600 may transmit instructions to various actuators 1622 (or controllers that control one or more actuators 1622) to reconfigure an electrical network as discussed herein.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the communication circuitry 1609 to communicate with the nodes and components of the positioning network. The positioning circuitry 1645 may also provide position data and/or time data to the application circuitry, which may use the data to synchronize operations with various infrastructure (e.g., radio base stations), for turn-by-turn navigation, or the like.

The input/output (I/O) devices 1656 may be present within, or connected to, the system 1600. The I/O devices 1656 include input device circuitry and output device circuitry including one or more user interfaces designed to enable user interaction with the system 1600 and/or peripheral component interfaces designed to enable peripheral component interaction with the system 1600. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the system 1600. The output device circuitry may also include speakers or other audio emitting devices, printer(s), and/or the like. In some embodiments, the sensor circuitry 1621 may be used as the input device circuitry (e.g., an image capture device, motion capture device, or the like) and one or more actuators 1622 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1624 may be coupled to the system 1600 to power the system 1600, which may be used in embodiments where the system 1600 is not in a fixed location, such as when the system 1600 is a mobile or laptop client system. The battery 1624 may be a lithium ion battery, a lead-acid automotive battery, or a metal-air battery, such as a zinc-air battery, an aluminum-air battery, a lithium-air battery, a lithium polymer battery, and/or the like. In embodiments where the system 1600 is mounted in a fixed location, such as when the system is implemented as a server computer system, the system 1600 may have a power supply coupled to an electrical grid. In these embodiments, the system 1600 may include power tee circuitry to provide for electrical power drawn from a network cable to provide both power supply and data connectivity to the system 1600 using a single cable.

Power management integrated circuitry (PMIC) 1626 may be included in the system 1600 to track the state of charge (SoCh) of the battery 1624, and to control charging of the system 1600. The PMIC 1626 may be used to monitor other parameters of the battery 1624 to provide failure predictions, such as the state of health (SoH) and the state of function (SoF) of the battery 1624. The PMIC 1626 may include voltage regulators, surge protectors, power alarm detection circuitry. The power alarm detection circuitry may detect one or more of brown out (under-voltage) and surge (over-voltage) conditions. The PMIC 1626 may communicate the information on the battery 1624 to the processor circuitry 1602 over the IX 1606. The PMIC 1626 may also include an analog-to-digital (ADC) convertor that allows the processor circuitry 1602 to directly monitor the voltage of the battery 1624 or the current flow from the battery 1624. The battery parameters may be used to determine actions that the system 1600 may perform, such as transmission frequency, mesh network operation, sensing frequency, and the like.

A power block 1628, or other power supply coupled to an electrical grid, may be coupled with the PMIC 1626 to charge the battery 1624. In some examples, the power block 1628 may be replaced with a wireless power receiver to obtain the power wirelessly, for example, through a loop antenna in the system 1600. In these implementations, a wireless battery charging circuit may be included in the PMIC 1626. The specific charging circuits chosen depend on the size of the battery 1624 and the current required.

The system 1600 may include any combinations of the components shown by FIG. 16, however, some of the components shown may be omitted, additional components may be present, and different arrangement of the components shown may occur in other implementations. In one example where the system 1600 is or is part of a server computer system, the battery 1624, communication circuitry 1609, the sensors 1621, actuators 1622, and/or POS 1645, and possibly some or all of the I/O devices 1656 may be omitted.

Furthermore, the embodiments of the present disclosure may take the form of a computer program product or data to create the computer program, with the computer program or data embodied in any tangible or non-transitory medium of expression having the computer-usable program code (or data to create the computer program) embodied in the medium. For example, the memory circuitry 1604 and/or storage circuitry 1608 may be embodied as non-transitory computer-readable storage media (NTCRSM) that may be suitable for use to store instructions (or data that creates the instructions) that cause an apparatus (such as any of the devices/components/systems described with regard to FIGS. 1-35), in response to execution of the instructions by the apparatus, to practice selected aspects of the present disclosure. As shown, NTCRSM may include a number of programming instructions 1684, 1682 (or data to create the programming instructions). Programming instructions 1684, 1682 may be configurable or operable to enable a device (e.g., any of the devices/components/systems described with regard to FIGS. 1-35), in response to execution of the programming instructions 1684, 1682, to perform various programming operations associated with operating system functions, one or more applications, and/or aspects of the present disclosure (including various programming operations associated with FIGS. 1-35). In various embodiments, the programming instructions 1684, 1682 may correspond to any of the computational logic 1680, instructions 1682 and 1684 discussed previously with regard to FIG. 16.

In alternate embodiments, programming instructions 1684, 1682 (or data to create the instructions 1684, 1682) may be disposed on multiple NTCRSM. In alternate embodiments, programming instructions 1684, 1682 (or data to create the instructions 1684, 1682) may be disposed on computer-readable transitory storage media, such as, signals. The programming instructions 1684, 1682 embodied by a machine-readable medium may be transmitted or received over a communications network using a transmission medium via a network interface device (e.g., communication circuitry 1609 and/or NIC 1616 of FIG. 16) utilizing any one of a number of transfer protocols (e.g., HTTP, etc.).

Any combination of one or more computer usable or computer readable media may be utilized as or instead of the NTCRSM. The computer-usable or computer-readable medium may be, for example but not limited to, one or more electronic, magnetic, optical, electromagnetic, infrared, or semiconductor systems, apparatuses, devices, or propagation media. For instance, the NTCRSM may be embodied by devices described for the storage circuitry 1608 and/or memory circuitry 1604 described previously. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. In the context of the present disclosure, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (e.g., including programming instructions 1684, 1682) or data to create the program code embodied therewith, either in baseband or as part of a carrier wave. The computer usable program code or data to create the program may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (e.g., programming instructions 1684, 1682) or data to create the program code as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an application programming interface (API), etc. in order to execute the instructions on a particular computing device or other device. In another example, the program code or data to create the program code may need to be configured (e.g., settings stored, data input, network addresses recorded, etc.) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including for example, programming instructions 1684, 1682, computational logic 1680, instructions 1682, and/or instructions 1684, may be implemented as software code to be executed by one or more processors using any suitable computer language such as, for example, Python, PyTorch, NumPy, ArcPy Ruby, Ruby on Rails, Scala, Smalltalk, Java™, C++, C#, "C", Kotlin, Swift, Rust, Go (or "Golang"), ECMAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Lightning®, and/or any other programming language, markup language, script, code, etc. In some implementations, a suitable integrated development environment (IDE) or software development kit (SDK) may be used to develop the program code or software elements discussed herein such as, for example, Android® Studio™ IDE, Apple® iOS® SDK, or development tools including proprietary programming languages and/or development tools. Furthermore, some or all of the software components or functions described herein can utilize a suitable querying language to query and store information in one or more databases or data structures, such as, for example, Structure Query Language (SQL), noSQL, and/or other query languages. The software code can be stored as a computer- or processor-executable instructions or commands on a physical non-transitory computer-readable medium. The computer program code for carrying out operations of the present disclosure may also be written in any combination of the programming languages discussed herein. The program code may execute entirely on the system 1600, partly on the system 1600 as a stand-alone software package, partly on the system 1600 and partly on a remote computer (e.g., remote system 1655), or entirely on the remote computer (e.g., remote system 1655). In the latter scenario, the remote computer may be connected to the system 1600 through any type of network (e.g., network 1650).

While only a single computing device 1600 is shown, the computing device 1600 may include any collection of devices or circuitry that individually or jointly execute a set (or multiple sets) of instructions to perform any one or more of the operations discussed above. Computing device 1600 may be part of an integrated control system or system manager, or may be provided as a portable electronic device configurable or operable to interface with a networked system either locally or remotely via wireless transmission.

Some of the operations described previously may be implemented in software and other operations may be implemented in hardware. One or more of the operations, processes, or methods described herein may be performed by an apparatus, device, or system similar to those as described herein and with reference to the illustrated figures.

Figure 17:
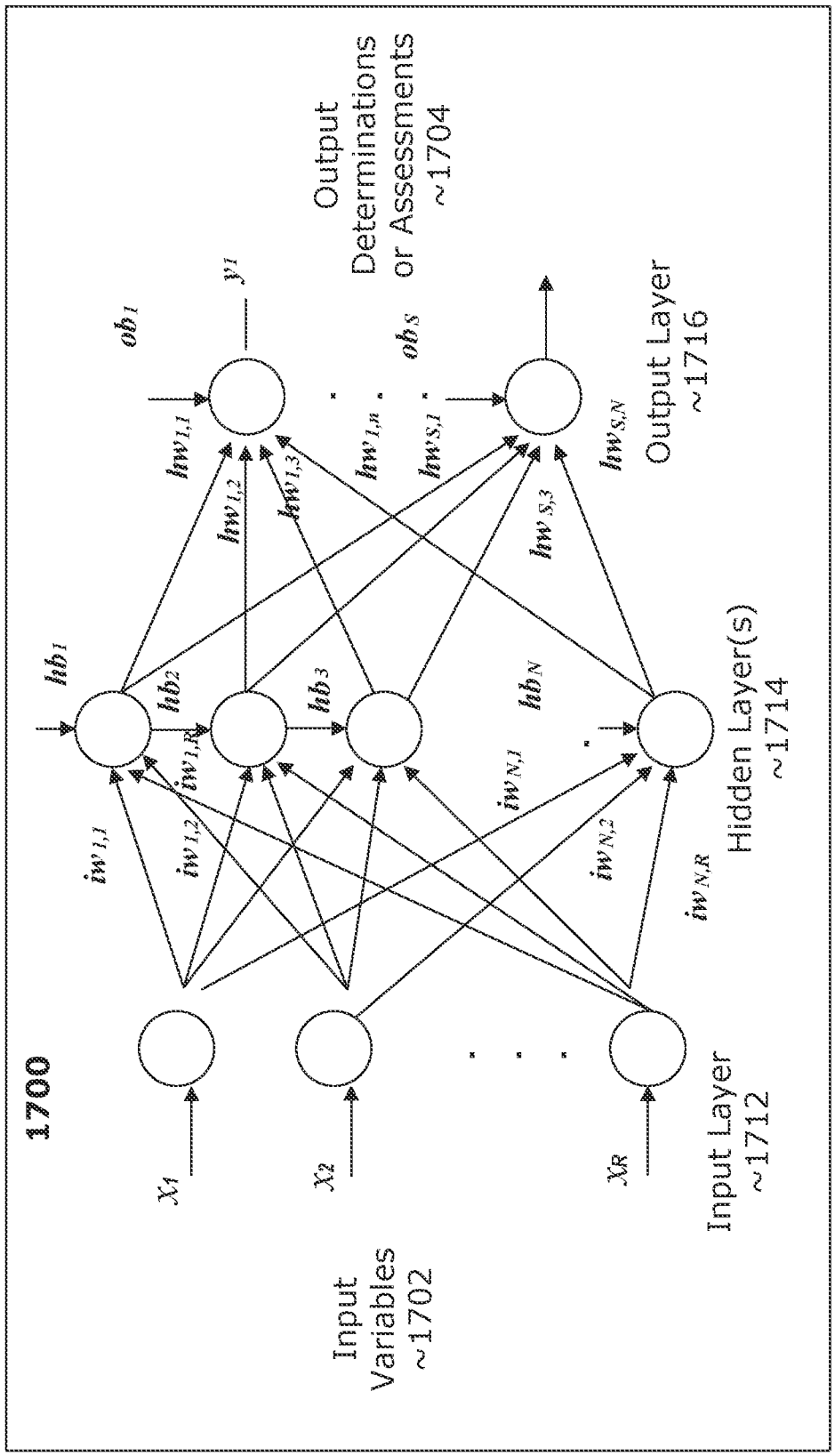
FIG. 17 illustrates an example neural network suitable for practicing the various embodiments discussed herein

FIG. 17 illustrates an example NN 1700 suitable for use by a computing system (such as those discussed previously), in accordance with various embodiments. NN 1700 may be suitable for use by one or more of the subsystems and/or the various embodiments discussed herein, implemented in part by a hardware accelerator of a UVCS module. As shown, example NN 1700 may be a multi-layer feedforward NN (FNN) comprising an input layer 1712, one or more hidden layers 1714 and an output layer 1716. Input layer 1712 receives data of input variables (xi) 1702. Hidden layer(s) 1714 processes the inputs, and eventually, output layer 1716 outputs the determinations or assessments ($y_i$) 1704. In one example implementation the input variables (xi) 1702 of the NN are set as a vector containing the relevant variable data, while the output determination or assessment ($y_i$) 1704 of the NN 1700 are also as a vector. As an example, the multi-layer FNN may be expressed through the following equations:

$$ho_i = f(\Sigma_{j=1}^{R}(iw_{i,j}x_j)+hb_i), \text{for } i=1,\ldots,N$$

$$y_i = f(\Sigma_{k=1}^{N}(hw_{i,k}ho_k)+ob_i), \text{for } i=1,\ldots,S$$

In these equations, $ho_i$ and $y_i$ are the hidden layer variables and the final outputs, respectively; $f(\ )$ is typically a non-linear function, such as the sigmoid function or rectified linear (ReLu) function that mimics the neurons of the human brain; R is the number of inputs; N is the size of the hidden layer, or the number of neurons; and S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp}-y_{kp})^2$$

In this equation, $y_{kp}$ and $t_{kp}$ are the predicted and the target values of pth output unit for sample k, respectively, and in is the number of samples. In embodiments, the NN 1700 is used for one or more computing subsystems, such as those discussed herein. The input variables ($x_i$) 1702 may include various data collected by remote devices/sensors, data collected by various embedded or accessible sensors, data obtained via the message exchanges, as well as data describing relevant factors to a decision. The output variables ($y_i$) 1704 may include determined response (see e.g., any of the examples A01-A28, B01-B21, X01-X03 discussed infra, and the like). The network variables of the hidden layer(s) for the NN 1700, are determined by the training data.

The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

In one example, the NN 1700 is used for the motion detection based on the y sensor data obtained from the one or more sensors. In another example, the NN 1700 is used for object detection/classification. The object detection or recognition models may include an enrollment phase and an evaluation phase. During the enrollment phase, one or more features are extracted from the sensor data (e.g., image or video data). A feature is an individual measureable property or characteristic. For object detection, an object feature may include an object size, color, shape, relationship to other objects, and/or any region or portion of an image, such as edges, ridges, corners, blobs, and/or some defined regions of interest (ROI), and/or the like.

In another example, the NN 1700 is used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In another example, the NN 1700 is used for character recognition, where the features may include histograms counting the number of black pixels along horizontal and vertical directions, number of internal holes, stroke detection and many others.

In another example, the NN 1700 is used for topic classification, where features may include individual topics, tokens, sequences of tokens, term frequency, document frequency and/or inverse document frequency, log-count ratios (e.g., when a Naive Bayes algorithm is used), and/or the like.

In another example, the NN 1700 is a feature extraction model that learns to extract salient features from information objects represented using, for example, word embedding. Word embedding is a distributed representation of words where different words that have a similar meaning (e.g., based on their usage) also have a similar representation. Additionally or alternatively, a fully connected model may be used to interpret the extracted features in terms of predictive output. In this example, the NN 1700 may be a Convolution NN (CNN), which may be integrated into a larger network, and to be trained to work in tandem with it in order to produce an end result. The CNNs layer's responsibility is to extract meaningful sub-structures that are useful for the overall prediction task at hand. Other aspects of CNNs and the NN 1700 being used for topic classification and/or NLP are discussed in [Goldberg_NLP].

In the example of FIG. 17, for simplicity of illustration, there is only one hidden layer in the NN, however in some embodiments, there can be multiple hidden layers. Furthermore, the NN can be implemented using other types of topologies, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), and/or any other suitable NN arrangement or topology such as those discussed herein.

8. EXAMPLE IMPLEMENTATIONS

Additional examples of the presently described embodiments include the following, non-limiting example implementations. Each of the non-limiting examples may stand on its own, or may be combined in any permutation or combination with any one or more of the other examples provided below or throughout the present disclosure.

Example A01 includes a method comprising: identifying events from a domain; identifying a number of the events; identifying content associated with the events; identifying a topic; identifying a relevancy of the content to the topic; and generating a consumption score for the domain and topic based on the number of events and the relevancy of the content to the topic.

Example A02 includes the method of example A01 and/or some other example(s) herein, further comprising identifying values in the consumption score reaching a threshold as a surge.

Example A03 includes the method of examples A01-A02 and/or some other example(s) herein, further comprising identifying changes in the number of events over different time periods; and adjusting the consumption score based on the changes in the number of events.

Example A04 includes the method of examples A01-A03 and/or some other example(s) herein, further comprising identifying a number of users generating the events for the different time periods; identifying changes in the number of users over the different time periods; and adjusting the consumption score based on the changes in the number of users.

Example A05 includes the method of examples A01-A04 and/or some other example(s) herein, further comprising: comparing the relevancy with an overall relevancy for content accessed from multiple different domains; assigning a low initial value to the consumption score when the relevancy is below the overall relevancy; assigning a medium initial value to the consumption score when the relevancy is about the same as the overall relevancy; and assigning a high initial value to the consumption score when the relevancy is above the overall relevancy.

Example A06 includes the method of examples A01-A05 and/or some other example(s) herein, further comprising: identifying types of user engagement with the content; and adjusting the relevancy of the content based on the types of user engagement with the content.

Example A07 includes the method of examples A06 and/or some other example(s) herein, wherein the types of user engagement include page dwell times and types of page scrolling.

Example A08 includes the method of examples A01-A07 and/or some other example(s) herein, further comprising: calculating a first number of users generating a first number of the events for a first time period; calculating a second number of users generating a second number of the events for a second time period; and decreasing the consumption score for the second time period when the second number of users is less than the first number of users.

Example A09 includes the method of examples A01-A08 and/or some other example(s) herein, further comprising: identifying the events coming from an network address; identifying a company associated with the network address; and associating the company with the consumption score.

Example A10 includes the method of example A10 and/or some other example(s) herein, further comprising: identifying a location for the company associated with the network address; and associating the location with the consumption score.

Example A11 includes the method of examples A01-A10 and/or some other example(s) herein, further comprising: identifying a first group of events for a first time period; identifying a first group of content accessed during the first group of events; identifying a first relevancy of the first group of content to the topic; generating a first value for the consumption score for the first time period based on a number of the first group of events and the first relevancy; identifying a second group of events for a second time period after the first time period; identifying a second group of content accessed during the second group of events; identifying a second relevancy of the second group of content to the topic; and generating a second value for the consumption score for the second time period based on a number of the second group of events and the second relevancy.

Example A12 includes the method of example A11 and/or some other example(s) herein, further comprising: adjusting the second value based on a change between the number of the first group of events and the number of the second group of events.

Example A13 includes the method of examples A11-A12 and/or some other example(s) herein, further comprising: identifying a third group of events for a third time period after the second time period; identifying a third group of content accessed during the third group of events; identifying a third relevancy of the third group of content to the topic; generating a third value for the consumption score for the third time period based on a number of the third group of events and the third relevancy, and adjusting the third value based on changes between the number of the first group of events, the number of the second group of events, and the number of the third group of events.

Example A14 includes a method comprising: identifying events associated with an entity; identifying content associated with the events; identifying a relevancy of the content to a topic for a time period; identifying a number of the events for the time period; and calculating a consumption score for the time period based on the relevancy of the content and the number of events.

Example A15 includes the method of example A14 and/or some other example(s) herein, further comprising: identifying a number of users generating the events for the time period; and calculate the consumption score based on the number of users.

Example A16 includes the method of examples A14-A16 and/or some other example(s) herein, further comprising: identifying the number of events associated with the entity and the topic over a series of time periods; and adjusting the consumption score based on changes in the number of events over the series of time periods.

Example A17 includes the method of example A16 and/or some other example(s) herein, further comprising: identifying a number of users generating the events over the series of time periods; and adjusting the consumption score based on changes in the number of users over the series of time periods.

Example A18 includes the method of examples A16-A17 and/or some other example(s) herein, further comprising: identifying a location associated with the entity; calculating a consumption score for the location based on the relevancy of the content and the number of events associated with the location.

Example A19 includes the method of examples A16-A18 and/or some other example(s) herein, further comprising: identifying a surge in the consumption score when the consumption score reaches a threshold value.

Example A20 includes the method of example A19 and/or some other example(s) herein, further comprising: mapping the surge to contacts associated with the entity.

Example A21 includes the method of example A20 and/or some other example(s) herein, further comprising: sending a notification of the surge to a publisher.

Example A22 includes the method of example A21 and/or some other example(s) herein, wherein the notification of the surge is configured to trigger the publisher to send information associated with the topic to contacts associated with the entity.

Example A23 includes the method of example A22 and/or some other example(s) herein, wherein the notification of the surge is configured to trigger the publisher to send the information to the contacts having a job title associated with the topic.

Example A24 includes a method comprising: identifying or determining events associated with accessing content; identifying or determining types of user engagement with the content; calculating an engagement score for the content based on the types of user engagement; calculating a relevancy of the content to a topic; and adjusting the relevancy of the content based on the engagement score.

Example A25 includes the method of example A24 and/or some other example(s) herein, further comprising: calculating the engagement score based on user content dwell times.

Example A26 includes the method of example A25 and/or some other example(s) herein, further comprising: calculating the engagement score based on content scroll depths.

Example A27 includes the method of examples A24-A26 and/or some other example(s) herein, further comprising: calculating the engagement score based on the content scroll speeds.

Example A28 includes the method of examples A24-A27 and/or some other example(s) herein, further comprising: calculating a consumption score based on the relevancy.

Example B01 includes a method of operating a content consumption monitor (CCM), the method comprising: obtaining data packets including information about session events from computer devices that access information objects, the information objects including tags that monitor and capture the session events; determining a domain name for an organization associated with at least one network address indicated by at least one of the session events; identifying or determining, for each of multiple time periods, a group of the session events that include the domain name of the organization or one or more network addresses associated with the organization; identifying or determining, for each of the multiple time periods, a set of information objects accessed by members of the organization as indicated by the group of the session events; identifying or determining a plurality of topics based on one or more words in the set of information objects; determining a relevancy score of the set of information objects to each topic of the plurality of topics; determining a number of unique users of the organization generating the session events for each of the time periods, the unique users being users of one or more of the computer devices; generating consumption scores for the organization for each of the multiple time periods based on the number of session events generated from the organization, the number of unique users of the organization, and the average relevancy score for each topic; and determining a surge in the consumption scores for the organization based on changes in the consumption scores for the organization over the multiple time periods.

Example B01.1 includes the method of example B01 and/or some other examples herein, wherein the tags include program code that cause computer devices to monitor and capture the session events generated by the computer devices and send the data packets including the captured session events to the CCM.

Example B01.2 includes the method of examples B01-B01.1 and/or some other examples herein, wherein each of the session events at least identifies an accessed information object, an event type identifier that identifies an action or activity associated with of the accessed information object, and a network address from which the accessed information object was accessed.

Example B01.3 includes the method of examples B01-B01.2 and/or some other examples herein, wherein the information objects are webpages or content embedded in webpages.

Example B01.4 includes the method of examples B01-B01.3 and/or some other examples herein, wherein determining the domain name comprises: identifying or determining the domain name from a database.

Example B01.5 includes the method of examples B01-B01.4 and/or some other examples herein, wherein the relevancy score is an average relevancy score, and the average relevancy score is an average of a plurality of relevancy scores of the set of information objects to each topic, each of the plurality of relevancy scores being calculated based in part on a number of words in the set of information objects that are associated with each topic and event types performed on the set of information objects as indicated by the group of the session events.

Example B02 includes the method of examples B01-B01.5 and/or some other examples herein, wherein, to identify the surge, execution of the instructions is to cause the hardware processor to: identify values in the consumption score reaching a threshold to be the surge.

Example B03 includes the method of examples B01-B02 and/or some other examples herein, further comprising: identifying or determining changes in the number of session events over different time periods, and adjust the consumption score based on the changes in the number of session events; and/or identifying or determining a number of users generating the session events for the different time periods, identify changes in the number of users over the different time periods, and adjust the consumption score based on the changes in the number of users.

Example B04 includes the method of examples B01-B03 and/or some other examples herein, further comprising: comparing the relevancy score for the organization with an overall relevancy score for information objects accessed from multiple computer devices not associated with the organization; assigning an initial value of "low" to the consumption score for the organization when the average relevancy score is below the overall relevancy; assigning an initial value of "medium" to the consumption score for the organization when the average relevancy score is about a same value as the overall relevancy; and assigning an initial value of "high" to the consumption score when the average relevancy score is above the overall relevancy score.

Example B05 includes the method of examples B01-B05 and/or some other examples herein, further comprising: identifying or determining types of user engagement with the information objects based on information included in the session events; and adjusting the relevancy of the information object based on the types of user engagement with the content.

Example B06 includes the method of example B05 and/or some other examples herein, wherein the types of user engagement include one or more of information object dwell times, scrolling data (e.g., type of scrolling, scroll depth, scroll velocity, scroll bar scrolls), mouse data (e.g., mouse scrolls, mouse clicks, mouse movements, etc.), keyboard data (e.g., key presses, etc.), touch data (e.g., touch gestures, etc.), eye tracking data (e.g., gaze locations, gaze times, gaze regions of interest, eye movement frequency, speed, orientations, etc.), variance in content consumption over a period of time, and tab selections that switch between information objects.

Example B07 includes the method of examples B01-B06 and/or some other examples herein, further comprising: calculating a first number of users generating a first number of the session events for a first time period; calculating a second number of users generating a second number of the session events for a second time period; and decreasing the consumption score for the second time period when the second number of users is less than the first number of users.

Example B08 includes the method of examples B01-B07 and/or some other examples herein, further comprising: identifying or determining a first group of the session events for a first time period coming from a same network address; calculating a first consumption score based on an average relevancy score for the first group of the session events with each topic; identifying or determining a second group of the session events for a second time period coming from the same network address; calculate a second consumption score based on an average relevancy score for the second group of the session events with each topic; and calculating a surge score for the organization based on a change between the first consumption score and the second consumption score.

Example B09 includes the method of examples B01-B08 and/or some other examples herein, further comprising: identifying or determining the organization based on one or more network addresses associated with the organization; identifying or determining a location for the organization based on the one or more network addresses; and associating the identified location with the consumption score.

Example B10 includes the method of examples B01-B09 and/or some other examples herein, wherein the group of the session events includes a first group of the session events and a second group of the session events, and execution of the instructions is to cause the hardware processor to: identifying or determining the first group of the session events for a first time period; identifying or determining a first group of information objects accessed during the first group of the session events; identifying or determining a first relevancy score of the first group of information objects to each topic; generate a first value for the consumption score for the first time period based on a number of the first group of session events and the first relevancy score; identifying or determining the second group of the session events for a second time period after the first time period; identifying or determining a second group of information objects accessed during the second group of the session events; identifying or determining a second relevancy score of the second group of information objects to each topic; identifying or determining a rate that the second relevancy score increases or decreases from the first relevancy score; and generating a second value for the consumption score for the second time period based on a number of the second group of the session events and the rate that the second relevancy score increases or decreases from the first relevancy score.

Example B11 includes the method of example B10 and/or some other examples herein, further comprising: adjusting the second value based on a change between the number of the first group of the session events and the number of the second group of the session events.

Example B12 includes the method of example B11 and/or some other examples herein, further comprising: identifying or determining a third group of session events for a third time period after the second time period; identifying or determining a third group of information object accessed during the third group of session events; identifying or determining a third relevancy score of the third group of information object to each topic; generating a third value for the consumption score for the third time period based on a number of the third group of session events and the third relevancy, and adjusting the third value based on changes between the number of the first group of session events, the number of the second group of session events, and the number of the third group of session events.

Example B13 includes a method of operating a content consumption monitor (CCM), the method comprising: obtaining data packets including session events from computer devices that access information objects, the information objects including webpages, content included in webpages, or applications, the information objects including tags, the tags including executable instructions which cause the computer devices to monitor and capture the session events generated by the computer devices and send the packets including the captured session events to the CCM, each of the session events identifying an accessed information object, an event type identifier that identifies an action or activity associated with of the accessed information object, and a network address from which the information object was accessed; accessing a database to identify a domain name for an organization associated with at least one network address indicated by at least one of the session events; identifying or determining a group of the session events for each time period of a plurality of time periods that include the domain name of the organization or one or more network addresses associated with the organization; identifying or determining a set of information objects accessed by members of the organization indicated by the group of the session events for each time period; identifying or determining an average relevancy score of the set of information objects to each topic of a plurality of topics for the organization for each time period, the average relevancy score being based on a plurality of relevancy scores calculated for the set of information objects to each topic, each of the plurality of relevancy scores being based in part on a number of words in the set of information objects that are associated with each topic and event types indicated by the group of the session events as being performed on the set of information objects; identifying or determining a number of unique users of the organization generating the session events for each time period, the unique users being users of one or more of the computer devices; identifying or determining a consumption score for the organization for each time period based on the number of session events generated by the organization, the number of unique users of the organization, and the average relevancy score of the set of information objects to each topic for the organization for each time period; identifying or determining a surge in consumption scores for the organization based on changes in the consumption scores for the organization over the plurality of time periods; and providing, to a display device, data indicating the consumption scores and the surge in consumption scores for display in a user interface displayed by the display device.

Example B14 includes the method of example B13 and/or some other examples herein, further comprising: identifying or determining a number of users generating the session events for the time period; and calculate the consumption score further based on the number of users.

Example B15 includes the method of examples B13-B14 and/or some other examples herein, further comprising: identifying or determining a number of users generating the session events over the plurality of time periods; and adjust the consumption score based on changes in the number of users over the plurality of time periods.

Example B16 includes the method of examples B13-B15 and/or some other examples herein, further comprising: identifying or determining a location associated with the organization; and calculating a consumption score for the location based on the plurality of relevancy scores of the information objects and a number of session events associated with the location.

Example B17 includes the method of examples B13-B16 and/or some other examples herein, further comprising: identifying or determining a surge in the consumption score when the consumption score reaches a threshold value.

Example B18 includes the method of example B17 and/or some other examples herein, further comprising: mapping the surge to contacts associated with the organization.

Example B19 includes the method of example B18 and/or some other examples herein, further comprising: sending a notification of the surge to a service provider.

Example B20 includes the method of example B19 and/or some other examples herein, wherein the notification of the surge is configured to trigger the service provider to send information associated with at least one topic of the plurality of topics to contacts associated with the organization.

Example B21 includes the method of example B20 and/or some other examples herein, wherein the notification of the surge is configured to trigger the publisher to send the information to the contacts having a job title associated with at least one topic of the plurality of topics.

Example X01 includes the method of examples A01-A28, B01-B21, and/or some other example(s) herein, wherein the events comprise one or more of database session events, work unit events, client or browser session events, server session events, remote session events (e.g., remote desktop session events, etc.), network session events, web session events, HTTP session events, telnet remote login session events, SIP session events, Transmission Control Protocol (TCP) session events, User Datagram Protocol (UDP) session events, cellular network events, and/or other events of other session types such as those discussed herein.

Example X02 includes the method of examples A01-A28, B01-B21, X01, and/or some other example(s) herein, wherein the network addresses is/are internet protocol (IP) addresses, telephone numbers in a public switched telephone number, a cellular network addresses, internet packet exchange (IPX) addresses, X.25 addresses, X.21 addresses, Transmission Control Protocol (TCP) or User Datagram Protocol (UDP) port numbers, media access control (MAC) addresses, Electronic Product Codes (EPCs), Bluetooth hardware device addresses, a Universal Resource Locators (URLs), and/or email addresses.

Example X03 includes the method of examples A01-A28, B01-B21, X01-X02, and/or some other example(s) herein, wherein any one or more of examples A01-A28 are combinable with any one or more of examples B01-B21 and/or some other example(s) herein.

Example Z01 includes one or more computer readable media comprising instructions, wherein execution of the instructions by processor circuitry is to cause the processor circuitry to perform the method of any one of examples A01-A28, B01-B21, X01-X03, and/or some other example(s) herein. Example Z02 includes a computer program comprising the instructions of example Z01. Example Z03a includes an Application Programming Interface defining functions, methods, variables, data structures, and/or protocols for the computer program of example Z02. Example Z03b includes an API or specification defining functions, methods, variables, data structures, protocols, etc., defining or involving use of any of examples A01-A28, B01-B21, X01-X03, or portions thereof, or otherwise related to any of examples A01-A28, B01-B21, X01-X03, or portions thereof. Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes a computing system of example Z07 and/or one or more other example(s) herein, wherein the computing system is a System-in-Package (SiP), Multi-Chip Package (MCP), a System-on-Chips (SoC), a digital signal processors (DSP), a field-programmable gate arrays (FPGA), an Application Specific Integrated Circuits (ASIC), a programmable logic device (PLD), a complex PLD (CPLD), a Central Processing Unit (CPU), a Graphics Processing Unit (GPU), and/or the computing system comprises two or more of SiPs, MCPs, SoCs, DSPs, FPGAs, ASICs, PLDs, CPLDs, CPUs, GPUs interconnected with one another. Example Z09 includes an apparatus comprising means for executing the instructions of example Z01. Example Z10 includes a signal generated as a result of executing the instructions of example Z01. Example Z11 includes a data unit generated as a result of executing the instructions of example Z01. Example Z12 includes the data unit of example Z11 and/or some other example(s) herein, wherein the data unit is a datagram, network packet, data frame, data segment, a Protocol Data Unit (PDU), a Service Data Unit (SDU), a message, or a database object. Example Z13 includes a signal encoded with the data unit of examples Z11 and/or Z12. Example Z14 includes an electromagnetic signal carrying the instructions of example Z01. Example Z15 includes an apparatus comprising means for performing the method of any one of examples A01-A28, B01-B21, X01-X03, and/or some other example(s) herein.

Any of the above-described examples may be combined with any other example (or combination of examples), unless explicitly stated otherwise. Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

9. TERMINOLOGY

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configurable or operable to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configurable or operable to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configurable or operable to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The terms "instantiate," "instantiation," and the like as used herein refers to the creation of an instance. An "instance" also refers to a concrete occurrence of an object, which may occur, for example, during execution of program code.

The term "information object" refers to a data structure that includes one or more data elements, each of which includes one or more data values. Examples of information objects include electronic documents, database objects, data files, resources, webpages, web forms, applications (e.g., web apps), services, web services, media, or content, and/or the like. Information objects may be stored and/or processed according to a data format. Data formats define the content/data and/or the arrangement of data elements for storing and/or communicating the information objects. Each of the data formats may also define the language, syntax, vocabulary, and/or protocols that govern information storage and/or exchange. Examples of the data formats that may be used for any of the information objects discussed herein may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca Interface Definition Language (IDL), Geography Markup Language (GML), Geospatial eXtensible Access Control Markup Language (GeoXACML), Geospatial Data Abstraction Library (GDAL), Guide Template Language (GTL), Handlebars template language, Hypertext Markup Language (HTML), Interactive Financial Exchange (IFX), Keyhole Markup Language (KML) and/or KML Zipped (KMZ), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Shapefile (SHP), VBScript, text file (TXT), Web Application Description Language (WADL), Web Map Service (WMS), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other language discussed elsewhere herein. Additionally or alternatively, the data format for the information objects discussed herein may be a Tactical Data Link (TDL) format including, for example, J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats.

Additionally or alternatively, the data format for the information objects may be document and/or plain text, spreadsheet, graphics, and/or presentation formats including, for example, American National Standards Institute (ANSI) text, a Computer-Aided Design (CAD) application file format (e.g., ".c3d", ".dwg", ".dft", ".iam", ".iaw", ".tct", and/or other like file extensions), Google® Drive® formats (including associated formats for Google Docs®, Google Forms®, Google Sheets®, Google Slides®, etc.), Microsoft® Office® formats (e.g., ".doc", ".ppt", ".xls", ".vsd", and/or other like file extension), OpenDocument Format (including associated document, graphics, presentation, and spreadsheet formats), Open Office XML (OOXML) format (including associated document, graphics, presentation, and spreadsheet formats), Apple® Pages®, Portable Document Format (PDF), Question Object File Format (QUOX), Rich Text File (RTF), TeX and/or LaTeX (".tex" file extension), text file (TXT), TurboTax® file (".tax" file extension), You Need a Budget (YNAB) file, and/or any other like document or plain text file format.

Additionally or alternatively, the data format for the information objects may be archive file formats that store metadata and concatenate files, and may or may not compress the files for storage. As used herein, the term "archive file" refers to a file having a file format or data format that combines or concatenates one or more files into a single file or information object. Archive files often store directory structures, error detection and correction information, arbitrary comments, and sometimes use built-in encryption. The term "archive format" refers to the data format or file format of an archive file, and may include, for example, archive-only formats that store metadata and concatenate files, for example, including directory or path information; compression-only formats that only compress a collection of files; software package formats that are used to create software packages (including self-installing files), disk image formats that are used to create disk images for mass storage, system recovery, and/or other like purposes; and multi-function archive formats that can store metadata, concatenate, compress, encrypt, create error detection and recovery information, and package the archive into self-extracting and self-expanding files. For the purposes of the present disclosure, the term "archive file" may refer to an archive file having any of the aforementioned archive format types. Examples of archive file formats may include Android® Package (APK); Microsoft® Application Package (APPX); Genie Timeline Backup Index File (GBP); Graphics Interchange Format (GIF); gzip (.gz) provided by the GNU Project®; Java® Archive (JAR); Mike O'Brien Pack (MPQ) archives; Open Packaging Conventions (OPC) packages including OOXML files, OpenXPS files, etc.; Rar Archive (RAR); Red Hat® package/installer (RPM); Google® SketchUp backup File (SKB); TAR archive (".tar"); XPInstall or XPI installer modules; ZIP (.zip or .zipx); and/or the like.

The term "data element" refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" may refer to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" may refer to a markup construct including a name—value pair that exists within a start tag or empty element tag. Attributes contain data related to its element and/or control the element's behavior.

The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "information element" refers to a structural element containing one or more fields. The term "field" refers to individual contents of an information element, or a data element that contains content. The term "data frame" or "DF" may refer to a data type that contains more than one data element in a predefined order.

The term "personal data," "personally identifiable information," "PII," or the like refers to information that relates to an identified or identifiable individual. Additionally or alternatively, "personal data," "personally identifiable information," "PII," or the like refers to information that can be used on its own or in combination with other information to identify, contact, or locate a person, or to identify an individual in context. The term "sensitive data" may refer to data related to racial or ethnic origin, political opinions, religious or philosophical beliefs, or trade union membership, genetic data, biometric data, data concerning health, and/or data concerning a natural person's sex life or sexual orientation. The term "confidential data" refers to any form of information that a person or entity is obligated, by law or contract, to protect from unauthorized access, use, disclosure, modification, or destruction. Additionally or alternatively. "confidential data" may refer to any data owned or licensed by a person or entity that is not intentionally shared with the general public or that is classified by the person or entity with a designation that precludes sharing with the general public.

The term "pseudonymization" or the like refers to any means of processing personal data or sensitive data in such a manner that the personal/sensitive data can no longer be attributed to a specific data subject (e.g., person or entity) without the use of additional information. The additional information may be kept separately from the personal/sensitive data and may be subject to technical and organizational measures to ensure that the personal/sensitive data are not attributed to an identified or identifiable natural person.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "network address" refers to an identifier for a node or host in a computer network, and may be a unique identifier across a network and/or may be unique to a locally administered portion of the network. Examples of network addresses include telephone numbers in a public switched telephone number, a cellular network address (e.g., international mobile subscriber identity (IMSI), mobile subscriber ISDN number (MSISDN), Subscription Permanent Identifier (SUPI), Temporary Mobile Subscriber Identity (TMSI), Globally Unique Temporary Identifier (GUTI), Generic Public Subscription Identifier (GPSI), etc.), an internet protocol (IP) address in an IP network (e.g., IP version 4 (Ipv4), IP version 6 (IPv6), etc.), an internet packet exchange (IPX) address, an X.25 address, an X.21 address, a port number (e.g., when using Transmission Control Protocol (TCP) or User Datagram Protocol (UDP)), a media access control (MAC) address, an Electronic Product Code (EPC) as defined by the EPCglobal Tag Data Standard, Bluetooth hardware device address (BD_ADDR), a Universal Resource Locator (URL), an email address, and/or the like.

The term "organization" or "org" refers to an entity comprising one or more people and/or users and having a particular purpose, such as, for example, a company, an enterprise, an institution, an association, a regulatory body, a government agency, a standards body, etc. Additionally or alternatively, an "org" may refer to an identifier that represents an entity/organization and associated data within an instance and/or data structure.

The term "intent data" may refer to data that is collected about users' observed behavior based on web content consumption, which provides insights into their interests and indicates potential intent to take an action.

The term "engagement" refers to a measureable or observable user interaction with a content item or information object. The term "engagement rate" refers to the level of user interaction that is generated from a content item or information object. For purposes of the present disclosure, the term "engagement" may refer to the amount of interactions with content or information objects generated by an organization or entity, which may be based on the aggregate engagement of users associated with that organization or entity.

The term "session" refers to a temporary and interactive information interchange between two or more communicating devices, two or more application instances, between a computer and user, or between any two or more entities or elements. Additionally or alternatively, the term "session" may refer to a connectivity service or other service that provides or enables the exchange of data between two entities or elements. Additionally or alternatively, the term "session" may refer to a unit of measurement of a user's actions taken within a period of time and/or with regard to completion of a task. The term "network session" may refer to a session between two or more communicating devices over a network, and a "web session" may refer to a session between two or more communicating devices over the web or the Internet. A "session identifier," "session ID," or "session token" refers to a piece of data that is used in network communications to identify a session and/or a series of message exchanges.

Although the various example embodiments and example implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. One or more non-transitory computer-readable media (NTCRM) comprising instructions for operating a content consumption monitor (CCM), wherein execution of the instructions by one or more processors of a computing device is to cause the computing device:
    obtain data packets including information about session events from computer devices that access information objects that include tags, the tags include program code which cause computer devices to monitor and capture the session events generated by the computer devices and send the data packets including the captured session events to the CCM, and each of the session events at least identifying an accessed information object, an event type identifier that identifies an action or activity associated with of the accessed information object, and a network address from which the accessed information object was accessed;
    identify, from a database, a domain name for an organization (org) one or more network addresses associated with the org associated with the network address indicated by at least one of the session events;
    identify, for each of multiple time periods, a group of the session events that include the domain name of the org or the one or more network addresses associated with the org;
    identify, for each of the multiple time periods, a set of information objects accessed by members of the org as indicated by the group of the session events;
    determine a plurality of topics based on one or more words in the set of information objects;
    determine an average relevancy score of the set of information objects to each topic of the plurality of topics, wherein the average relevancy score is an average of a plurality of relevancy scores of the set of information objects to each topic, each of the plurality of relevancy scores being calculated based in part on a number of words in the set of information objects that are associated with each topic and event types performed on the set of information objects as indicated by the group of the session events;
    identify a number of unique users of the org generating the session events for each of the time periods, the unique users being users of one or more of the computer devices;
    generate consumption scores for the org for each of the multiple time periods based on the number of session events generated from the org, the number of unique users of the org, and the average relevancy score for each topic; and
    determine a surge in the consumption scores for the org based on changes in the consumption scores for the org over the multiple time periods.

2. The one or more NTCRM of claim 1, wherein, to identify the surge, execution of the instructions is to cause the computing device to:
    identify values in the consumption score reaching a threshold to be the surge.

3. The one or more NTCRM of claim 1, wherein execution of the instructions is to cause the computing device to:
    identify changes in the number of session events over different time periods, and adjust the consumption score based on the changes in the number of session events; or
    identify a number of users generating the session events for the different time periods, identify changes in the number of users over the different time periods, and adjust the consumption score based on the changes in the number of users.

4. The one or more NTCRM of claim 1, wherein execution of the instructions is to cause the computing device to:
    compare the average relevancy score for the org with an overall relevancy score for information objects accessed from multiple computer devices not associated with the org;
    assign an initial value of "low" to the consumption score for the org when the average relevancy score is below the overall relevancy;

assign an initial value of "medium" to the consumption score for the org when the average relevancy score is about a same value as the overall relevancy; and assign an initial value of "high" to the consumption score when the average relevancy score is above the overall relevancy score.

5. The one or more NTCRM of claim 1, wherein execution of the instructions is to cause the computing device to:

identify types of user engagement with the information objects based on information included in the session events; and adjust the relevancy of the information object based on the types of user engagement with the content.

6. The one or more NTCRM of claim 5, wherein the types of user engagement include one or more of information object dwell times, scrolling data, mouse data, keyboard data, touch data, eye tracking data, variance in content consumption over a period of time, and tab selections that switch between information objects.

7. The one or more NTCRM of claim 1, wherein execution of the instructions is to cause the computing device to:

calculate a first number of users generating a first number of the session events for a first time period;

calculate a second number of users generating a second number of the session events for a second time period; and decrease the consumption score for the second time period when the second number of users is less than the first number of users.

8. The one or more NTCRM of claim 1, wherein execution of the instructions is to cause the computing device to:

identify a first group of the session events for a first time period coming from a same network address;

calculate a first consumption score based on an average relevancy score for the first group of the session events with each topic;

identify a second group of the session events for a second time period coming from the same network address;

calculate a second consumption score based on an average relevancy score for the second group of the session events with each topic; and calculate a surge score for the org based on a change between the first consumption score and the second consumption score.

9. The one or more NTCRM of claim 1, wherein execution of the instructions is to cause the computing device to: identify the org based on the one or more network addresses associated with the org; identify a location for the org based on the one or more network addresses; and associate the identified location with the consumption score.

10. The one or more NTCRM of claim 1, wherein the group of the session events includes a first group of the session events and a second group of the session events, and execution of the instructions is to cause the computing device to:

identify the first group of the session events for a first time period;

identify a first group of information objects accessed during the first group of the session events;

identify a first relevancy score of the first group of information objects to each topic;

generate a first value for the consumption score for the first time period based on a number of the first group of session events and the first relevancy score;

identify the second group of the session events for a second time period after the first time period;

identify a second group of information objects accessed during the second group of the session events;

identify a second relevancy score of the second group of information objects to each topic;

determine a rate that the second relevancy score increases or decreases from the first relevancy score; and generate a second value for the consumption score for the second time period based on a number of the second group of the session events and the rate that the second relevancy score increases or decreases from the first relevancy score.

11. The one or more NTCRM of claim 10, wherein execution of the instructions is to cause the computing device to adjust the second value based on a change between the number of the first group of the session events and the number of the second group of the session events.

12. The one or more NTCRM of claim 11, wherein execution of the instructions is to cause the computing device to:

identify a third group of session events for a third time period after the second time period;

identify a third group of information object accessed during the third group of session events;

identify a third relevancy score of the third group of information object to each topic;

generate a third value for the consumption score for the third time period based on a number of the third group of session events and the third relevancy, and adjust the third value based on changes between the number of the first group of session events, the number of the second group of session events, and the number of the third group of session events.

13. An apparatus to be employed as a content consumption monitor (CCM), the apparatus comprising:

processor circuitry; and memory circuitry communicatively coupled to the processor circuitry, the memory circuitry comprising instructions stored thereon, wherein execution of the instructions by the processor circuitry is operable to cause the processor circuitry to:

obtain data packets including session events from computer devices that access information objects, the information objects including webpages, content included in webpages, or applications, the information objects including tags, the tags including executable instructions which cause the computer devices to monitor and capture the session events generated by the computer devices and send the packets including the captured session events to the CCM, each of the session events identifying an accessed information object, an event type identifier that identifies an action or activity associated with of the accessed information object, and a network address from which the information object was accessed;

access a database to identify a domain name for an organization (org) or more network addresses associated with the org associated with the network address indicated by at least one of the session events;

identify a group of the session events for each time period of a plurality of time periods that include the domain name of the org or the one or more network addresses associated with the org;

identify a set of information objects accessed by members of the org indicated by the group of the session events for each time period;

determine an average relevancy score of the set of information objects to each topic of a plurality of topics for the org for each time period, the average relevancy score being based on a plurality of relevancy scores calculated for the set of information objects to each topic, each of the plurality of relevancy scores being based in part on a number of words in the set of information objects that are associated with each topic and event types indicated by the group of the session events as being performed on the set of information objects;

determine a number of unique users of the org generating the session events for each time period, the unique users being users of one or more of the computer devices;

calculate a consumption score for the org for each time period based on the number of session events generated by the org, the number of unique users of the org, and the average relevancy score of the set of information objects to each topic for the org for each time period;

identify a surge in consumption scores for the org based on changes in the consumption scores for the org over the plurality of time periods; and provide, to a display device, data indicating the consumption scores and the surge in consumption scores for display in a user interface displayed by the display device.

14. The apparatus of claim 13, wherein execution of the instructions is operable to cause the processor circuitry to:
identify a number of users generating the session events for the time period; and
calculate the consumption score further based on the number of users.

15. The apparatus of claim 13, wherein execution of the instructions is operable to cause the processor circuitry to:
identify a number of users generating the session events over the plurality of time periods; and
adjust the consumption score based on changes in the number of users over the plurality of time periods.

16. The apparatus of claim 13, wherein execution of the instructions is operable to cause the processor circuitry to:
identify a location associated with the org; and
calculate a consumption score for the location based on the plurality of relevancy scores of the information objects and a number of session events associated with the location.

17. The apparatus of claim 13, wherein execution of the instructions is operable to cause the processor circuitry to identify a surge in the consumption score when the consumption score reaches a threshold value.

18. The apparatus of claim 17, wherein execution of the instructions is operable to cause the processor circuitry to map the surge to contacts associated with the org.

19. The apparatus of claim 18, wherein execution of the instructions is operable to cause the processor circuitry to send a notification of the surge to a service provider.

20. The apparatus of claim 19, wherein the notification is configured to trigger the service provider to send information associated with at least one topic of the plurality of topics to contacts associated with the org, or the notification is configured to trigger the publisher to send the information to the contacts having a metadata item associated with at least one topic of the plurality of topics.

* * * * *